United States Patent
Moon et al.

(10) Patent No.: US 11,091,503 B2
(45) Date of Patent: Aug. 17, 2021

(54) COMPOUND AND COLOR CONVERSION FILM COMPRISING THE SAME

(71) Applicant: LG CHEM, LTD., Seoul (KR)

(72) Inventors: Sang Pil Moon, Daejeon (KR); Jiyeon Sung, Daejeon (KR); Hieu Leduy, Daejeon (KR); Hoyong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 82 days.

(21) Appl. No.: 16/620,405

(22) PCT Filed: Nov. 9, 2018

(86) PCT No.: PCT/KR2018/013595
§ 371 (c)(1),
(2) Date: Dec. 6, 2019

(87) PCT Pub. No.: WO2019/093806
PCT Pub. Date: May 16, 2019

(65) Prior Publication Data
US 2020/0087324 A1    Mar. 19, 2020

(30) Foreign Application Priority Data
Nov. 10, 2017 (KR) .................. 10-2017-0149544

(51) Int. Cl.
*C07F 5/02* (2006.01)
*G02F 1/13357* (2006.01)
*C09K 11/06* (2006.01)

(52) U.S. Cl.
CPC .............. *C07F 5/02* (2013.01); *C09K 11/06* (2013.01); *G02F 1/133609* (2013.01)

(58) Field of Classification Search
CPC ...... C07F 5/02; C07F 5/022; G02F 1/133609; G02F 1/1335; F21K 9/60
USPC ............................ 568/1; 548/405; 313/498
See application file for complete search history.

(56) References Cited

FOREIGN PATENT DOCUMENTS

| | | |
|---|---|---|
| CN | 105017300 A | 11/2015 |
| JP | 2013-177551 A | 9/2013 |

OTHER PUBLICATIONS

International Search Report and Written Opinion issued for International Application No. PCT/KR2018/013595 dated Apr. 19, 2019, 11 pages.
Yu, et al., "Synthesis and photophysical properties of meso-aryloxy linked BODIPY monomers, dimers, and trimer", Journal of Porphyrins and Phthalocyanines (2016), 20, 1-15.
Misra, et al., "meso-Aryloxy and meso-arylaza linked BODIPY dimers: synthesis, structures and properties", New Journal of Chemistry, 2014, 38, p. 3579-3585.
Zong, et al "Novel Dual BODIPY-Carbazole Conjugates with Various Linkers", Australian Journal of Chemistry, Feb. 27, 2017, 70, p. 806-815.
Yan et al., "A novel fluorescence sensor for K+ based on bis-Bodipy: The ACQ effect controlled by cation complexation of pseudo crown ether ring", Tetrahedron Letters, Jun. 23, 2017, 58, p. 3064-3068.

*Primary Examiner* — Charanjit Aulakh
(74) *Attorney, Agent, or Firm* — Rothwell, Figg, Ernst & Manbeck, P.C.

(57) ABSTRACT

The present specification relates to a compound, and a color conversion film, a backlight unit, and a display device, including the same.

10 Claims, 1 Drawing Sheet

[Figure 1]
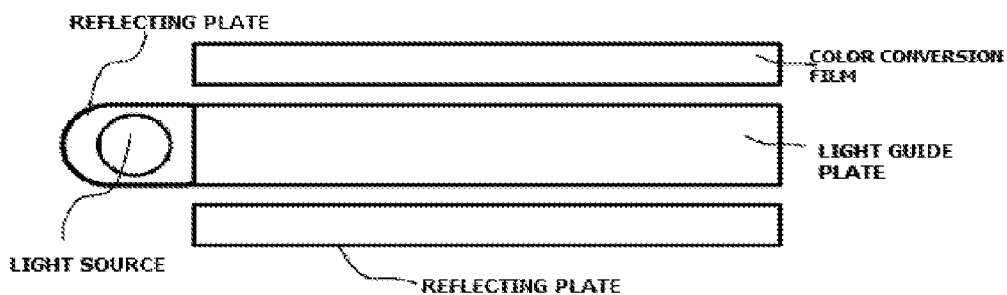
[Figure 2]
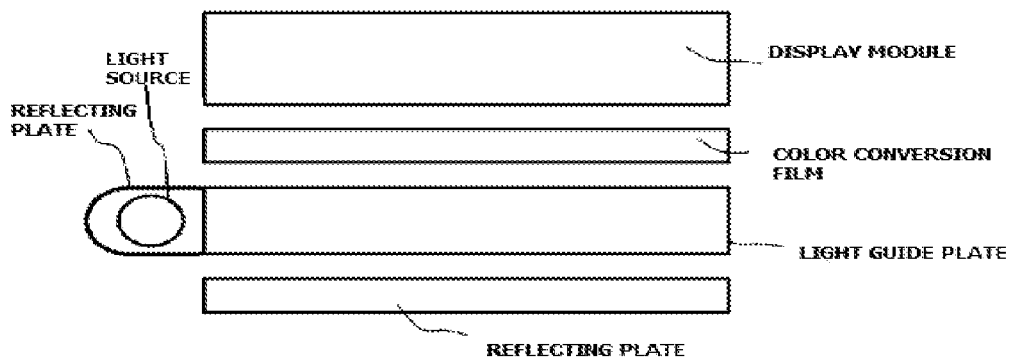

COMPOUND AND COLOR CONVERSION FILM COMPRISING THE SAME

This application is a 35 U.S.C. 371 National Phase Entry Application from PCT/KR2018/013595, filed Nov. 9, 2018, which claims priority to and the benefit of Korean Patent Application No. 10-2017-0149544 filed in the Korean Intellectual Property Office on Nov. 10, 2017, the entire contents of which are incorporated herein by reference.

TECHNICAL FIELD

The present specification relates to a compound, and a color conversion film, a backlight unit, and a display device, including the same.

BACKGROUND ART

The existing light emitting diodes (LEDs) are obtained by mixing a green phosphor and a red phosphor with a blue light emitting diode or mixing a yellow phosphor and a blue-green phosphor with a UV light emission light emitting diode. However, in this method, it is difficult to control colors, and accordingly, the color rendition is not good. Therefore, the color gamut deteriorates.

In order to overcome the deterioration in the color gamut and reduce the production costs, methods of implementing green and red colors have been recently attempted by using a method of producing a quantum dot in the form of a film and combining the same with a blue LED. However, cadmium-based quantum dots have safety problems, and the other quantum dots have much lower efficiencies than those of the cadmium-based quantum dots. Further, quantum dots have low stability against oxygen and water, and have a disadvantage in that the performance thereof significantly deteriorates when the quantum dots are aggregated. In addition, when quantum dots are produced, it is difficult to constantly maintain the size thereof, and thus, the production cost is high.

DISCLOSURE

Technical Problem

The present specification provides a compound, and a color conversion film, a backlight unit, and a display device, including the same.

Technical Solution

An exemplary embodiment of the present specification provides a compound represented by the following Formula 1.

[Formula 1]

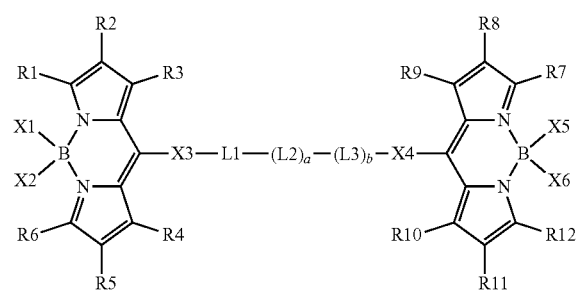

In Formula 1,

X3 and X4 are the same as or different from each other, and are each independently O or S, a and b are an integer of 0 or 1 or higher, X1, X2, X5 and X6 are the same as or different from each other, and are each independently a halogen group; a substituted or unsubstituted aryl group; a substituted or unsubstituted aryloxy group; a substituted or unsubstituted alkoxy group; a substituted or unsubstituted alkyl group; a substituted or unsubstituted alkynyl group; a substituted or unsubstituted ether group; a substituted or unsubstituted ester group; a substituted or unsubstituted arylalkyl group; or a cyano group, R1 to R12 are the same as or different from each other, and are each independently hydrogen; deuterium; a cyano group; a halogen group; a substituted or unsubstituted alkoxy group; a substituted or unsubstituted alkyl group; a substituted or unsubstituted ester group; a substituted or unsubstituted haloalkyl group; a substituted or unsubstituted aryl group; a substituted or unsubstituted cycloalkyl group; or a substituted or unsubstituted heterocyclic group, L1 is a substituted or unsubstituted alkylene group; a substituted or unsubstituted arylene group; or a substituted or unsubstituted heterocyclic group, L3 is a substituted or unsubstituted arylene group, L2 is a substituted or unsubstituted alkylene group, —C(=O)—, —O—, —S—, —SO$_2$—, or —NR—, and here, R is the same as or different from each other, and are each independently hydrogen; deuterium; or a substituted or unsubstituted alkyl group, adjacent groups among L1, L2, and L3 may be bonded to each other to form a substituted or unsubstituted ring, and when a and b are 0, L1 is a substituted or unsubstituted alkylene group; a substituted or unsubstituted polycyclic arylene group; or a substituted or unsubstituted heterocyclic group.

Another exemplary embodiment of the present specification provides a color conversion film including: a resin matrix; and the compound represented by Formula 1, which is dispersed in the resin matrix.

Still another exemplary embodiment of the present specification provides a backlight unit including the color conversion film.

Yet another exemplary embodiment of the present specification provides a display device including the backlight unit.

Advantageous Effects

A metal complex according to an exemplary embodiment of the present specification, that is, the compound represented by Formula 1 has high fluorescence efficiency, is stable to water or oxygen, and has a lower production unit cost than quantum dots. Therefore, by using the compound represented by Formula 1, which is described in the present specification, as a fluorescent material of a color conversion film, it is possible to provide a color conversion film which has excellent brightness and color gamut, a simple production process, and a low manufacturing cost.

DESCRIPTION OF DRAWINGS

FIG. 1 is a schematic view in which a color conversion film according to an exemplary embodiment of the present specification is applied to a backlight unit.

FIG. 2 is a schematic view illustrating a structure of a display device according to an exemplary embodiment of the present specification.

MODE FOR INVENTION

Hereinafter, the present application will be described in more detail.

An exemplary embodiment of the present specification provides the compound represented by Formula 1.

When one part "includes" one constituent element in the present specification, unless otherwise specifically described, this does not mean that another constituent element is excluded, but means that another constituent element may be further included.

When one member is disposed "on" another member in the present specification, this includes not only a case where the one member is brought into contact with another member, but also a case where still another member is present between the two members.

Examples of the substituents in the present specification will be described below, but are not limited thereto.

The term "substitution" means that a hydrogen atom bonded to a carbon atom of a compound is changed into another substituent, and a position to be substituted is not limited as long as the position is a position at which the hydrogen atom is substituted, that is, a position at which the substituent may be substituted, and when two or more are substituted, the two or more substituents may be the same as or different from each other.

In the present specification, the term "substituted or unsubstituted" means being substituted with one or two or more substituents selected from the group consisting of hydrogen; deuterium; a halogen group; a cyano group; a nitro group; a carbonyl group; a carboxyl group (—COOH); an ether group; an ester group; a hydroxyl group; a substituted or unsubstituted alkyl group; a substituted or unsubstituted cycloalkyl group; a substituted or unsubstituted alkoxy group; a substituted or unsubstituted aryloxy group; a substituted or unsubstituted alkenyl group; a substituted or unsubstituted aryl group; and a substituted or unsubstituted heterocyclic group or being substituted with a substituent to which two or more substituents are linked among the substituents exemplified above, or having no substituent. For example, "the substituent to which two or more substituents are linked" may be a biphenyl group. That is, the biphenyl group may also be an aryl group, and may be interpreted as a substituent to which two phenyl groups are linked.

In the present specification, examples of a halogen group may be fluorine, chlorine, bromine or iodine. In the present specification, the number of carbon atoms of a carbonyl group is not particularly limited, but is preferably 1 to 30. Specifically, the carbonyl group may be a compound having a structure such as —C(=O)$R_a$, and in this case, $R_a$ is hydrogen or an alkyl group, but is not limited thereto.

In the present specification, for an ether group, the oxygen of the ether may be substituted with a straight-chained, branched, or cyclic alkyl group having 1 to 25 carbon atoms; or a monocyclic or polycyclic aryl group having 6 to 30 carbon atoms.

In the present specification, for an ester group, the oxygen of the ester group may be substituted with a straight-chained, branch-chained, or cyclic alkyl group having 1 to 25 carbon atoms, or a monocyclic or polycyclic aryl group having 6 to 30 carbon atoms. Specifically, the ester group may be a compound having a structure such as —C(=O)$OR_b$, and in this case, $R_b$ is an alkyl group. However, the ester group is not limited thereto.

In the present specification, the alkyl group may be straight-chained or branched, and the number of carbon atoms thereof is not particularly limited, but is preferably 1 to 30. Specific examples thereof include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethylpropyl, isohexyl, 2-methylpentyl, 4-methylhexyl, 5-methylhexyl, and the like, but are not limited thereto.

In the present specification, the alkenyl group may be straight-chained or branched, and the number of carbon atoms thereof is not particularly limited, but is preferably 2 to 30. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present specification, the alkynyl group may be straight-chained or branched, and the number of carbon atoms thereof is not particularly limited, but is preferably 2 to 30. Specific examples thereof include an alkynyl group such as ethynyl, propynyl, 2-methyl-2-propynyl, 2-butynyl, and 2-pentynyl, and the like, but are not limited thereto.

In the present specification, a cycloalkyl group is not particularly limited, but has preferably 3 to 30 carbon atoms, and specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

In the present specification, the alkoxy group may be straight-chained, branched, or cyclic. The number of carbon atoms of the alkoxy group is not particularly limited, but is preferably 1 to 30. Specific examples thereof include methoxy, ethoxy, n-propoxy, isopropoxy, i-propyloxy, n-butoxy, isobutoxy, tert-butoxy, sec-butoxy, n-pentyloxy, neopentyloxy, isopentyloxy, n-hexyloxy, 3,3-dimethylbutyloxy, 2-ethylbutyloxy, n-octyloxy, n-nonyloxy, n-decyloxy, benzyloxy, p-methylbenzyloxy, and the like, but are not limited thereto.

In the present specification, an amine group may be selected from the group consisting of —$NH_2$; a monoalkylamine group; a dialkylamine group; an N-alkylarylamine group; a monoarylamine group; a diarylamine group; an N-arylheteroarylamine group; an N-alkylheteroarylamine group, a monoheteroarylamine group, and a diheteroarylamine group, and the number of carbon atoms thereof is not particularly limited, but is preferably 1 to 30. Specific examples of the amine group include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a ditolylamine group, an N-phenyltolylamine group, a triphenylamine group, an N-phenylbiphenylamine group, an N-phenylnaphthylamine group, an N-biphenylnaphthylamine group, an N-naphthylfluorenylamine group, an N-phenylphenanthrenylamine group, an N-biphenylphenanthrenylamine group, an N-phenylfluorenylamine group, an N-phenyl terphenylamine group, an N-phenanthrenylfluorenylamine group, an N-biphenylfluorenylamine group, and the like, but are not limited thereto.

In the present specification, an aryl group is not particularly limited, but has preferably 6 to 30 carbon atoms, and the aryl group may be monocyclic or polycyclic.

When the aryl group is a monocyclic aryl group, the number of carbon atoms thereof is not particularly limited, but is preferably 6 to 30. Specific examples of the monocyclic aryl group include a phenyl group, a biphenyl group, a terphenyl group, and the like, but are not limited thereto.

When the aryl group is a polycyclic aryl group, the number of carbon atoms thereof is not particularly limited, but is preferably 10 to 30. Specific examples of the polycyclic aryl group include a naphthyl group, an anthracenyl group, a phenanthryl group, a triphenyl group, a pyrenyl group, a perylenyl group, a chrysenyl group, a fluorenyl group, and the like, but are not limited thereto.

In the present specification, the fluorenyl group may be substituted, and adjacent substituents may be bonded to each other to form a ring.

When the fluorenyl group is substituted, the substituent may be

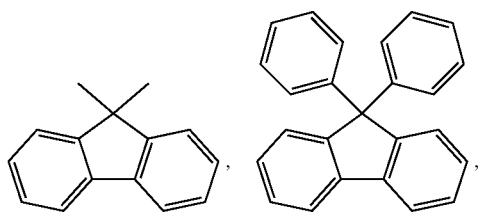

and the like. However, the substituent is not limited thereto.

In the present specification, an aryl group of an aryloxy group is the same as the above-described examples of the aryl group. Specifically, examples of the aryloxy group include a phenoxy group, a p-tolyloxy group, an m-tolyloxy group, a 3,5-dimethyl-phenoxy group, a 2,4,6-trimethylphenoxy group, a p-tert-butylphenoxy group, a 3-biphenyloxy group, a 4-biphenyloxy group, a 1-naphthyloxy group, a 2-naphthyloxy group, a 4-methyl-1-naphthyloxy group, a 5-methyl-2-naphthyloxy group, a 1-anthryloxy group, a 2-anthryloxy group, a 9-anthryloxy group, a 1-phenanthryloxy group, a 3-phenanthryloxy group, a 9-phenanthryloxy group, and the like, examples of the arylthioxy group include a phenylthioxy group, a 2-methylphenylthioxy group, a 4-tert-butylphenylthioxy group, and the like, and examples of the arylsulfoxy group include a benzenesulfoxy group, a p-toluenesulfoxy group, and the like, but the examples are not limited thereto.

In the present specification, a heterocyclic group includes one or more atoms other than carbon, that is, one or more heteroatoms, and specifically, the heteroatom may include one or more atoms selected from the group consisting of O, N, Se, S, and the like. The number of carbon atoms thereof is not particularly limited, but is preferably 2 to 30, and the heteroaryl group may be monocyclic or polycyclic. Examples of the heterocyclic group include a thiophene group, a furanyl group, a pyrrole group, an imidazolyl group, a triazolyl group, an oxazolyl group, an oxadiazolyl group, a pyridyl group, a bipyridyl group, a pyrimidyl group, a triazinyl group, a triazolyl group, an acridyl group, a pyridazinyl group, a pyrazinyl group, a qinolinyl group, a quinazolinyl group, a quinoxalinyl group, a phthalazinyl group, a pyridopyrimidyl group, a pyridopyrazinyl group, a pyrazinopyrazinyl group, an isoquinolinyl group, an indolyl group, a carbazolyl group, a benzoxazolyl group, a benzimidazolyl group, a benzothiazolyl group, a benzocarbazolyl group, a benzothiophene group, a dibenzothiophene group, a benzofuranyl group, a phenanthrolinyl group (phenanthroline), a thiazolyl group, an isoxazolyl group, an oxadiazolyl group, a thiadiazolyl group, a benzothiazolyl group, a phenothiazinyl group, a dibenzofuranyl group, a chromene group

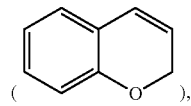

an azophenylene group, and the like, but are not limited thereto.

In the present specification, a heterocyclic group may be monocyclic or polycyclic, may be an aromatic ring, an aliphatic ring, or a fused ring of the aromatic ring and the aliphatic ring, and may be selected from the examples of the heterocyclic group.

In the present specification, the "adjacent" group may mean a substituent substituted with an atom directly linked to an atom in which the corresponding substituent is substituted, a substituent disposed sterically closest to the corresponding substituent, or another substituent substituted with an atom in which the corresponding substituent is substituted. For example, two substituents substituted at the ortho position in a benzene ring and two substituents substituted with the same carbon in an aliphatic ring may be interpreted as groups which are "adjacent" to each other.

In the present specification, the "adjacent groups are bonded to each other to form a ring" among the substituents means that a substituent is bonded to an adjacent group to form a substituted or unsubstituted hydrocarbon ring; or a substituted or unsubstituted hetero ring.

In an exemplary embodiment of the present specification, X1, X2, X5, and X6 are the same as or different from each other, and are each independently a halogen group; a substituted or unsubstituted aryl group; a substituted or unsubstituted aryloxy group; a substituted or unsubstituted alkoxy group; a substituted or unsubstituted alkyl group; a substituted or unsubstituted alkynyl group; a substituted or unsubstituted ether group; a substituted or unsubstituted ester group; a substituted or unsubstituted arylalkyl group; or cyano group.

In an exemplary embodiment of the present specification, X1, X2, X5, and X6 are the same as or different from each other, and are each independently a halogen group; a cyano group; an aryloxy group unsubstituted or substituted with a nitro group; an alkynyl group unsubstituted or substituted with an aryl group; or an ester group unsubstituted or substituted with a haloalkyl group.

In an exemplary embodiment of the present specification, X1, X2, X5, and X6 are the same as or different from each other, and are each independently a halogen group; a cyano group; an aryloxy group unsubstituted or substituted with a nitro group; an ethynyl group unsubstituted or substituted with an aryl group; or an ester group substituted with a haloalkyl group.

In an exemplary embodiment of the present specification, X1, X2, X5, and X6 are the same as or different from each other, and are each independently fluorine; a cyano group; an ethynyl group substituted with an aryl group; a phenoxy group substituted with a nitro group; an ester group substituted with a trifluoromethyl group; or —C(=O)OR13, and R13 is a haloalkyl group.

In an exemplary embodiment of the present specification, a and b are 0, and L1 is a substituted or unsubstituted alkylene group having 1 to 30 carbon atoms; a substituted or unsubstituted arylene group having 10 to 30 carbon atoms; or a substituted or unsubstituted heterocyclic group having 2 to 30 carbon atoms.

In an exemplary embodiment of the present specification, a and b are 0, and L1 is a substituted or unsubstituted alkylene group having 1 to 20 carbon atoms; a substituted or unsubstituted arylene group having 10 to 30 carbon atoms; or a substituted or unsubstituted divalent heterocyclic group having 2 to 30 carbon atoms.

In an exemplary embodiment of the present specification, a and b are 0, and L1 is a substituted or unsubstituted methylene group; a substituted or unsubstituted ethylene group; a substituted or unsubstituted propylene group; a substituted or unsubstituted butylene group; a substituted or unsubstituted pentylene group; a substituted or unsubstituted biphenylene group; a substituted or unsubstituted naphthylene group; a substituted or unsubstituted anthracenylene group; a substituted or unsubstituted phenanthrenylene group; a substituted or unsubstituted pyrenylene group; a substituted or unsubstituted fluorenylene group; a substituted or unsubstituted pyridinylene group; a substituted or unsubstituted pyrrolylene group; a substituted or unsubstituted furanylene group; a substituted or unsubstituted thiophenylene group; a substituted or unsubstituted dibenzofuranylene group; a substituted or unsubstituted carbazolylene group; or a substituted or unsubstituted azophenylene group.

In an exemplary embodiment of the present specification, a and b are 0, and L1 is a substituted or unsubstituted methylene group; a substituted or unsubstituted ethylene group; a substituted or unsubstituted propylene group; a substituted or unsubstituted naphthylene group; a substituted or unsubstituted fluorenylene group; a substituted or unsubstituted furanylene group; a substituted or unsubstituted thiophenylene group; a substituted or unsubstituted dibenzothiophenylene group; a substituted or unsubstituted dibenzofuranylene group; a substituted or unsubstituted carbazolylene group; or a substituted or unsubstituted azophenylene group.

In an exemplary embodiment of the present specification, a and b are 0, and L1 is a substituted or unsubstituted methylene group; a substituted or unsubstituted ethylene group; a substituted or unsubstituted propylene group; a substituted or unsubstituted naphthylene group; a substituted or unsubstituted fluorenylene group; a substituted or unsubstituted thiophenylene group; a substituted or unsubstituted dibenzofuranylene group; a carbazolylene group unsubstituted or substituted with an aryl group; or a azophenylene group.

In an exemplary embodiment of the present specification, a and b are 0, and L1 is a propylene group substituted with an alkyl group; a naphthylene group; a fluorenylene group; a thiophenylene group; a dibenzofuranylene group; a carbazolylene group unsubstituted or substituted with a phenyl group;

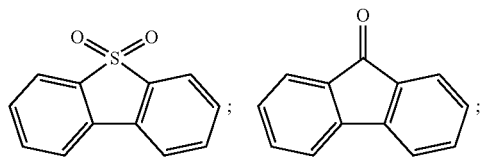

or an azophenylene group.

In an exemplary embodiment of the present specification, a and b are an integer of 1 or higher, L1 and L3 are the same as or different from each other, and are a substituted or unsubstituted arylene group having 6 to 30 carbon atoms, and L2 is a substituted or unsubstituted alkylene group having 1 to 20 carbon atoms; —C(=O)—, —O—, or —NR—, and here, R is hydrogen; deuterium; or a substituted or unsubstituted alkyl group having 1 to 20 carbon atoms.

In an exemplary embodiment of the present specification, when a and b are 1 or higher, L1 and L3 are a substituted or unsubstituted alkylene group having 1 to carbon atoms; a substituted or unsubstituted arylene group having 6 to 30 carbon atoms; or a substituted or unsubstituted heterocyclic group having 2 to 30 carbon atoms, L2 is a substituted or unsubstituted alkylene group having 1 to 30 carbon atoms; —C(=O)—; —O—; —S—; —SO2—; —NR—; or —CRR'—, and here, R and R' are the same as or different from each other, and are each independently hydrogen; deuterium; or a substituted or unsubstituted alkyl group.

In an exemplary embodiment of the present specification, when a and b are 1 or higher, L1 and L3 are a substituted or unsubstituted alkylene group having 1 to carbon atoms; a substituted or unsubstituted arylene group having 6 to 30 carbon atoms; or a substituted or unsubstituted divalent heterocyclic group having 2 to 30 carbon atoms, L2 is a substituted or unsubstituted alkylene group having 1 to 20 carbon atoms; —C(=O)—; —O—; —S—; —SO2—; —NR—; or —CRR'—, and here, R and R' are the same as or different from each other, and are each independently hydrogen; deuterium; or a substituted or unsubstituted alkyl group.

In an exemplary embodiment of the present specification, when a and b are 1 or higher, L1 and L3 are a substituted or unsubstituted arylene group having 6 to 30 carbon atoms, L2 is a substituted or unsubstituted alkylene group having 1 to 20 carbon atoms; —C(=O)—; —O—; —S—; —SO2—; —NR—; or —CRR'—, and here, R and R' are the same as or different from each other, and are each independently hydrogen; deuterium; or a substituted or unsubstituted alkyl group having 1 to 20 carbon atoms.

In an exemplary embodiment of the present specification, when a and b are 1 or higher, L1 and L3 are a substituted or unsubstituted phenylene group; a substituted or unsubstituted naphthylene group; a substituted or unsubstituted anthracenylene group; a substituted or unsubstituted phenanthrenylene group; or a substituted or unsubstituted pyrenylene group, L2 is a substituted or unsubstituted alkylene group having 1 to 20 carbon atoms; —C(=O)—; —O—; —S—; —NR—; or —CRR'—, and here, R and R' are the same as or different from each other, and are each independently hydrogen; deuterium; or a substituted or unsubstituted alkyl group having 1 to 20 carbon atoms.

In an exemplary embodiment of the present specification, when a and b are 1 or higher, L1 and L3 are a substituted or unsubstituted phenylene group; a substituted or unsubstituted naphthylene group; or a substituted or unsubstituted anthracenylene group, L2 is a substituted or unsubstituted methylene group; a substituted or unsubstituted ethylene group; a substituted or unsubstituted propylene group; —C(=O)—; —O—; —S—; —NR—; or —CRR'—, and here, R and R' are the same as or different from each other, and are each independently hydrogen; deuterium; or a substituted or unsubstituted alkyl group having 1 to 20 carbon atoms.

In an exemplary embodiment of the present specification, R1 to R12 are the same as or different from each other, and are each independently hydrogen; deuterium; a cyano group; a halogen group; a substituted or unsubstituted cycloalkyl group; a substituted or unsubstituted alkoxy group; a substituted or unsubstituted alkyl group; a substituted or unsubstituted ester group; a substituted or unsubstituted haloalkyl group; a substituted or unsubstituted aryl group; or a substituted or unsubstituted heterocyclic group.

In an exemplary embodiment of the present specification, R1 to R12 are the same as or different from each other, and are each independently hydrogen; deuterium; a cyano group; a halogen group; a substituted or unsubstituted cycloalkyl group having 3 to 30 carbon atoms; a substituted or unsubstituted alkoxy group having 1 to 30 carbon atoms; a substituted or unsubstituted alkyl group having 1 to 30 carbon atoms; a substituted or unsubstituted ester group having 1 to 25 carbon atoms; a substituted or unsubstituted haloalkyl group; a substituted or unsubstituted aryl group having 6 to 30 carbon atoms; or a substituted or unsubstituted heterocyclic group having 2 to 30 carbon atoms.

In an exemplary embodiment of the present specification, R1 to R12 are the same as or different from each other, and are each independently hydrogen; deuterium; a cyano group; a halogen group; a substituted or unsubstituted cycloalkyl group having 3 to 30 carbon atoms; a substituted or unsubstituted alkoxy group having 1 to 30 carbon atoms; a substituted or unsubstituted alkyl group having 1 to 20 carbon atoms; an ester group having 1 to 25 carbon atoms, which is unsubstituted or substituted with a heterocyclic group; a substituted or unsubstituted trifluoromethyl group; an aryl group having 6 to 30 carbon atoms, which is unsubstituted or substituted with an alkyl group or an alkoxy group; or a substituted or unsubstituted furanyl group.

In an exemplary embodiment of the present specification, R1 to R12 are the same as or different from each other, and are each independently hydrogen; deuterium; a cyano group; a halogen group; a substituted or unsubstituted cyclohexyl group; a substituted or unsubstituted methoxy group; a substituted or unsubstituted ethoxy group; a substituted or unsubstituted alkyl group having 1 to 20 carbon atoms; an ester group having 1 to 25 carbon atoms, which is substituted with a hetero ring; a trifluoromethyl group; an aryl group having 6 to 30 carbon atoms, which is unsubstituted or substituted with fluorine, an alkyl group or a methoxy group; or a substituted or unsubstituted furanyl group.

In an exemplary embodiment of the present specification, R1 to R12 are the same as or different from each other, and are each independently hydrogen; deuterium; a cyano group; fluorine; chlorine; a substituted or unsubstituted cyclohexyl group; a methoxy group; an ethoxy group; an alkyl group having 1 to 20 carbon atoms; an ester group having 1 to 25 carbon atoms, which is substituted with a chromene group

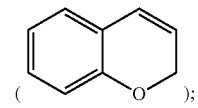

a trifluoromethyl group; a phenyl group unsubstituted or substituted with fluorine, an alkyl group or a methoxy group; or a furanyl group.

In an exemplary embodiment of the present specification, Formula 1 is represented by the following structural formulae.

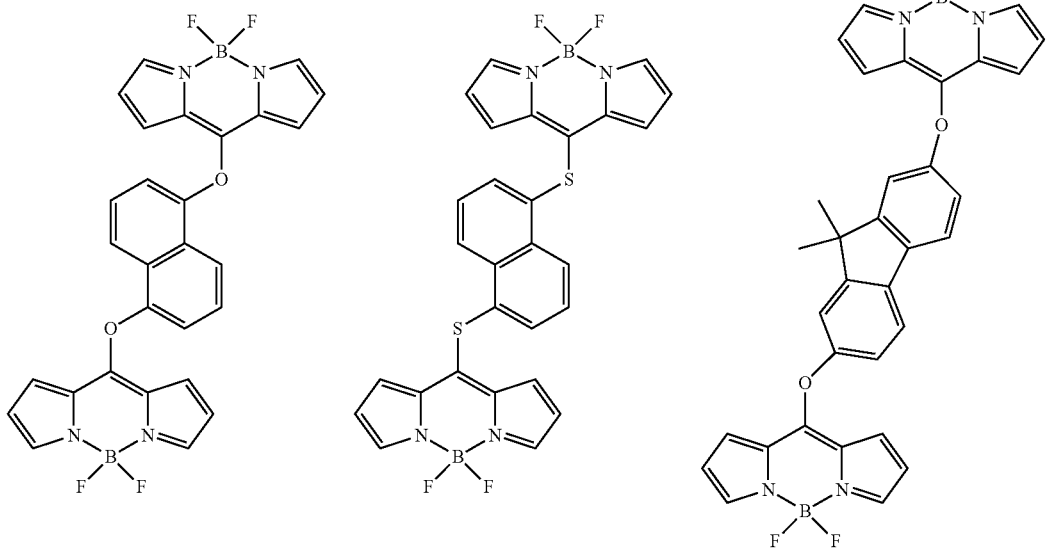

11
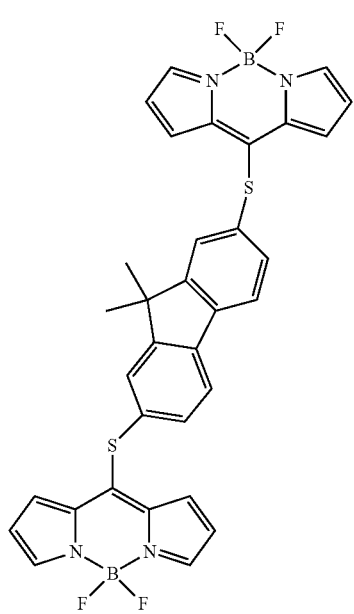
-continued
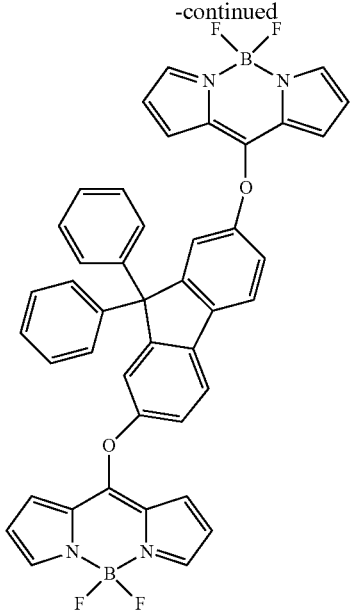
12
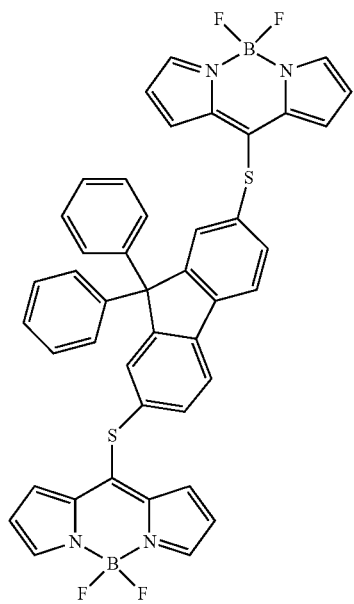
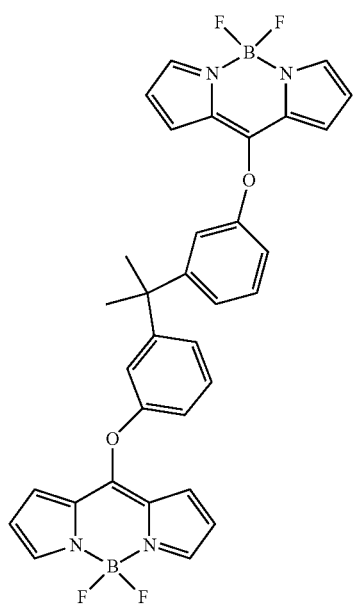
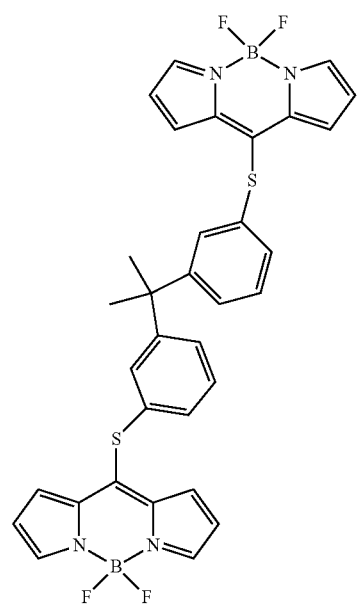
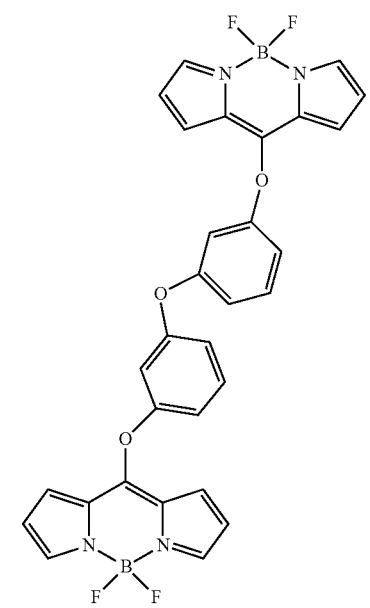

13
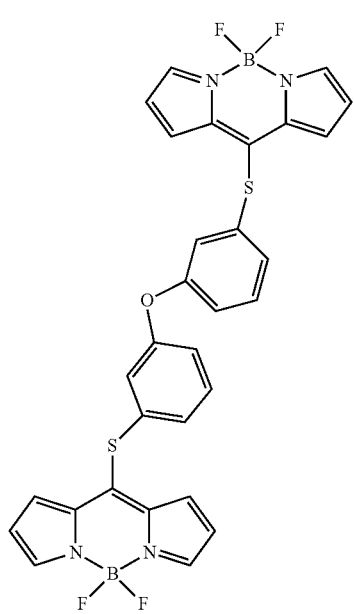
-continued
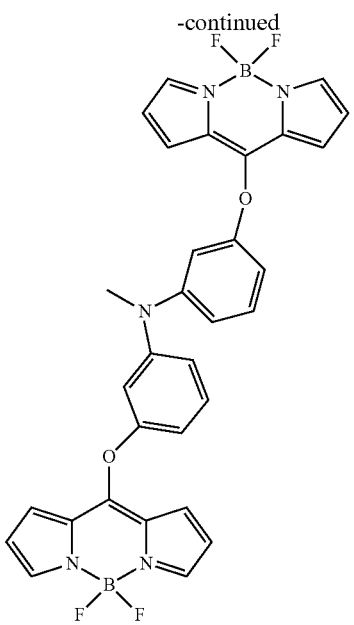
14
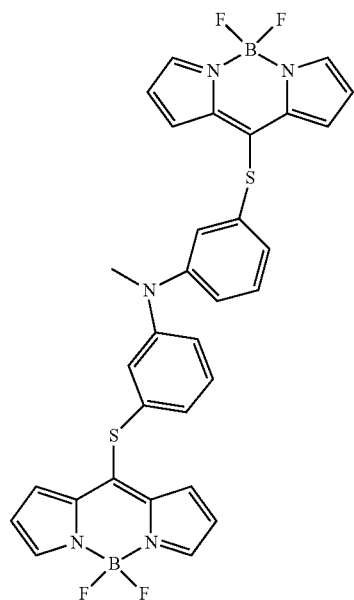
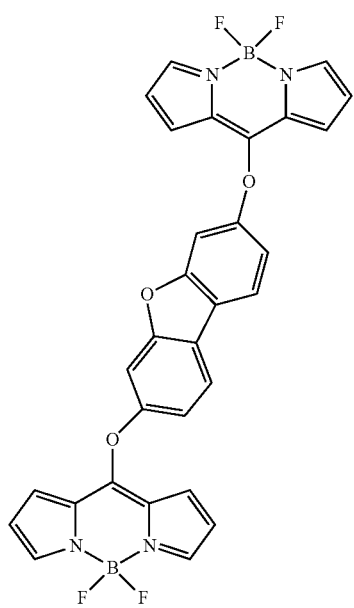
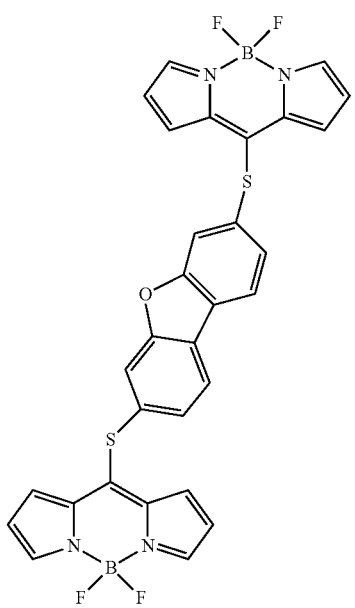
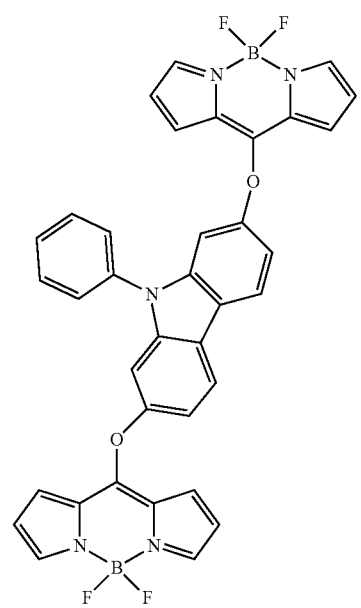

-continued
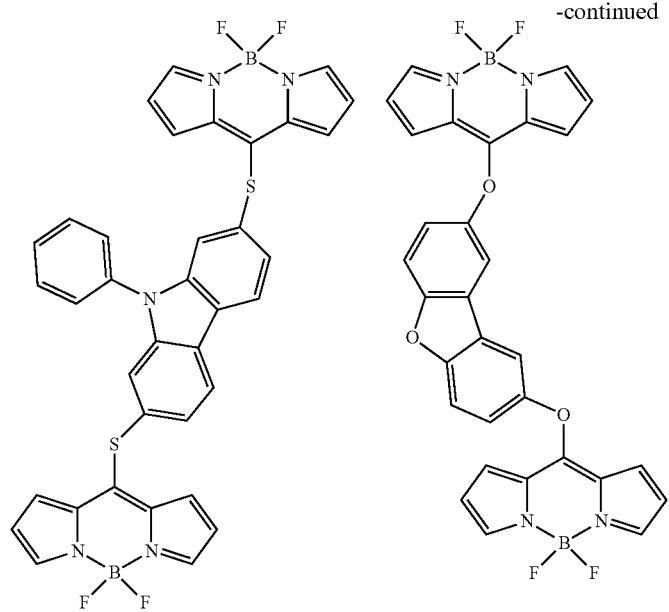
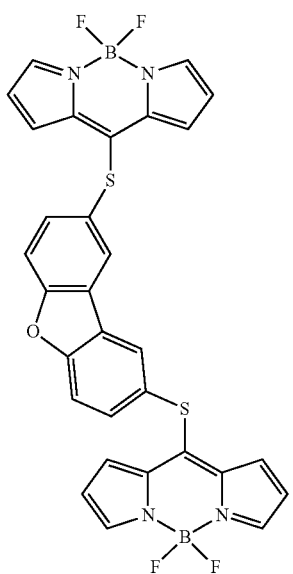
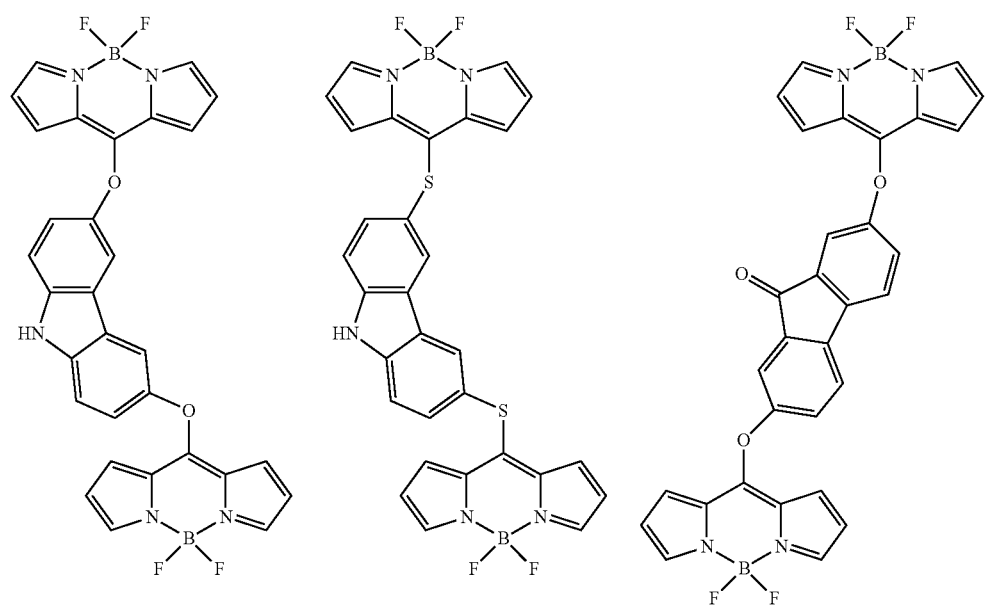

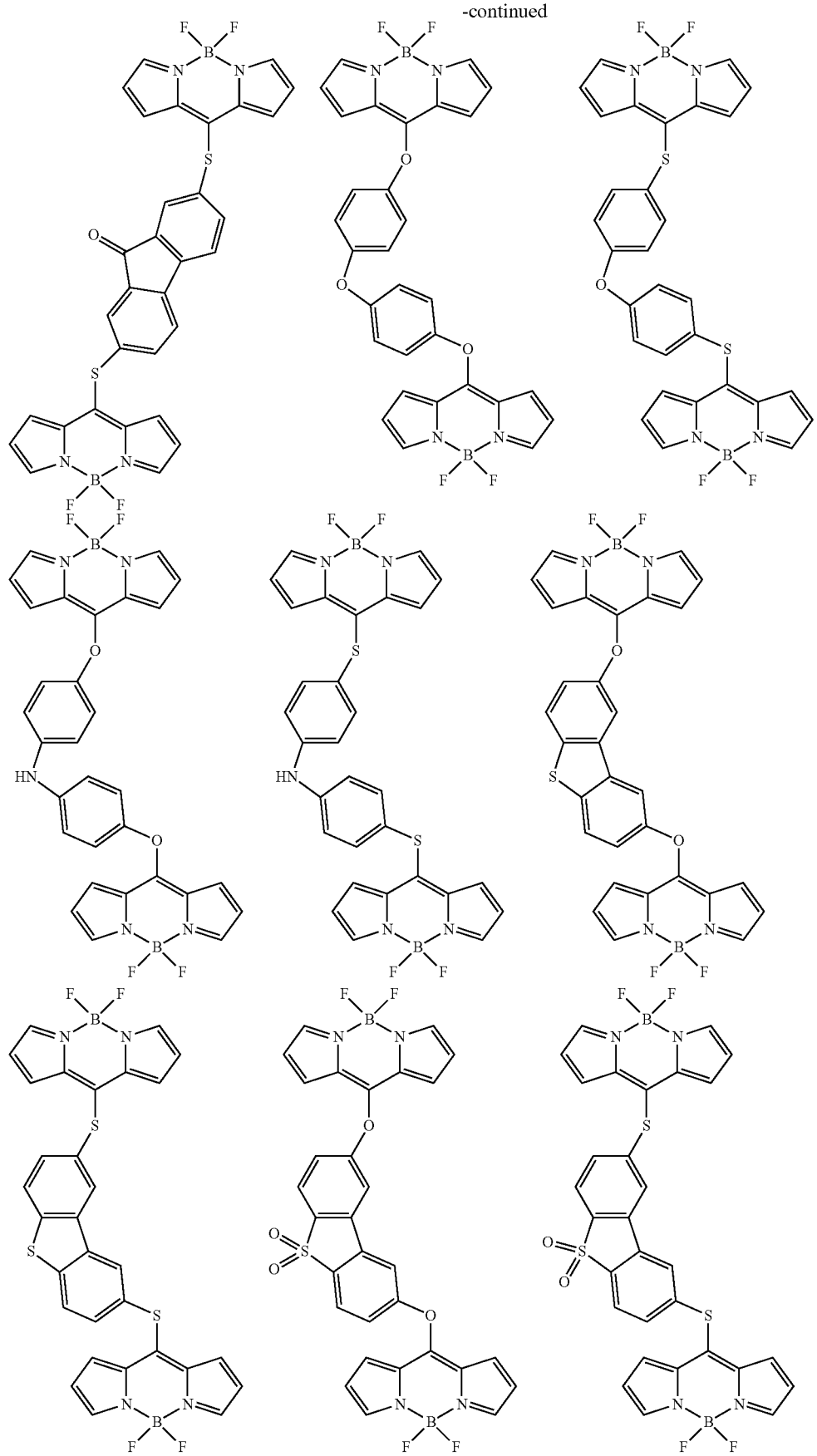

-continued
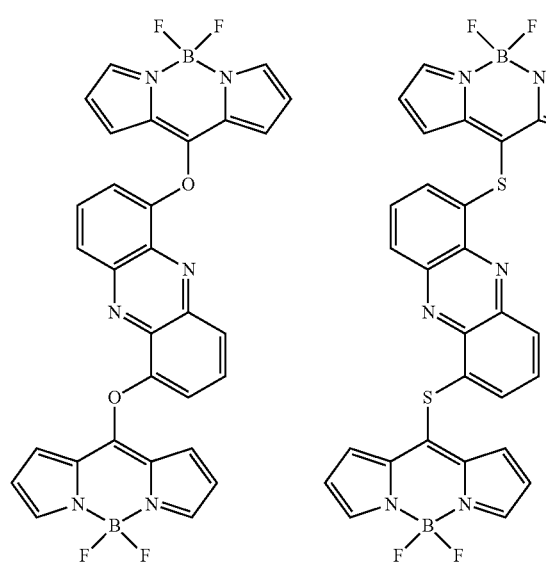
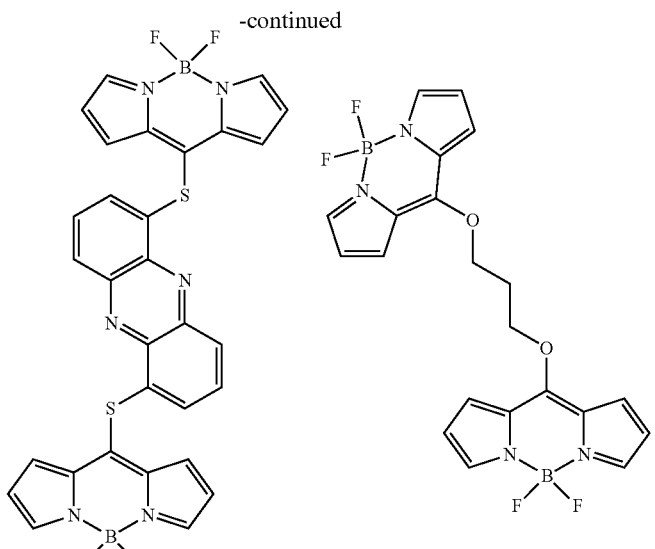
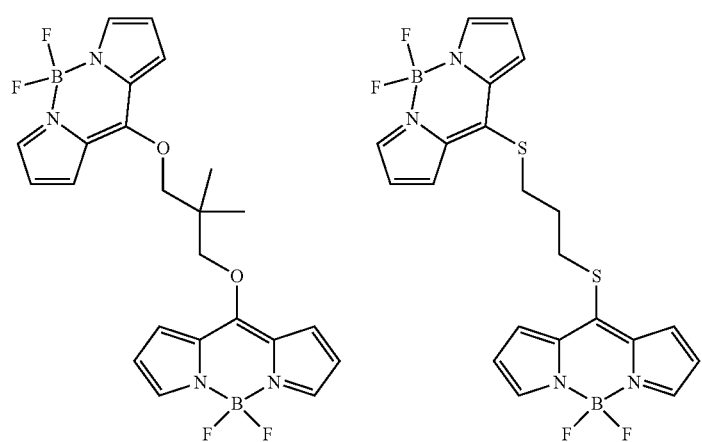
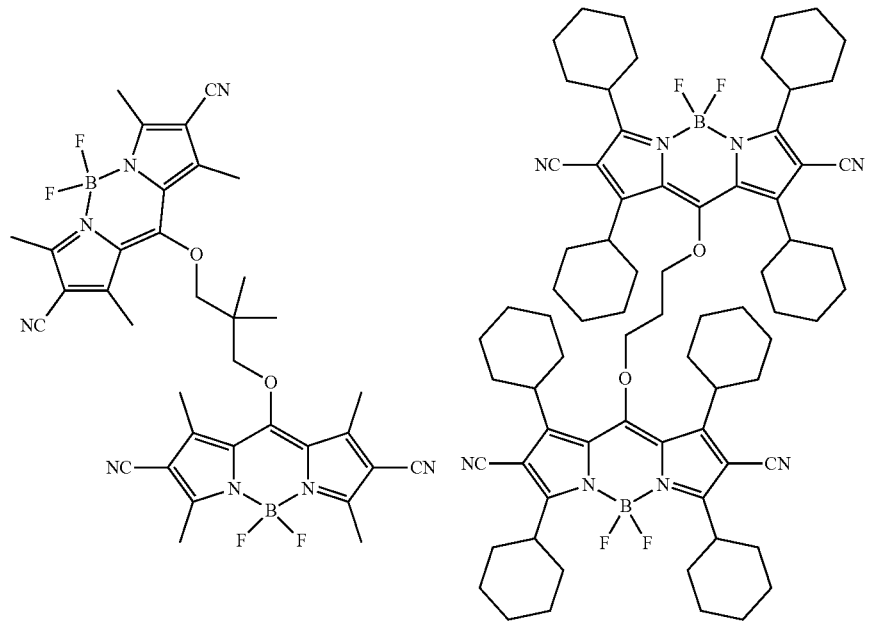

21
-continued
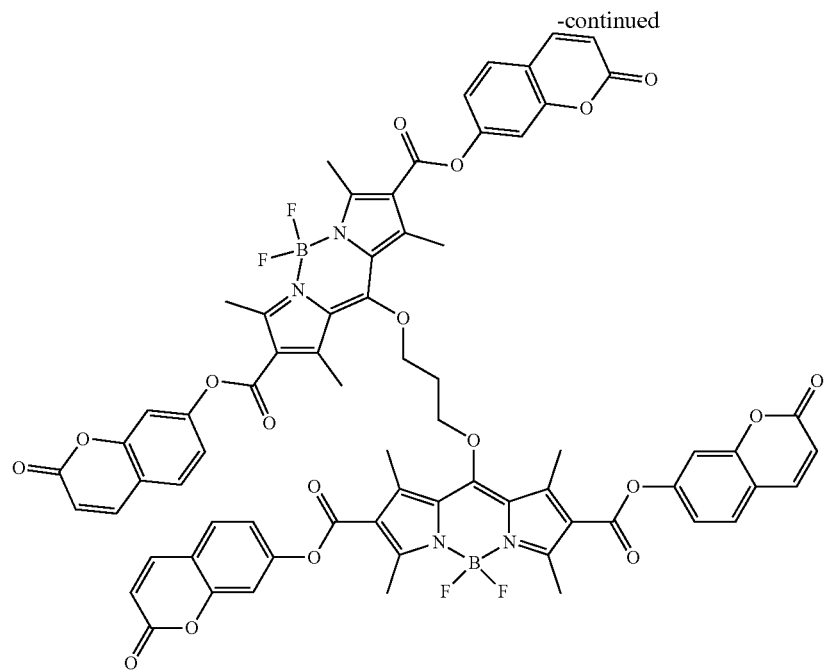
22
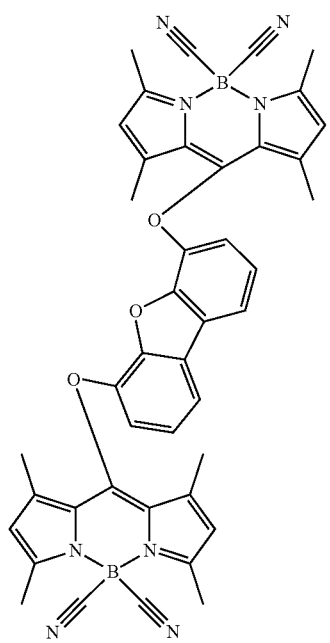
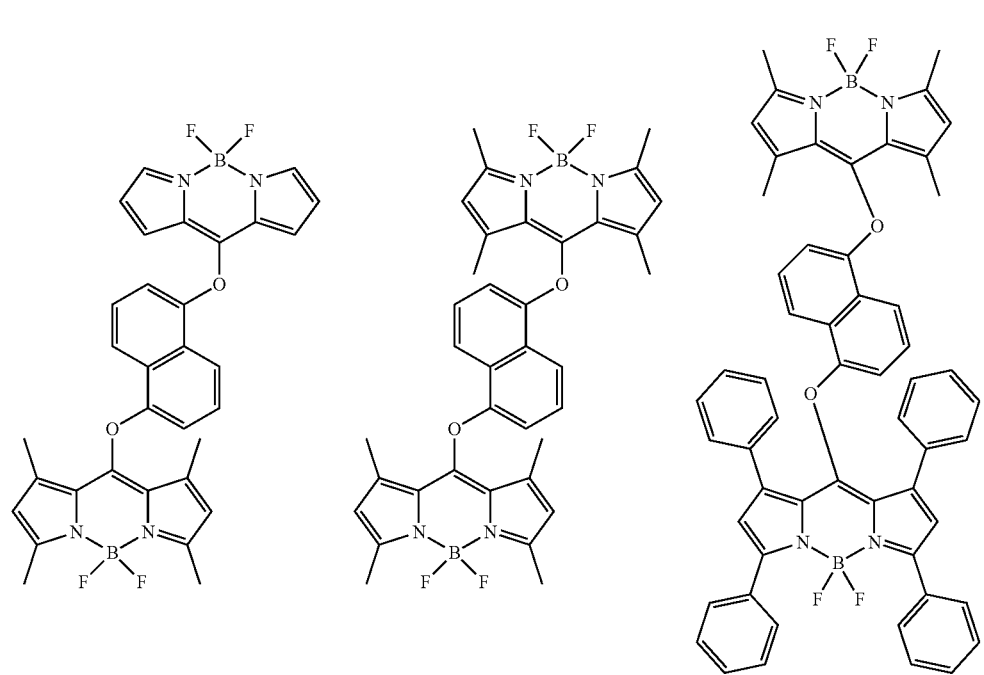

-continued
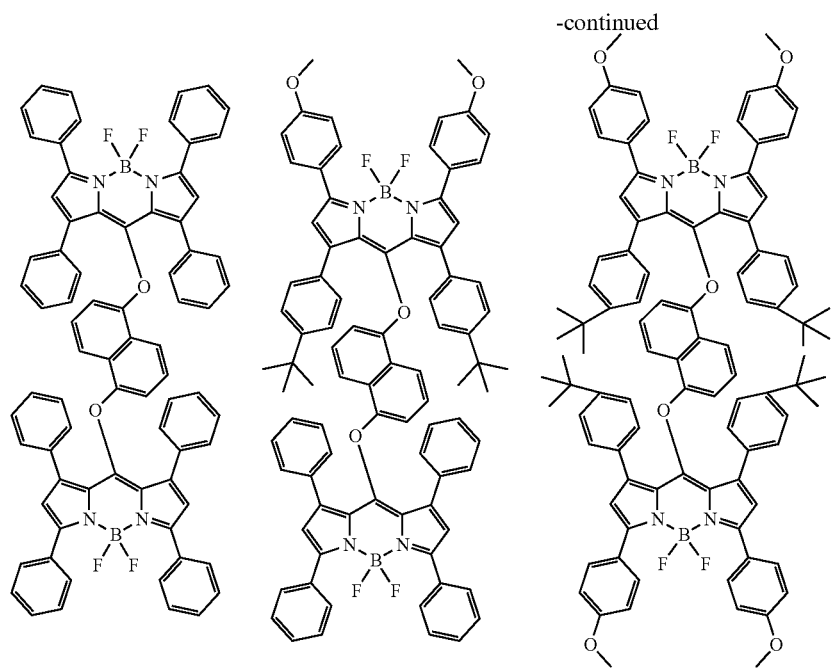
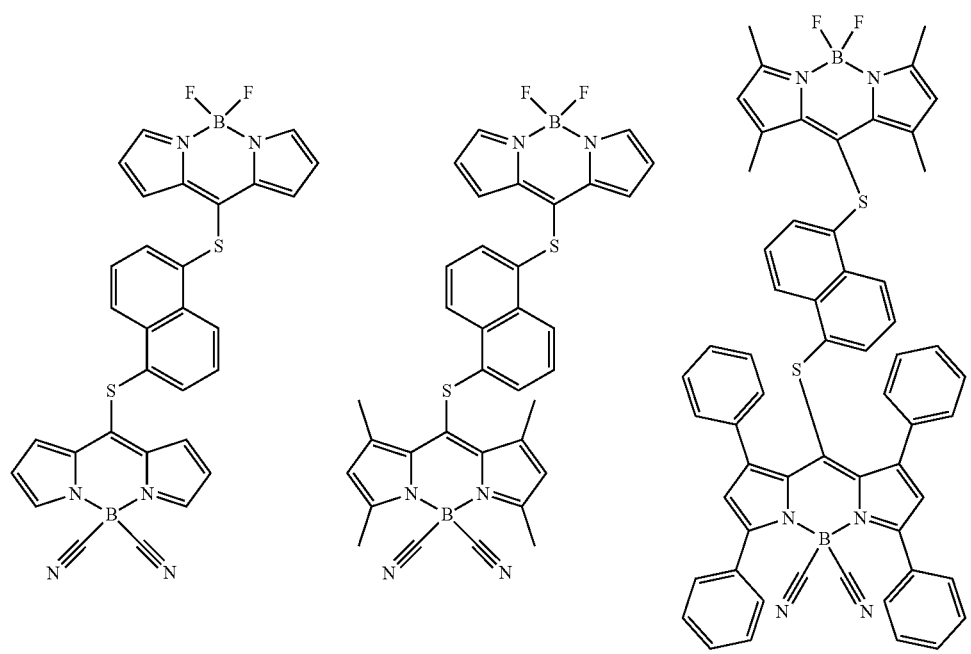

-continued
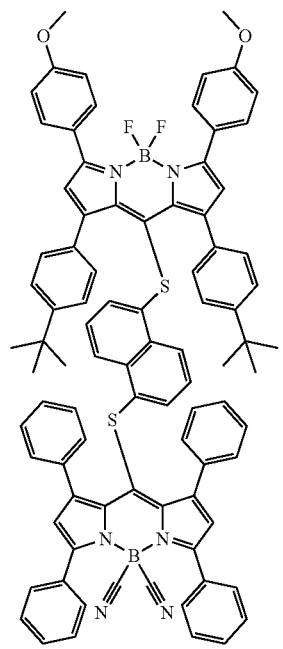 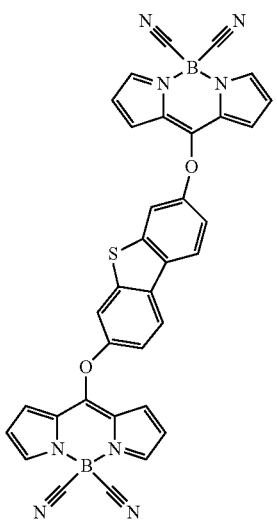 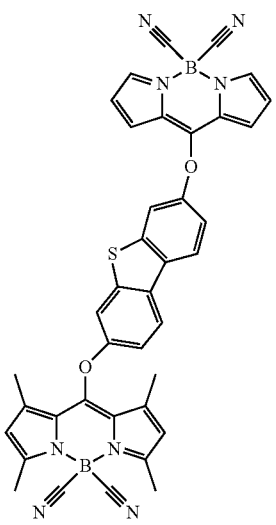 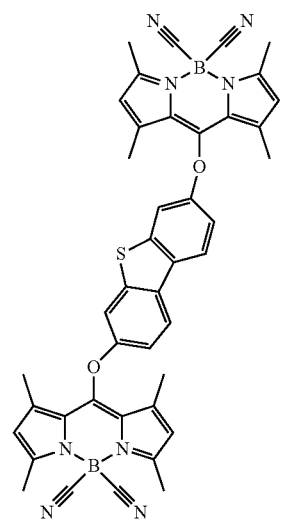
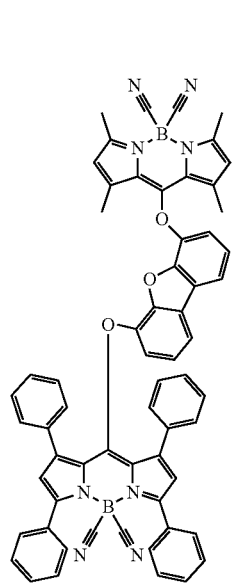 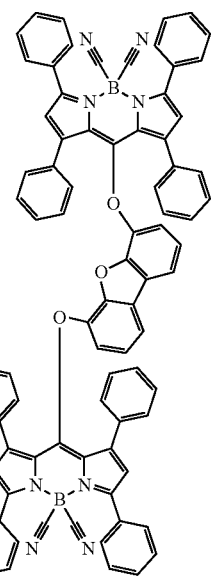 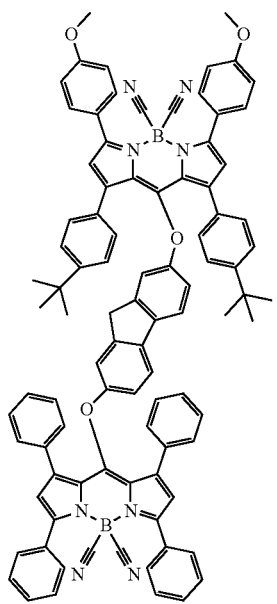 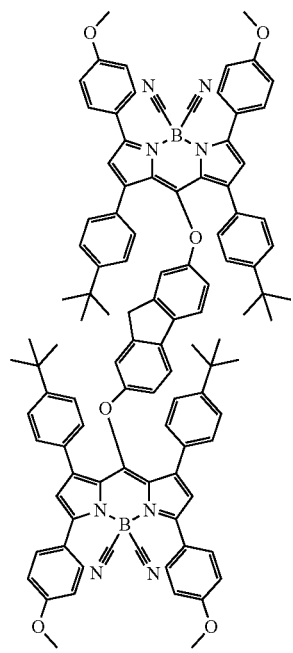

-continued
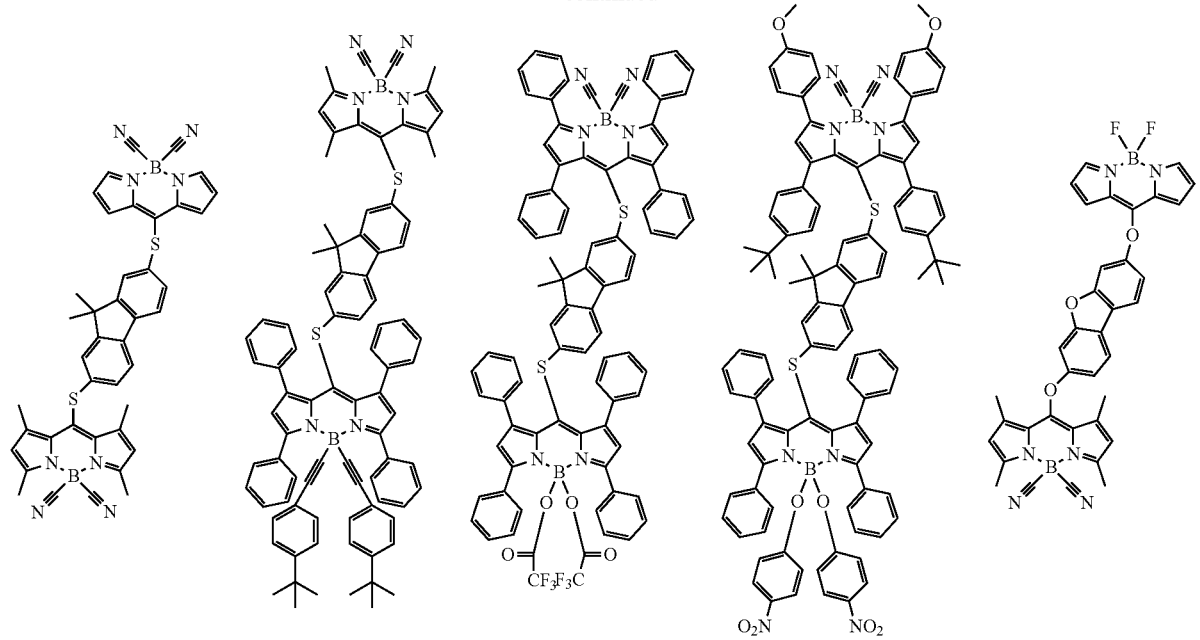
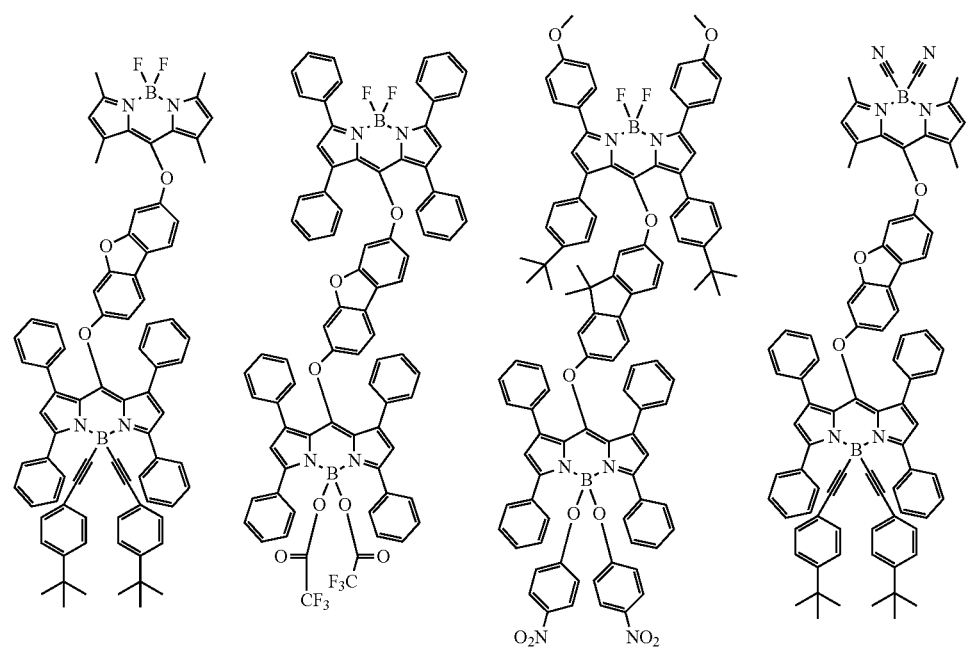

-continued
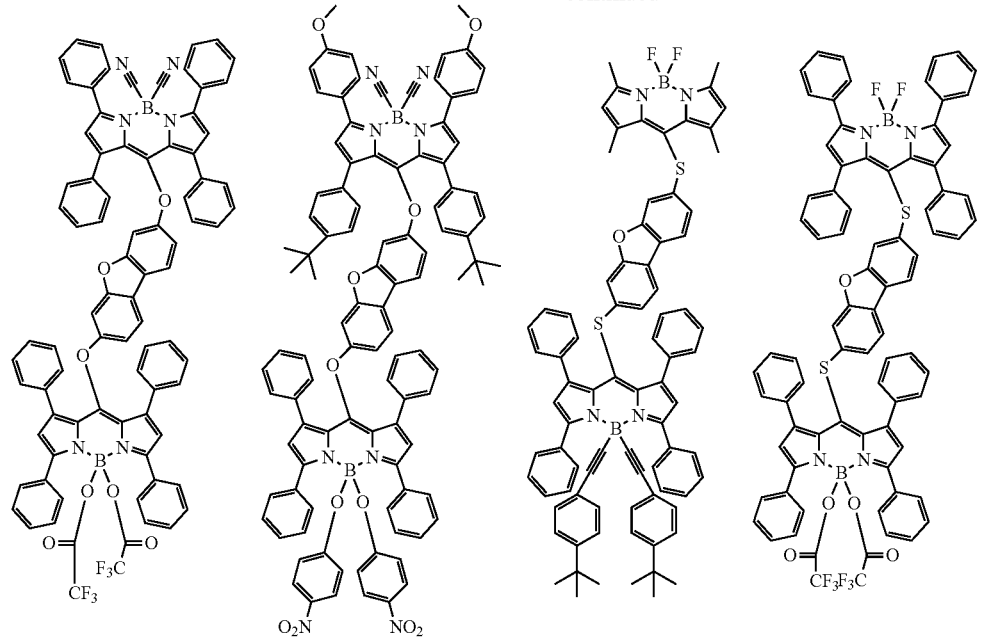
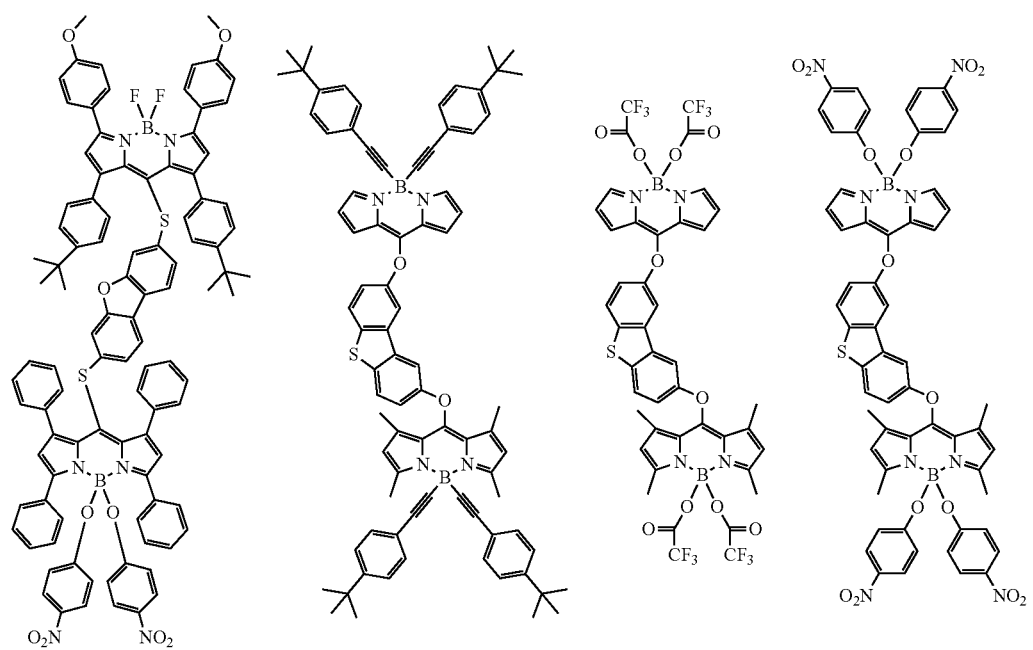

-continued
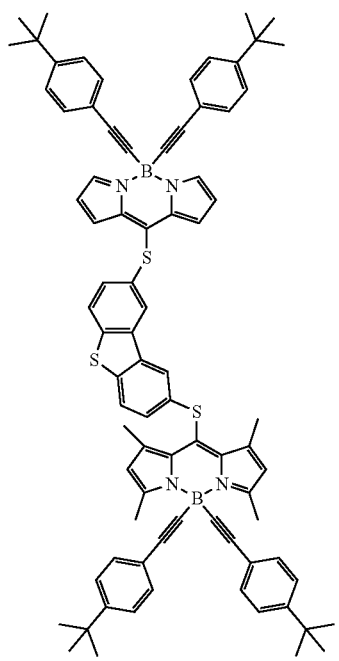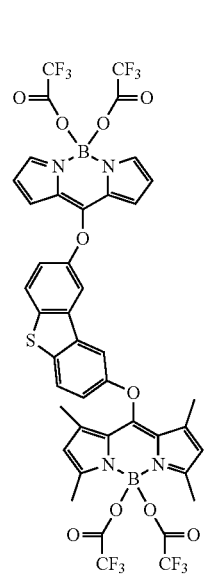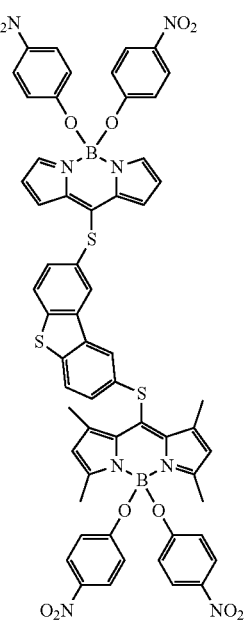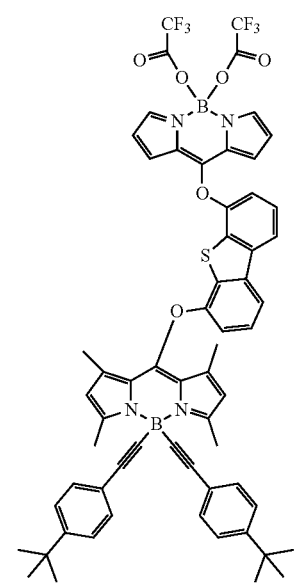
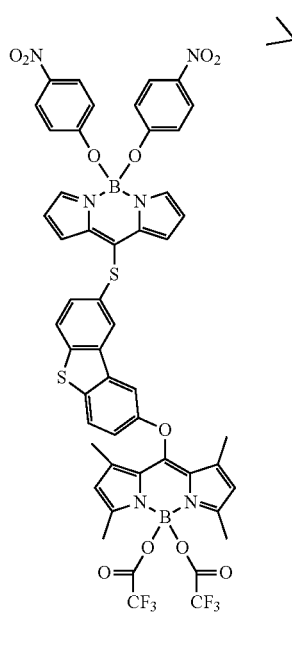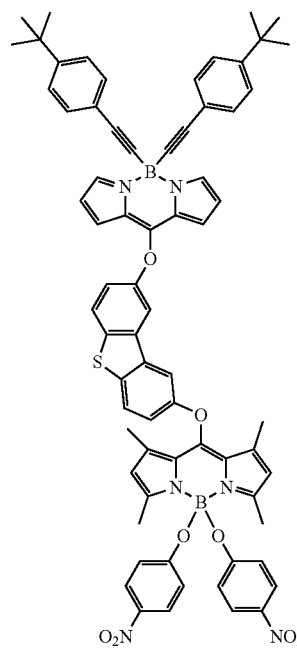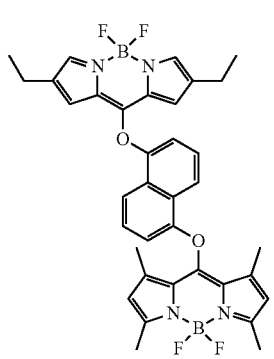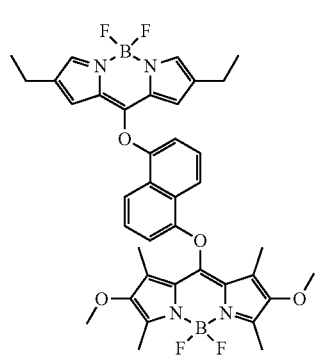

-continued
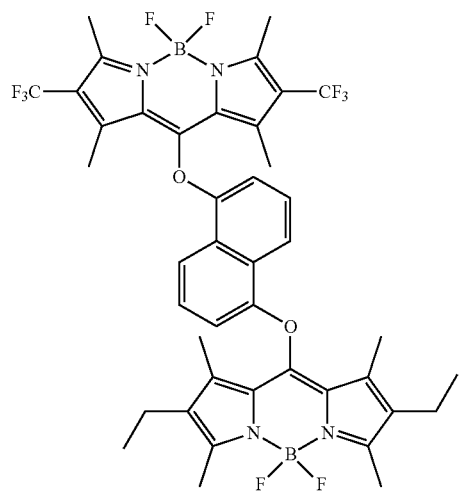
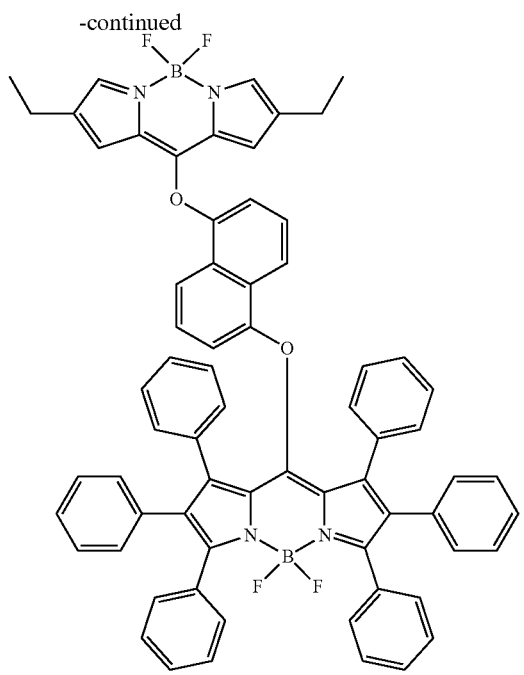
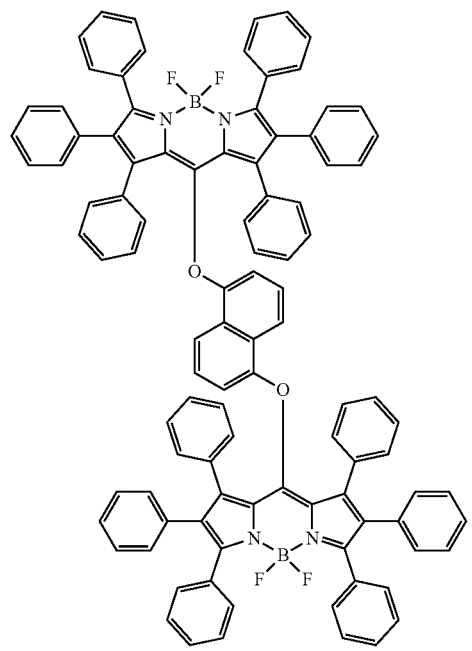
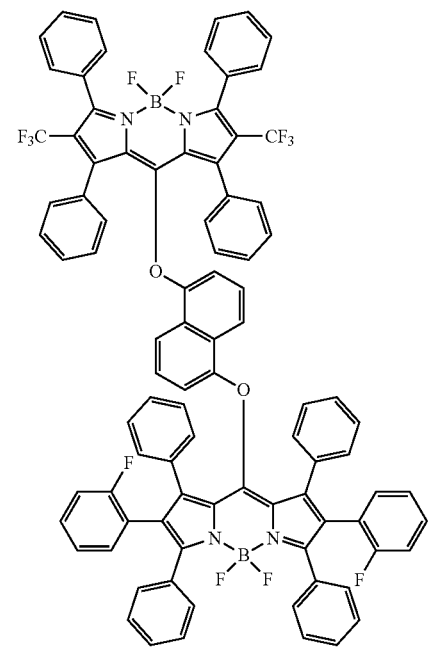

35
-continued
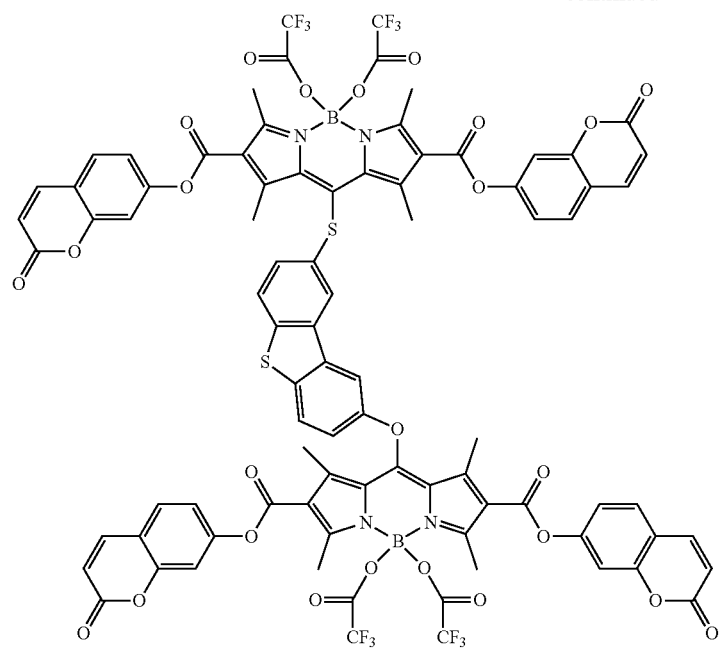
36
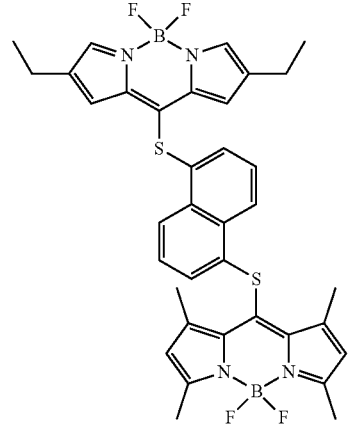
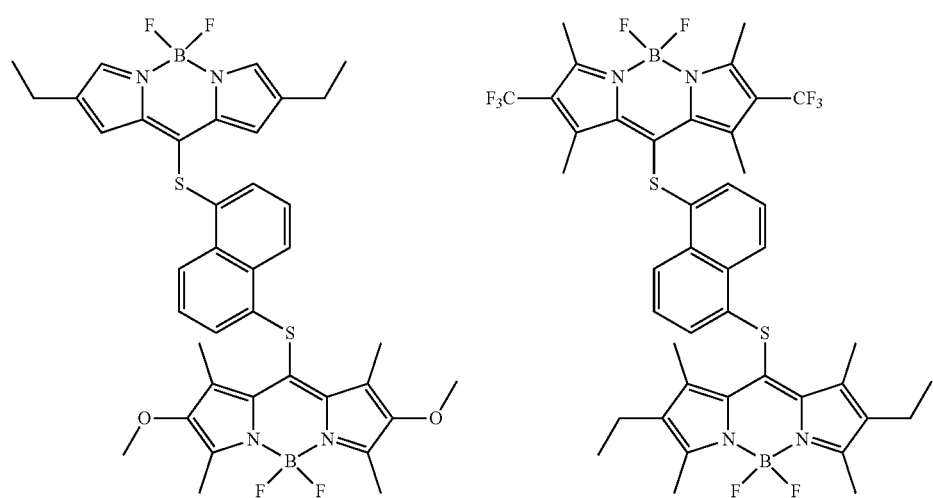

-continued
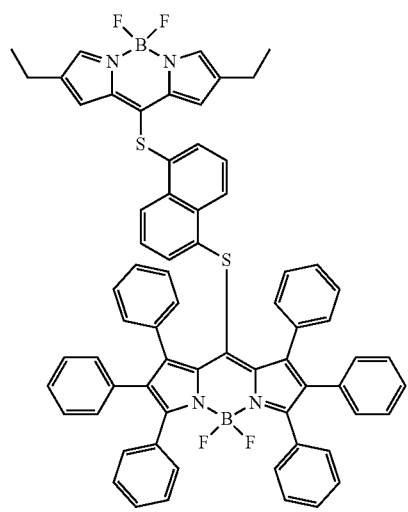
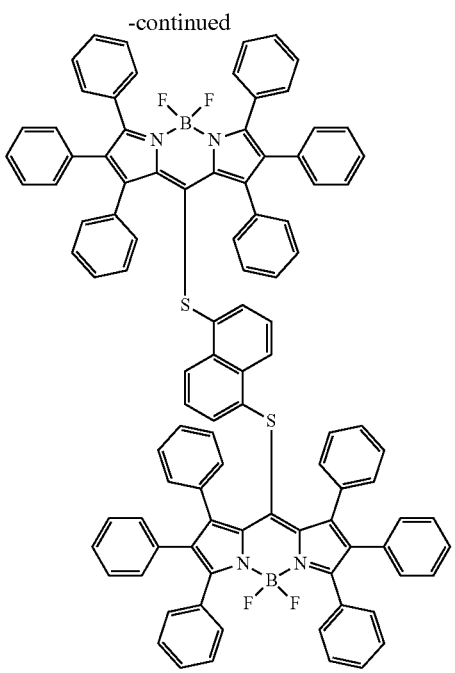
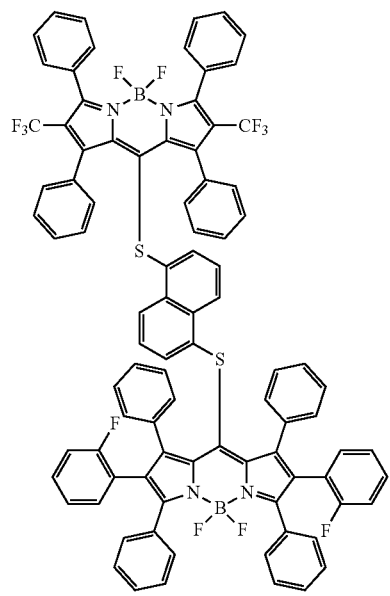
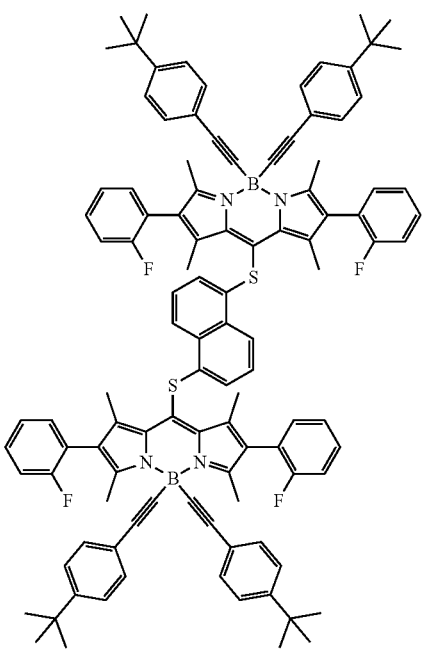

-continued
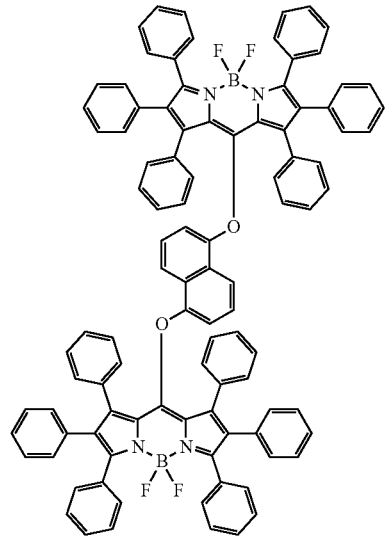
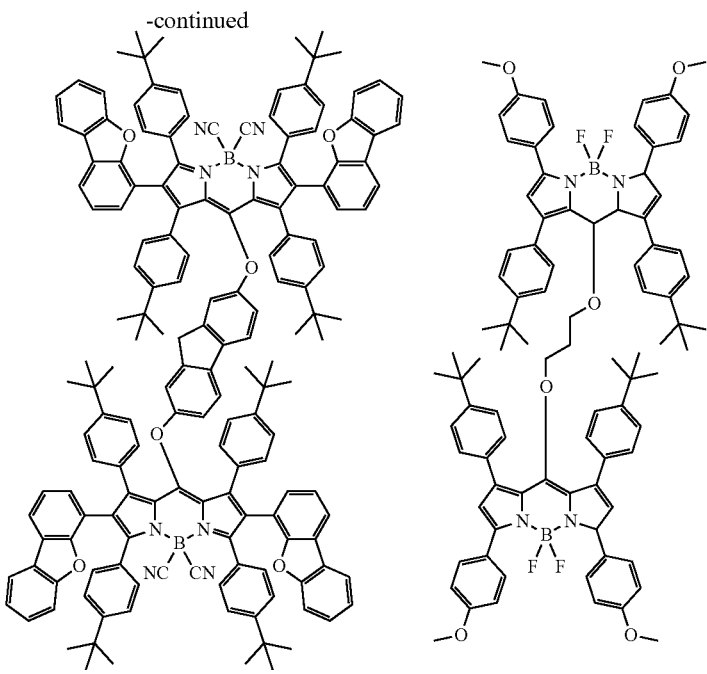
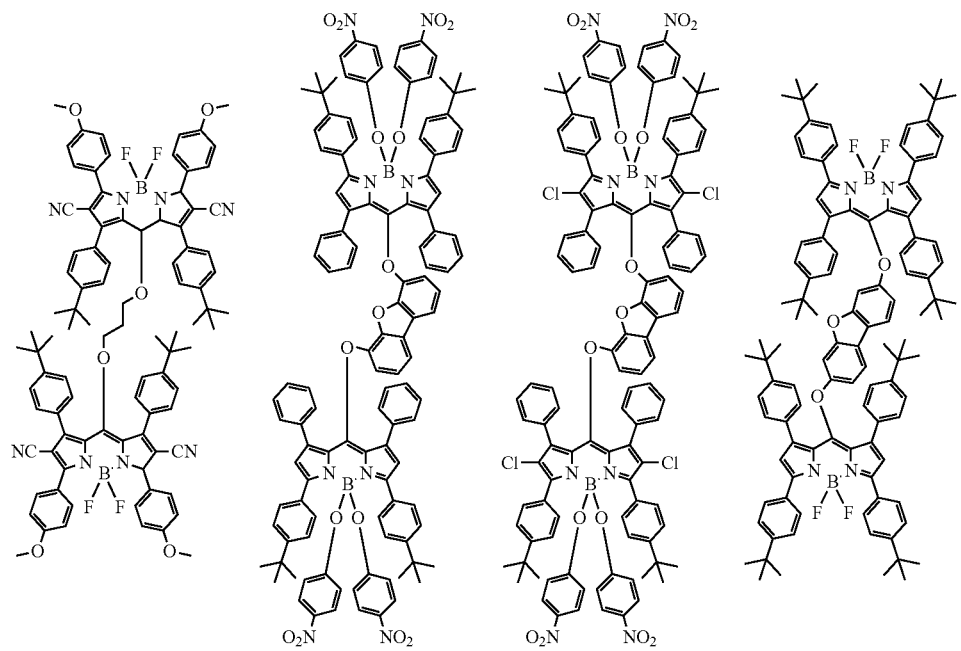

-continued

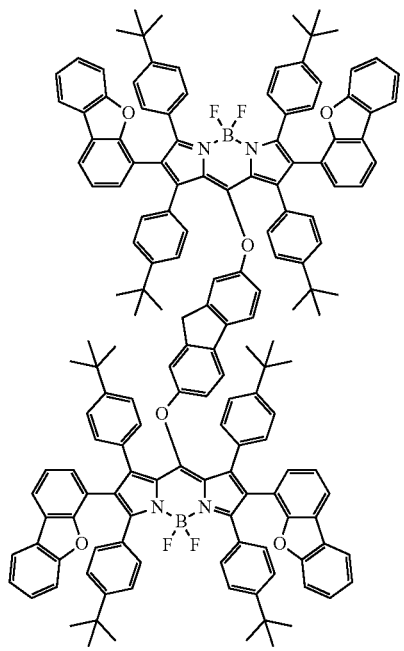

An exemplary embodiment of the present specification provides a color conversion film including: a resin matrix; and the compound represented by Formula 1, which is dispersed in the resin matrix.

According to an exemplary embodiment of the present specification, the maximum light emission peak of the compound represented by Formula 1 in a film state is present within 500 nm to 550 nm. The compound described above emits green light.

According to an exemplary embodiment of the present specification, the maximum light emission peak of the compound represented by Formula 1 in a film state is present within 500 nm to 550 nm, and the full width at half maximum of the light emission peak is 50 nm or less. In the case of having a narrow full width at half maximum as described above, the color gamut may be further increased. In this case, the narrower full width at half maximum of the light emission peak of the compound represented by Formula 1 is preferred.

According to an exemplary embodiment of the present specification, the maximum light emission peak of the compound represented by Formula 1 in a film state is present within 600 nm to 650 nm. The compound described above emits red light.

According to an exemplary embodiment of the present specification, the maximum light emission peak of the compound represented by Formula 1 in a film state is present within 600 nm to 650 nm, and the full width at half maximum of the light emission peak is 60 nm or less. In the case of having a narrow full width at half maximum as described above, the color gamut may be further increased. In this case, the full width at half maximum of the light emission peak of the compound represented by Formula 1 may be 5 nm or more.

According to an exemplary embodiment of the present specification, the compound represented by Formula 1 has quantum efficiency of 0.8 or more.

In the present specification, "a film state" does not mean a solution state, but means a state prepared in the form of a film by using the compound represented by Formula 1 alone or mixing the compound represented by Formula 1 with other components which does not affect the measurement of the full width at half maximum and the quantum efficiency.

In the present specification, the full width at half maximum means a width of the light emission peak when the height is half the maximum height at the maximum light emission peak of light emitted from the compound represented by Formula 1.

In the present specification, the quantum efficiency may be measured by using a method known in the art, and may be measured by using, for example, an integrating sphere.

The content of the compound represented by Formula 1 in the color conversion film may be within a range of 0.001 wt % to 10 wt % based on the total weight of the color conversion film.

The color conversion film may include one or two or more of the compounds represented by Formula 1.

The color conversion film may further include an additional fluorescent material in addition to the compound represented by Formula 1. When a light source which emits blue light is used, it is preferred that the color conversion film includes both a fluorescent material which emits green light and a fluorescent material which emits red light. Further, when a light source which emits blue light and green light is used, the color conversion film may include only a fluorescent material which emits red light. However, the color conversion film is not limited thereto, and even when a light source which emits blue light is used, the color conversion film may include only a compound, which emits red light, in the case where a separate film including a fluorescent material which emits green light is stacked. Conversely, even when a light source which emits blue light is used, the color conversion film may include only a compound, which emits green light, in the case where a separate film including a fluorescent material which emits red light is stacked.

The color conversion film may further include a resin matrix; and an additional layer including a compound which is dispersed in the resin matrix and emits light having a wavelength different from that of the compound represented by Formula 1. The compound which emits light having a wavelength different from that of the compound represented by Formula 1 may also be the compound expressed as Formula 1, and may also be another publicly-known fluorescent material.

It is preferred that a material for the resin matrix is a thermoplastic polymer or a thermosetting polymer. Specifically, as the material for the resin matrix, it is possible to use a poly(meth)acrylic material such as polymethylmethacrylate (PMMA), a polycarbonate (PC)-based material, a polystyrene (PS)-based material, a polyarylene (PAR)-based material, a polyurethane (PU)-based material, a styrene-acrylonitrile (SAN)-based material, a polyvinylidenefluoride (PVDF)-based material, a modified-polyvinylidenefluoride (modified-PVDF)-based material, and the like.

According to an exemplary embodiment of the present specification, the color conversion film according to the above-described exemplary embodiment additionally includes light diffusion particles. By dispersing light diffusion particles in the color conversion film instead of a light diffusion film used in the related art in order to improve brightness, an attaching process may be omitted, and higher brightness may be exhibited as compared to the case where a separate light diffusion film is used.

As the light diffusion particle, a particle having a refractive index higher than a resin matrix may be used, and it is possible to use, for example, $TiO_2$, silica, borosilicate, alumina, sapphire, air or another gas, air- or gas-filled hollow beads or particles (for example, air/gas-filled glass or polymer); polymer particles including polystyrene, polycarbonate, polymethylmethacrylate, acryl, methyl methacrylate, styrene, a melamine resin, a formaldehyde resin, or a melamine and formaldehyde resin, or any suitable combination thereof.

The particle diameter of the light diffusion particles may be within a range of 0.1 μm to 5 μm, for example, within a range of 0.3 μm to 1 μm. The content of the light diffusion particles may be determined, if necessary, and may be, for example, within a range of about 1 part by weight to about 30 parts by weight based on 100 parts by weight of the resin matrix.

The color conversion film according to the above-described exemplary embodiment may have a thickness of 2 μm to 200 μm. In particular, the color conversion film may exhibit high brightness even in a small thickness of 2 μm to 20 μm. This is because the content of the fluorescent material molecule included in a unit volume is higher than that of a quantum dot.

A base material may be provided on one surface of the color conversion film according to the above-described exemplary embodiment. The base material may function as a support when preparing the color conversion film. The kind of base material is not particularly limited, and the material or thickness of the base material is not limited as long as the base material is transparent and may function as the support. Here, transparency means that the transmittance of visible light is 70% or more. For example, as the base material, a PET film may be used.

The above-described color conversion film may be prepared by coating a resin solution, in which the above-described compound represented by Formula 1 is dissolved, on a base material and drying the resin solution, or extruding the above-described compound represented by Formula 1 together with the resin to produce a film.

Since the above-described compound represented by Formula 1 is dissolved in the resin solution, the compound represented by Formula 1 is uniformly distributed in the solution. This is different from a process of preparing a quantum dot film, which requires a separate dispersing process.

The preparation method of the resin solution in which the compound represented by Formula 1 is dissolved is not particularly limited as long as the above-described compound represented by Formula 1 is in a state where the resin is dissolved in the solution.

According to an example, the resin solution in which the compound represented by Formula 1 is dissolved may be prepared by a method including: dissolving the compound represented by Formula 1 in a solvent to prepare a first solution, dissolving a resin in a solvent to prepare a second solution, and mixing the first solution with the second solution. When the first solution and the second solution are mixed, it is preferred to uniformly mix the solutions. However, the method is not limited thereto, and it is possible to use a method of simultaneously adding a compound represented by Formula 1 and a resin to a solvent to dissolve the compound and the resin, a method of dissolving the compound represented by Formula 1 in a solvent, and subsequently adding the resin thereto to dissolve the resin, a method of dissolving the resin in a solvent, and subsequently adding the compound represented by Formula 1 thereto to dissolve the compound, and the like.

As the resin included in the solution, it is possible to use the above-described resin matrix material, a monomer which is curable by the resin matrix material, or a mixture thereof. Examples of the monomer which is curable by the resin matrix material include a (meth)acrylic monomer, and the monomer may be formed of a resin matrix material by UV curing. When a curable monomer is used as described above, an initiator required for curing may be further added, if necessary.

The solvent is not particularly limited, and is not particularly limited as long as the solvent does not adversely affect the coating process and may be removed by a subsequent drying. As a non-limiting example of the solvent, it is possible to use toluene, xylene, acetone, chloroform, various alcohol-based solvents, methyl ethyl ketone (MEK), methyl isobutyl ketone (MIBK), ethyl acetate (EA), butyl acetate, dimethylformamide (DMF), dimethylacetamide (DMAc), dimethylsulfoxide (DMSO), N-methyl-pyrrolidone (NMP), and the like, and one or a mixture of two or more may be used. When the first solution and the second solution are used, the solvents included in each of the solutions may also be the same as or different from each other. Even when different solvents are used in the first solution and the second solution, it is preferred that these solvents have compatibility so as to be mixed with each other.

For the process of coating the resin solution, in which the compound represented by Formula 1 is dissolved, on a base material, a roll-to-roll process may be used. For example, the roll-to-roll process may be performed by a process of unwinding a base material from a roll on which the base material is wound, coating a resin solution, in which the compound represented by Formula 1 is dissolved, on one surface of the base material, drying the resin solution, and then winding the base material again on the roll. When the roll-to-roll process is used, it is preferred that the viscosity of the resin solution is determined within a range in which the process may be implemented, and the viscosity may be determined within a range of, for example, 200 cps to 2,000 cps.

As the coating method, various publicly-known methods may be used, and for example, a die coater may also be used, and various bar-coating methods such as a comma coater and a reverse comma coater may also be used.

After the coating, a drying process is performed. The drying process may be performed under conditions required for removing the solvent. For example, it is possible to obtain a color conversion film including a fluorescent material including the compound represented by Formula 1, which has desired thickness and concentration, on a base material by carrying out the drying in an oven located close to a coater under a condition to sufficiently evaporate a solvent, in a direction in which the base material progresses during the coating process.

When the monomer which is curable by the resin matrix material is used as a resin included in the solution, curing, for example, UV curing may be performed before the drying or simultaneously with the drying.

When the compound represented by Formula 1 is extruded with a resin to produce a film, an extrusion method known in the art may be used, and for example, a color conversion film may be prepared by extruding the compound represented by Formula 1 with a resin such as a polycarbonate (PC)-based resin, a poly(meth)acrylic resin, and a styrene-acrylonitrile (SAN)-based resin.

According to an exemplary embodiment of the present specification, a protective film or a barrier film may be provided on at least one surface of the color conversion film. As the protective film and the barrier film, films known in the art may be used.

Another exemplary embodiment of the present specification provides a backlight unit including the above-described color conversion film. The backlight unit may have a backlight unit configuration known in the art, except that the backlight unit includes the color conversion film. For example, FIG. 1 illustrates an example thereof. According to FIG. 1, the color conversion film according to the above-described exemplary embodiments is provided on a surface opposite to a surface of a light guide plate facing a reflective plate. FIG. 1 illustrates a configuration including a light source and a reflective plate surrounding the light source, but the configuration is not limited to such a structure, and may be modified depending on the structure of the backlight unit known in the art. Further, as a light source, a direct type as well as a side chain type may be used, and a reflective plate or a reflective layer may be omitted or replaced with other configurations, if necessary, and an additional film, for example, a light diffusion film, a light collecting film, a brightness enhancement film, and the like may be further provided, if necessary. Preferably, a light collecting film and a brightness enhancement film are further provided on a color conversion film.

In the configuration of the backlight unit as illustrated in FIG. 1, a scattering pattern may be provided on an upper or lower surface of the light guide plate, if necessary. Light incident into the light guide plate has a non-uniform light distribution caused by repeated optical processes such as reflection, total reflection, refraction, and transmission, and the scattering pattern may be used for inducing the non-uniform light distribution to uniform luminance.

According to still another exemplary embodiment of the present application, a display device including the above-described backlight unit is applied. The display device is not particularly limited as long as the device includes the above-described backlight unit as a constituent element. For example, the display device includes a display module and a backlight unit. FIG. 2 illustrates a structure of a display device. However, the structure is not limited thereto, and an additional film, for example, a light diffusion film, a light collecting film, and a brightness enhancement film, and the like may be further provided between the display module and the backlight unit, if necessary.

Hereinafter, the present specification will be described in detail with reference to Examples for specifically describing the present specification. However, the Examples according to the present specification may be modified in various forms, and it is not interpreted that the scope of the present application is limited to the Examples described in detail below. The Examples of the present application are provided for more completely explaining the present specification to the person with ordinary skill in the art. The synthesis of materials was performed with reference to Chem. Commun., 2015, 51, 4245-4248, Org. Lett., 2012, 14 (24), pp 6150-6153.

Preparation Example 1

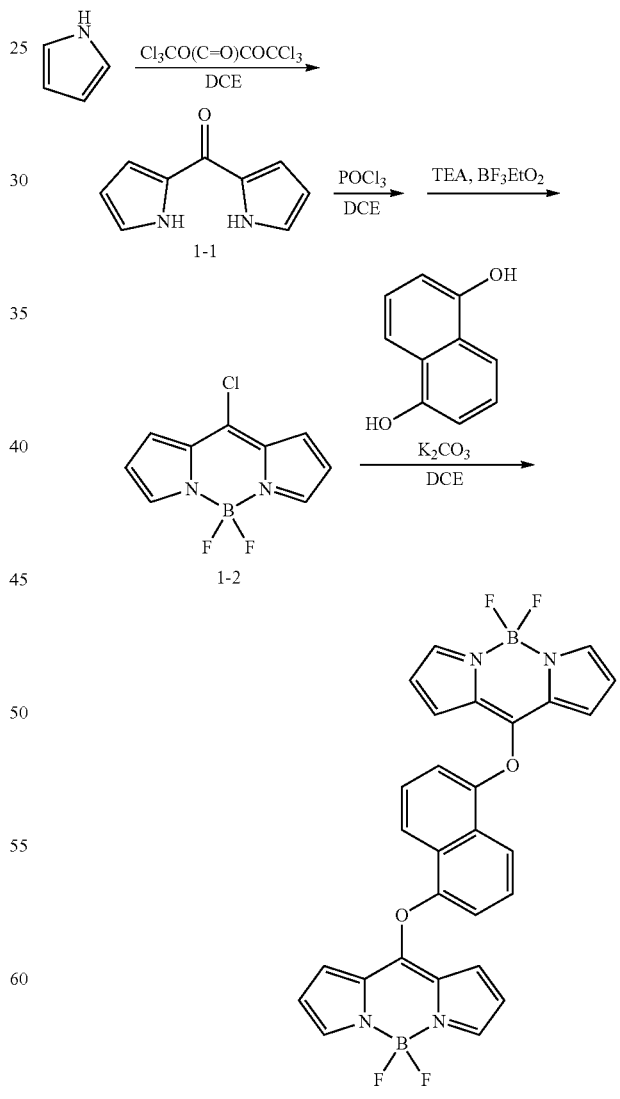

Synthesis of Compound 1-1

After 0.3 equivalent of triphosgene was dissolved in dichloroethane, the resulting solution was put into 5 g of pyrrole (1 equivalent, 72 mmol), a solution in which 0.1 equivalent of triethylamine was dissolved in dichloroethane was further added thereto at 0° C. and under a nitrogen atmosphere, and then the resulting mixture was maintained for 2 hours. Thereafter, 1 equivalent of pyrrole was further put thereinto, and the resulting mixture was heated at about 80° C. for 30 minutes. When the reaction was terminated, the resulting product was put into diethyl ether and separated by using water. The organic layer was dried with sodium sulfate, and then column-separated by using silica gel. 4.0 g (yield 35%) of Compound 1-1 could be obtained.

Synthesis of Compound 1-2

After 4.0 g of Compound 1-1 was dissolved in dichloromethane, 2 equivalents of POCl$_3$ were put thereinto, and the resulting mixture was heated for 3 hours. After the reaction was terminated, the temperature was cooled to room temperature, 10 equivalents of triethylamine were put thereinto, and the resulting mixture was left to stand at 0° C. for a moment. 11 equivalents of BF$_3$OEt$_2$ were slowly put thereinto, and the resulting mixture was further stirred at room temperature for about 2 hours. After the reaction was terminated, the mixture was extracted by using diethyl ether and water. After the organic layer was dried with sodium sulfate, 3.3 g (yield 58%) of a desired Compound 1-2 could be obtained by filtering the organic layer using a silica pad.

Synthesis of Compound 1

After 3.3 g of Compound 1-2 was dissolved in dichloroethane, 0.5 equivalent of dihydroxynaphthalene and 3 equivalents of potassium carbonate were put thereinto. The mixture was stirred at room temperature under a nitrogen atmosphere. After the reaction was completed, the resulting product was extracted by using a solution of diethyl ether and sodium carbonate. After the organic layer was dried with sodium sulfate, 1.4 g (yield 35%) of Compound 1 could be obtained by purifying the organic layer through silica gel column. HR LC/MS/MS m/z calcd for C$_{28}$H$_{18}$B$_2$F$_4$N$_4$O$_2$ (M+): 540.1552; found: 540.1555.

Preparation Example 2

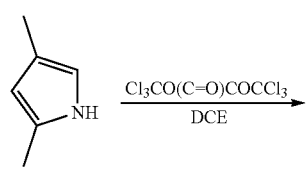

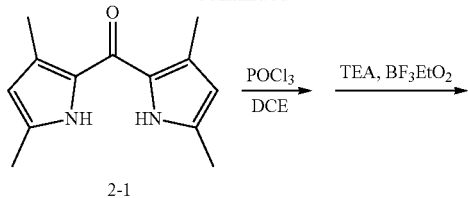

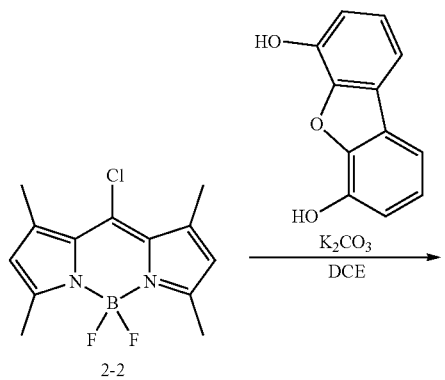

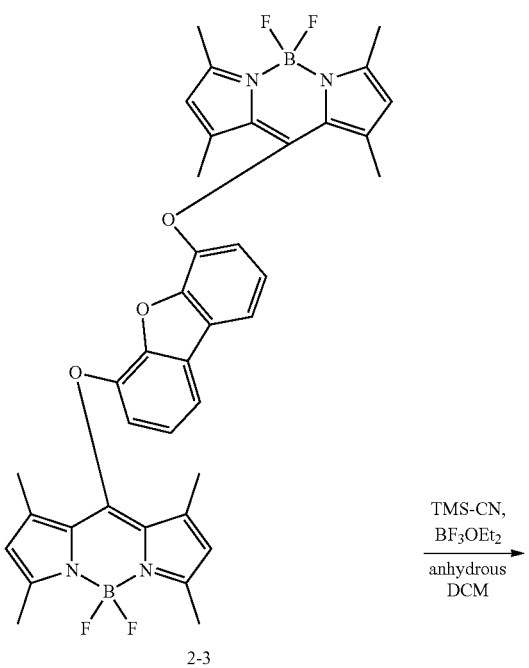

-continued

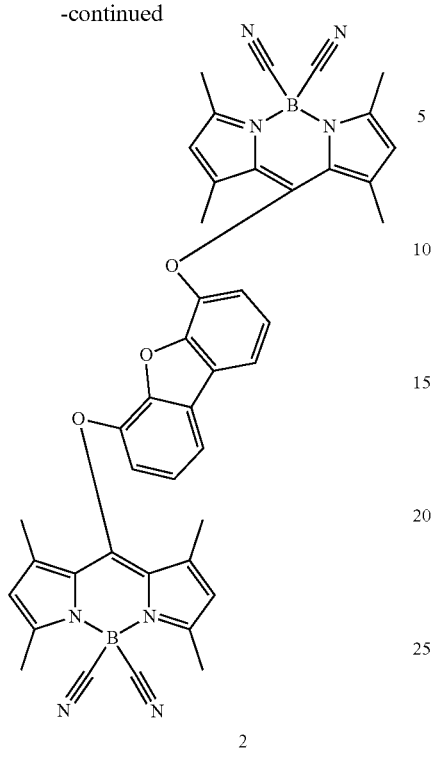

2

Synthesis of Compound 2-1

Compound 2-1 was synthesized in the same manner as in the synthesis of Compound 1-1, except that 5 g of dimethylpyrrole was used instead of pyrrole. 5.9 g (yield 52%) of Compound 2-1 could be obtained.

Synthesis of Compound 2-2

Compound 2-2 was synthesized in the same manner as in the synthesis of Compound 1-2, except that Compound 2-1 was used instead of Compound 1-1. 6.1 g (yield 79%) of Compound 2-2 could be obtained.

Synthesis of Compound 2-3

Compound 2-3 was synthesized in the same manner as in the synthesis of Compound 1, except that Compound 2-2 and dihydroxy dibenzofuran were used instead of Compound 1-2 and dihydroxynaphthalene, respectively. 3.1 g (yield 41%) of Compound 2-3 could be obtained.

Synthesis of Compound 2

After 3.1 g of Compound 2-3 was dissolved in anhydrous dichloromethane, the resulting solution was maintained at 0° C. 15 equivalents of TMS-CN and 5 equivalents of $BF_3OEt_2$ were sequentially and slowly put thereinto, and the reaction was confirmed. After the reaction was terminated, an extraction was performed by using water and chloroform, and the organic layer was dried by using sodium sulfate. 1.6 g (yield 51%) of Compound 2 could be obtained by purifying the organic layer into a solid form using methanol. HR LC/MS/MS m/z calcd for $C_{42}H_{34}B_2N_8O_3$ (M+): 720.2940; found: 720.2938.

Preparation Example 3

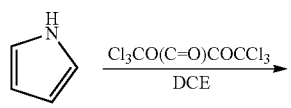

-continued

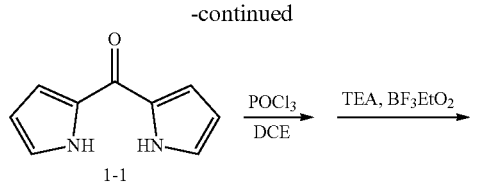

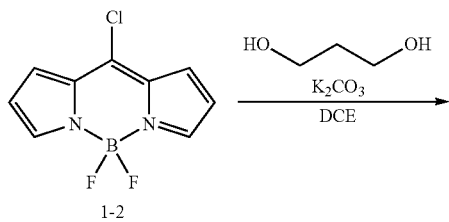

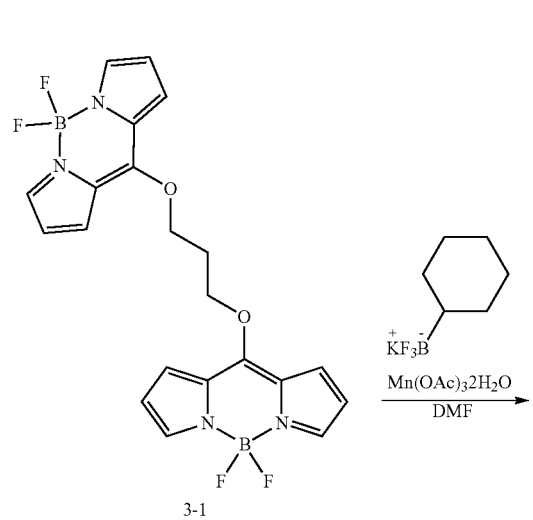

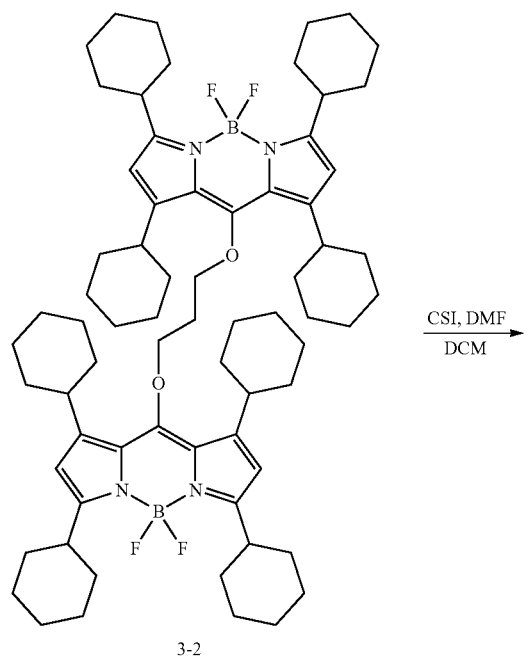

-continued

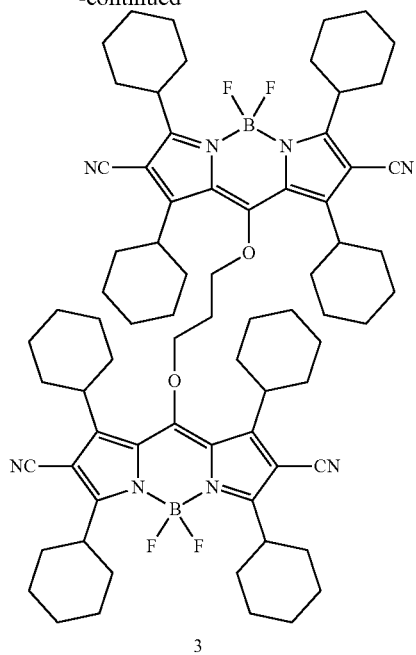

Synthesis of Compound 3-1

Compound 3-1 was synthesized in the same manner as in the synthesis of Compound 1, except that propanediol was used instead of dihydroxynaphthalene. 1.7 g (yield 55%) of Compound 3-1 could be obtained.

Synthesis of Compound 3-2

1.7 g of Compound 3-1, 10 equivalents of cyclohexyl trifluoroborate potassium salt, and 20 equivalents of manganese(III) acetate hydrate were put into a DMF solvent, and the resulting mixture was heated to 80° C. or less. When the reaction was terminated, the temperature was cooled, and then water was put thereinto, and the resulting mixture was filtered with a celite pad. After the celite pad was again dissolved in THF, sodium sulfate was put thereinto, and the resulting mixture was dried and filtered. The solvent was removed under reduced pressure, and the residue was purified into a solid form by using methanol. 2.4 g (yield 58%) of Compound 3-2 could be obtained.

Synthesis of Compound 3

After 2.4 g of Compound 3-2 was dissolved in a dichloromethane solvent, 10 equivalents of chlorosulfonyl isocyanate were put thereinto. The resulting mixture was heated to 60° C. or less, and the reaction was confirmed after a small amount of the mixture was taken out and mixed with DMF. When the reaction was terminated, 10 equivalents of DMF were put thereinto and the resulting mixture was stirred for about 3 hours. After extraction was performed by using water and chloroform, the organic layer was dried by using sodium sulfate and purified into a solid form by using methanol. 1.8 g (yield 68%) of Compound 3 could be obtained. HR LC/MS/MS m/z calcd for $C_{73}H_{94}B_2F_4N_8O_2$ (M+): 1212.7622; found: 1212.7627.

Preparation Example 4

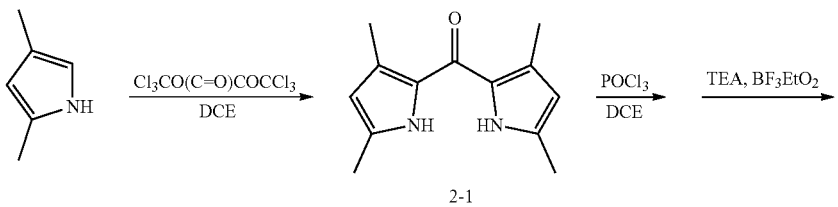

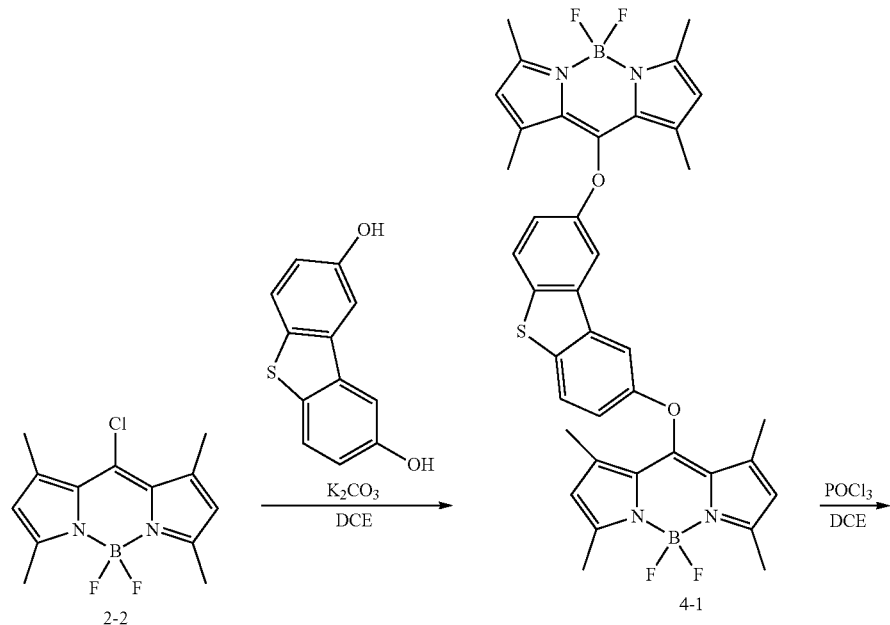

-continued
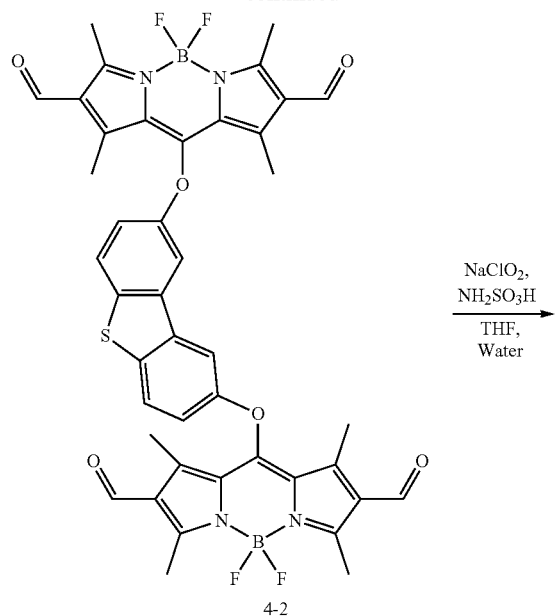
4-2
NaClO₂,
NH₂SO₃H
———————→
THF,
Water
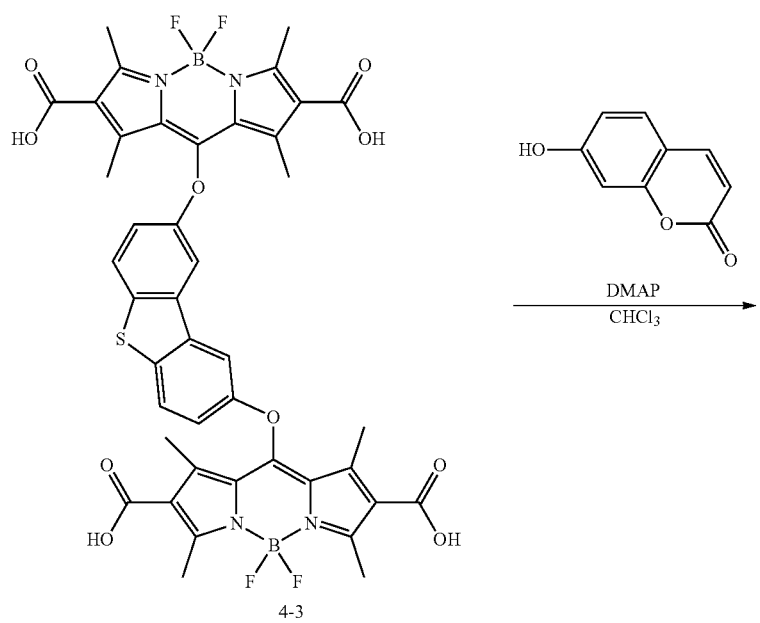
4-3
DMAP
———→
CHCl₃

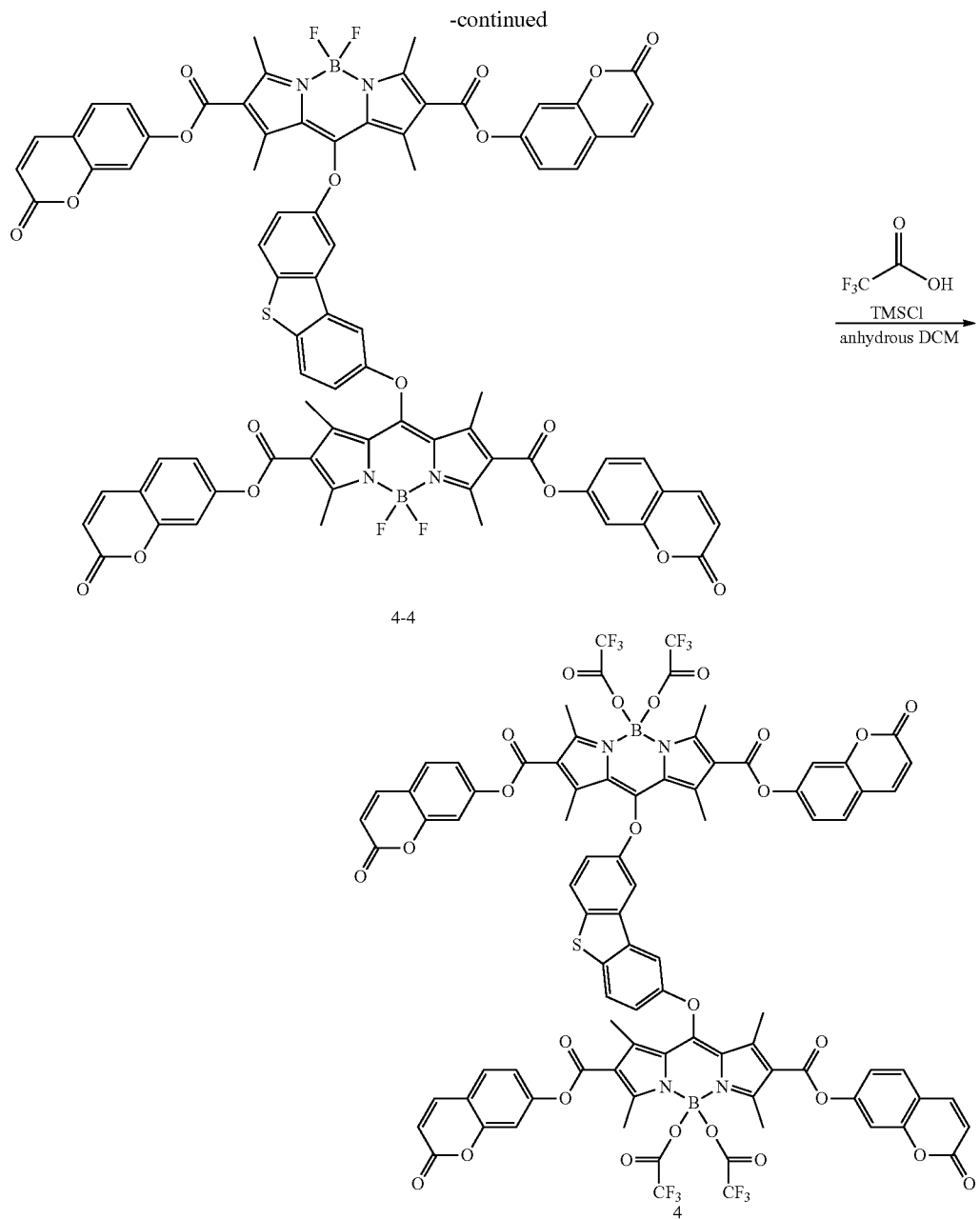

Synthesis of Compound 4-1

Compound 4-1 was synthesized in the same manner as in the synthesis of Compound 1, except that Compound 2-2 and dibenzothiophene diol were used instead of Compound 1-2 and dihydroxynaphthalene, respectively. 1.5 g (yield 33%) of Compound 4-1 could be obtained.

Synthesis of Compound 4-2

40 mL of each of $POCl_3$ and DMF was put into a dichloroethane solvent and the resulting mixture was stirred at 0° C. under a nitrogen atmosphere. After 1 hour, Compound 4-1 was put into the mixed solution, and the resulting mixture was heated and stirred. When the reaction was confirmed, the reaction was confirmed after a small amount of the mixture was taken out, put into a sodium bicarbonate solution, and shaken. After the reaction was terminated, the temperature was lowered to 0° C., and the sodium bicarbonate solution was put thereinto until the pH became neutral. The organic layer was extracted by using water and chloroform, and dried by using sodium sulfate. 1.3 g (yield 75%) of Compound 4-2 could be obtained.

Synthesis of Compound 4-3

After 1.3 g of Compound 4-2 was dissolved in a THF solvent, 6 equivalents of amidosulfonic acid dissolved in water were put thereinto, and the resulting mixture was stirred at room temperature. After the temperature was lowered to 0° C., sodium chlorite dissolved in water was slowly put thereinto, and then the reaction was confirmed. When the reaction was terminated, the organic layer was washed by using a sodium thiosulfate solution and dried by using sodium sulfate. 1.1 g (yield 81%) of Compound 4-3 could be obtained by evaporating the solvent.

Synthesis of Compound 4-4

1.1 g of Compound 4-3, 4.2 equivalents of coumarin, 4.4 equivalents of DMAP, and 4.4 equivalents of EDC-HCl were put into chloroform, and the resulting mixture was heated and stirred. After the reaction was terminated, the product was cooled to room temperature, water was put thereinto, and an extraction was performed. The organic layer was dried by using sodium sulfate, and the solvent was evaporated. 1.3 g (yield 69%) of Compound 4-4 could be obtained by stirring the residue using an ethanol solvent.

Synthesis of Compound 4

40 equivalents of trifluoroacetic acid and 48 equivalents of TMSCl were stirred in anhydrous dichloromethane at room temperature under a nitrogen atmosphere. Thereafter, a reaction was performed for 16 hours by heating the mixture to 90° C., and then the reactant was put into a flask in which 1.3 g of Compound 4-4 was dissolved in anhydrous dichloromethane through a cannula. The resulting mixture was continuously stirred at 90° C., and when the reaction was terminated, extraction was performed by using water and dichloromethane. The organic layer was dried by using sodium sulfate, and 0.6 g (yield 38%) of Compound 4 could be obtained by purifying the organic layer through silica gel column. HR LC/MS/MS m/z calcd for $C_{86}H_{50}B_2F_{12}N_4O_{26}$ (M+): 1836.2428; found: 1836.2429.

Preparation Example 5

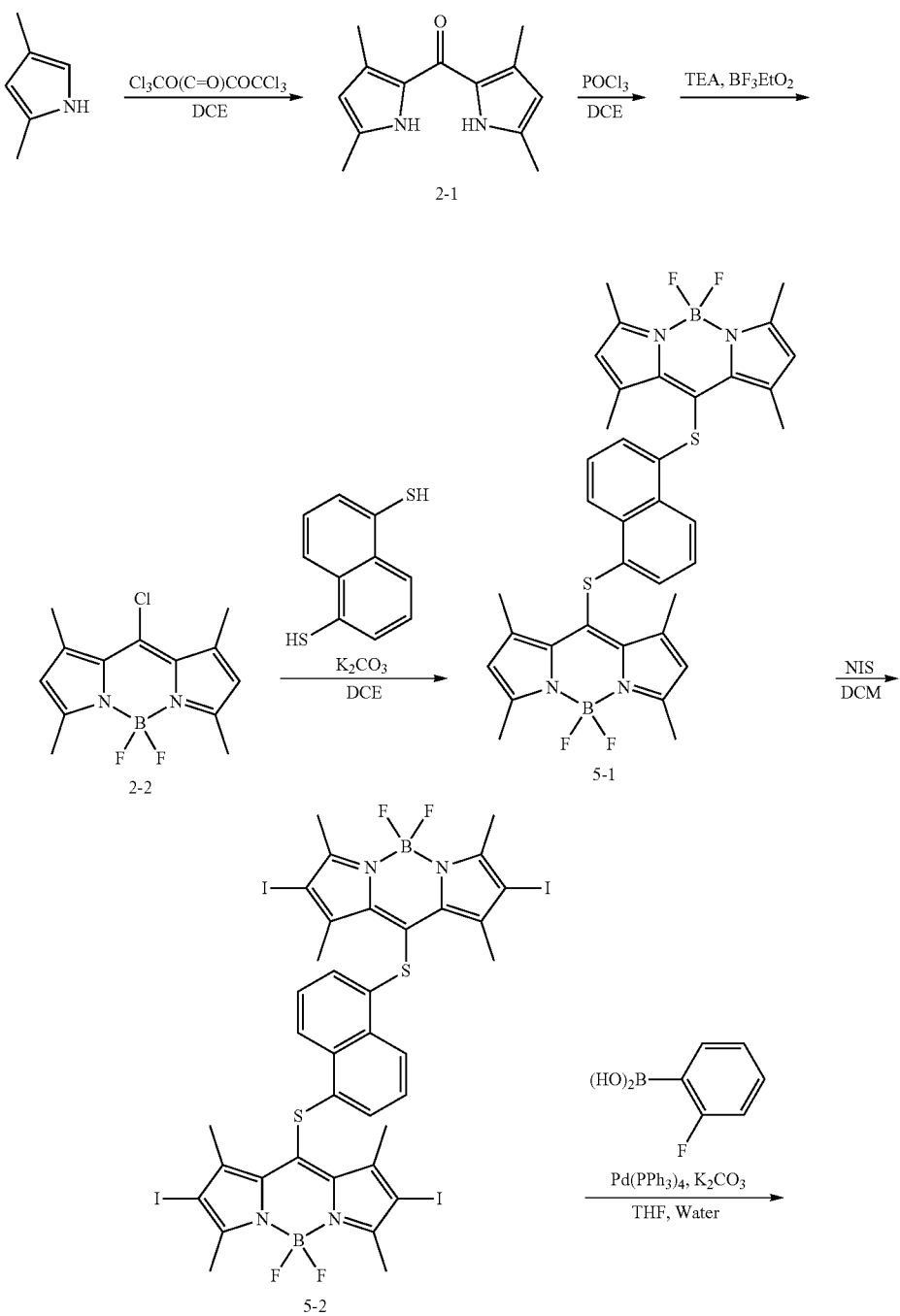

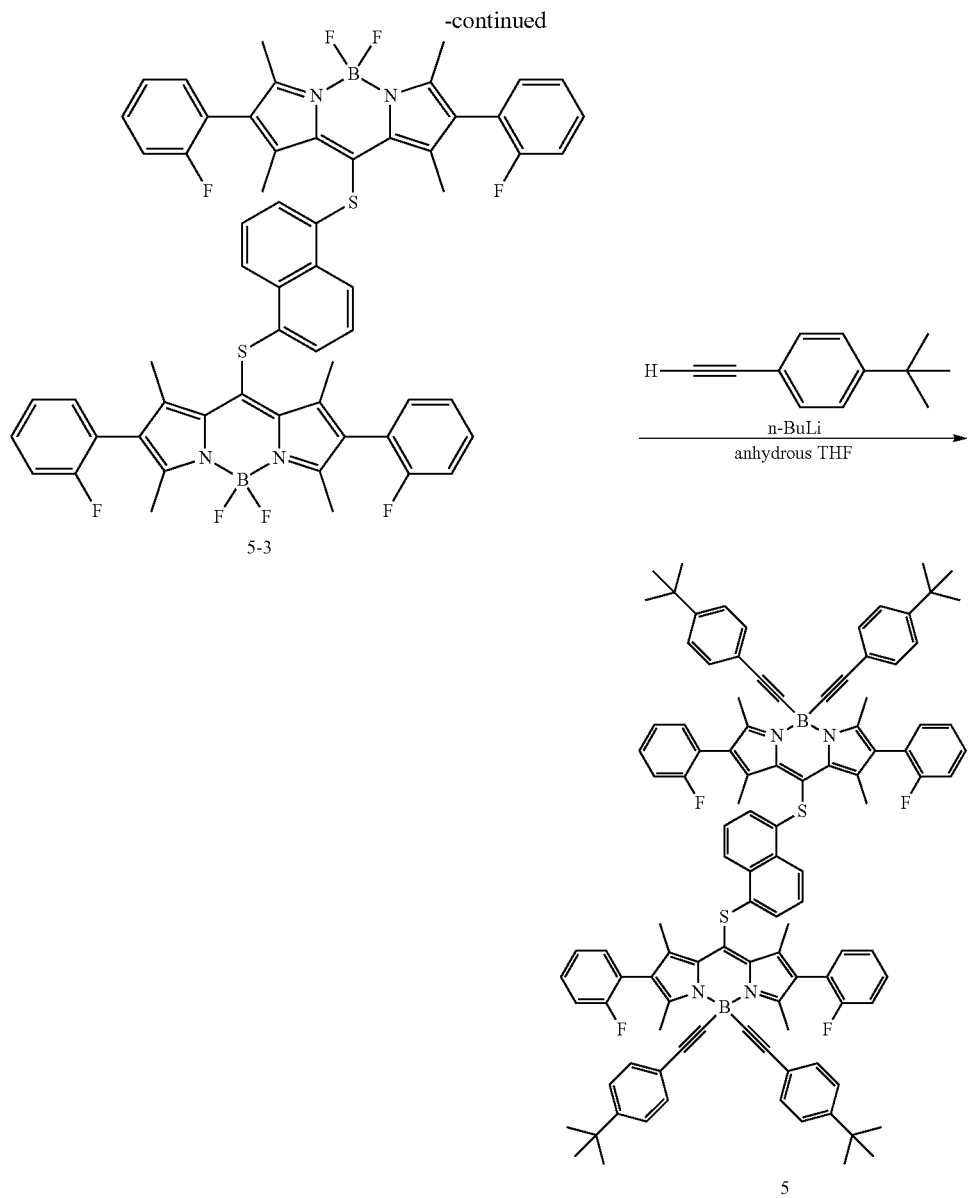

Synthesis of Compound 5-1

Compound 5-1 was synthesized in the same manner as in the synthesis of Compound 1, except that Compound 2-2 and naphthalenedithiol were used instead of Compound 1-2 and dihydroxynaphthalene, respectively. 3.5 g (yield 52%) of Compound 5-1 could be obtained.

Synthesis of Compound 5-2

After 3.5 g of Compound 5-1 was dissolved in dichloromethane, 6 equivalents of NIS were slowly put thereinto at room temperature. The reaction was performed by heating and stirring the mixture at 50° C., and after the reaction was terminated, extraction was performed by using a sodium thiosulfate solution and dichloromethane. The organic layer was dried by using sodium sulfate, and purified into a solid form by using methanol. 4.6 g (yield 75%) of Compound 5-2 could be obtained.

Synthesis of Compound 5-3

4.6 g of Compound 5-2 and 4.2 equivalents of fluorophenylboronic acid were dissolved in a THF solvent, equivalents of potassium carbonate were dissolved in water, and the two solutions were stirred together. After the combined solution was heated to 80° C., 1.0 equivalent of tetrakis triphenylphosphine palladium was put thereinto, and when the reaction was terminated, extraction was performed by using water and chloroform. The organic layer was dried by using sodium sulfate, and purified into a solid form by using methanol. 2.9 g (yield 70%) of Compound 5-3 could be obtained.

Synthesis of Compound 5

After 2.9 g of Compound 5-3 and 4.2 equivalents of t-butyl ethynylbenzene were dissolved in an anhydrous THF solvent, the flask was maintained at −78° C. under a nitrogen atmosphere for about 1 hour. 4.10 equivalents of n-BuLi were slowly put thereinto, and then after the dropwise addition was completed, the temperature was slowly increased to room temperature. After the reaction was terminated, extraction was performed by using water and chloroform. The organic layer was dried by using sodium sulfate, and purified into a solid form by using methanol. 1.8 g (yield 41%) of Compound 5 could be obtained. HR LC/MS/MS m/z calcd for $C_{108}H_{98}B_2F_4N_4S_2$ (M+): 1612.7355; found: 1612.7359.
Preparation Example 6
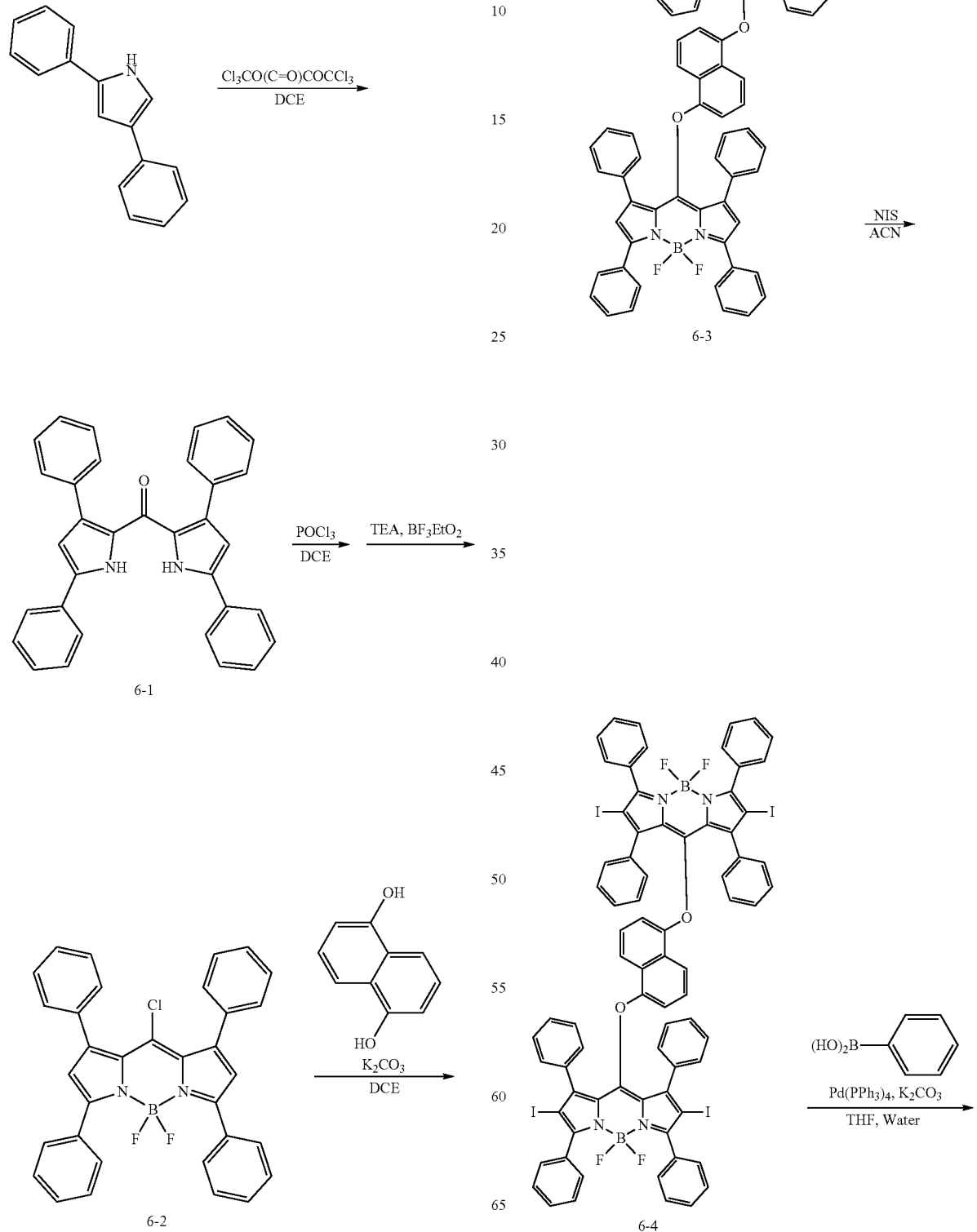

63
-continued

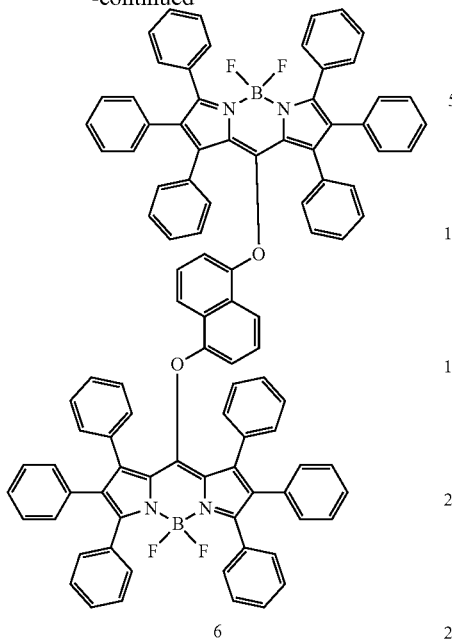

6

Synthesis of Compound 6-1

A synthesis was performed in the same manner as in the synthesis of Compound 1-1, except that diphenylpyrrole was used instead of pyrrole. 3.8 g (yield 36%) of Compound 6-1 could be obtained.

Synthesis of Compound 6-2

A synthesis was performed in the same manner as in the synthesis of Compound 1-2, except that Compound 6-1 was used instead of Compound 1-1. 3.6 g (yield 83%) of Compound 6-2 could be obtained.

Synthesis of Compound 6-3

A synthesis was performed in the same manner as in the synthesis of Compound 1, except that Compound 6-2 was used instead of Compound 1-2. 2.8 g (yield 72%) of Compound 6-3 could be obtained.

Synthesis of Compound 6-4

A synthesis was performed in the same manner as in the synthesis of Compound 5-2, except that Compound 6-3 was used instead of Compound 5-1. 3.0 g (yield 75%) of Compound 6-4 could be obtained.

Synthesis of Compound 6

A synthesis was performed in the same manner as in the synthesis of Compound 5-3, except that Compound 6-4 and phenylboronic acid were used instead of Compound 5-2 and fluorophenylboronic acid, respectively. 1.7 g (yield 64%) of Compound 6 could be obtained. HR LC/MS/MS m/z calcd for $C_{100}H_{66}B_2F_4N_4O_2$ (M+): 1452.5308; found: 1452.5311.

64

Preparation Example 7

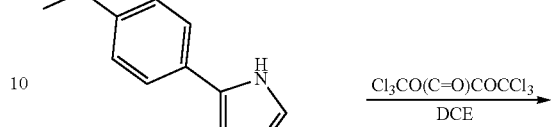

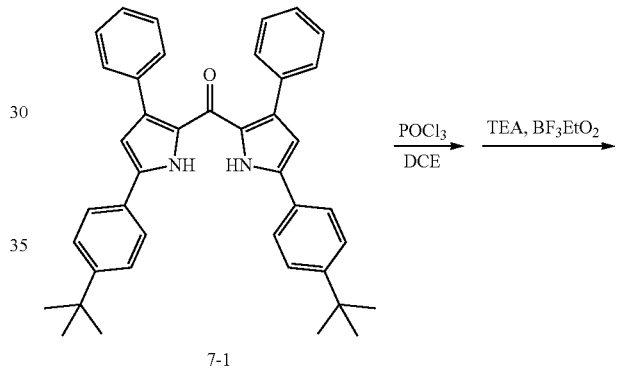

7-1

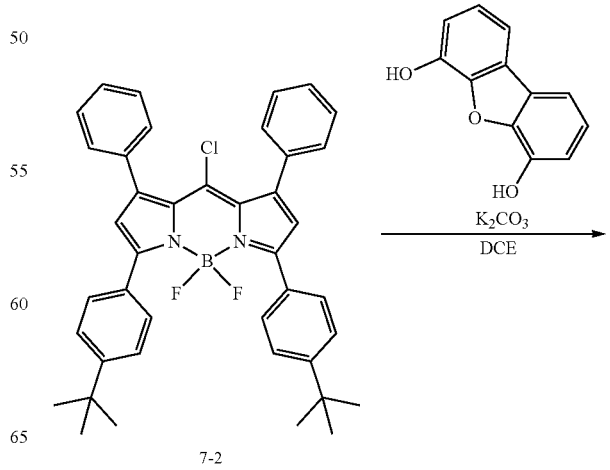

7-2

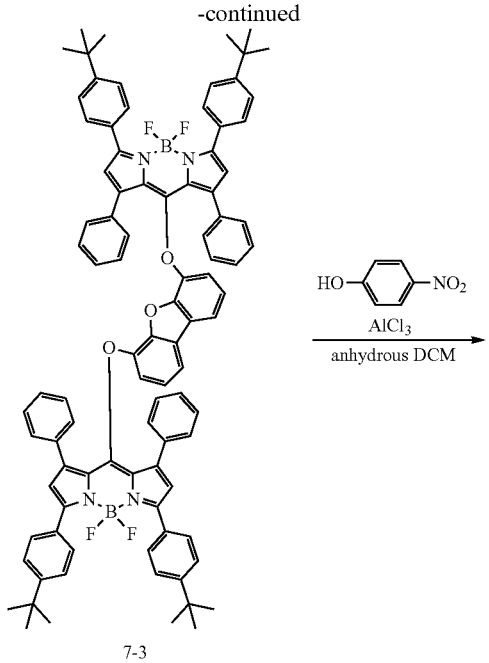

7-3

Synthesis of Compound 7-1

A synthesis was performed in the same manner as in the synthesis of Compound 1-1, except that 2-(t-butylphenyl)-4-phenyl-pyrrole was used instead of pyrrole. 3.4 g (yield 32%) of Compound 7-1 could be obtained.

Synthesis of Compound 7-2

A synthesis was performed in the same manner as in the synthesis of Compound 1-2, except that Compound 7-1 was used instead of Compound 1-1. 3.0 g (yield 79%) of Compound 7-2 could be obtained.

Synthesis of Compound 7-3

A synthesis was performed in the same manner as in the synthesis of Compound 1, except that Compound 7-2 and dihydroxy dibenzofuran were used instead of Compound 1-2 and dihydroxynaphthalene, respectively. 2.4 g (yield 74%) of Compound 7-3 could be obtained.

Synthesis of Compound 7

2.4 g of Compound 7-3 was put into a dichloromethane solvent in which aluminum chloride was dissolved, and the resulting mixture was heated and stirred at 55° C. under a nitrogen atmosphere for about 10 minutes. Nitrophenol dissolved in a dichloromethane solvent was slowly added dropwise thereto by using a syringe, and the resulting mixture was heated and stirred. After the reaction was terminated, alumina was removed through silica gel column and the residue was purified. 1.0 g (yield 31%) of Compound 7 could be obtained. HR LC/MS/MS m/z calcd for $C_{118}H_{98}B_2N_8O_{15}$ (M+): 1888.7338; found: 1888.7336.

Preparation Example 8

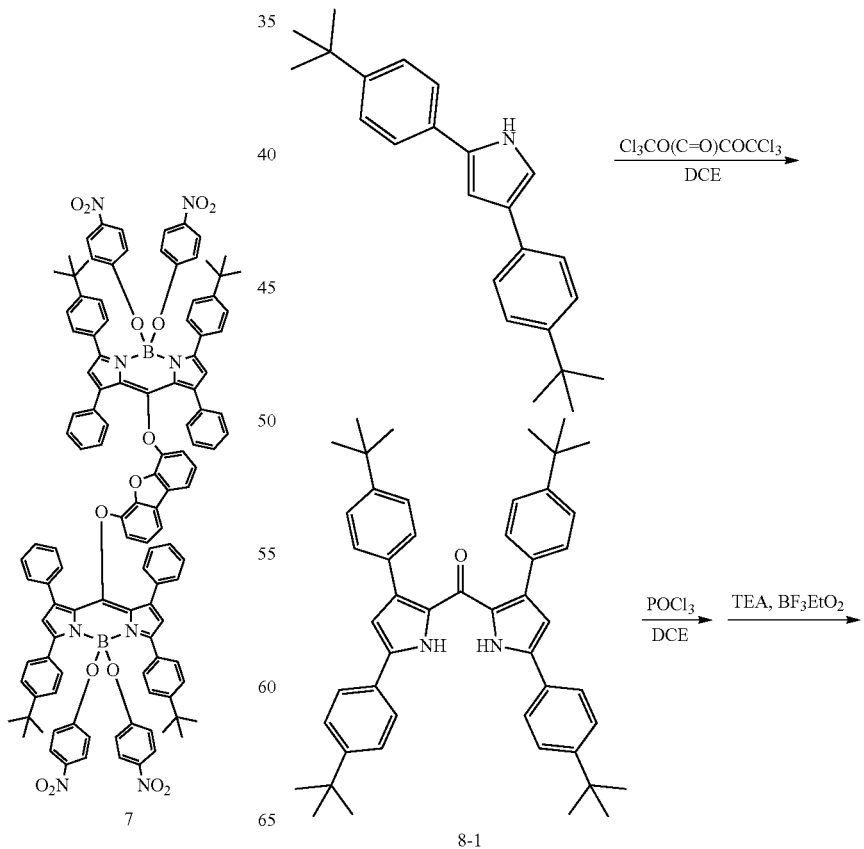

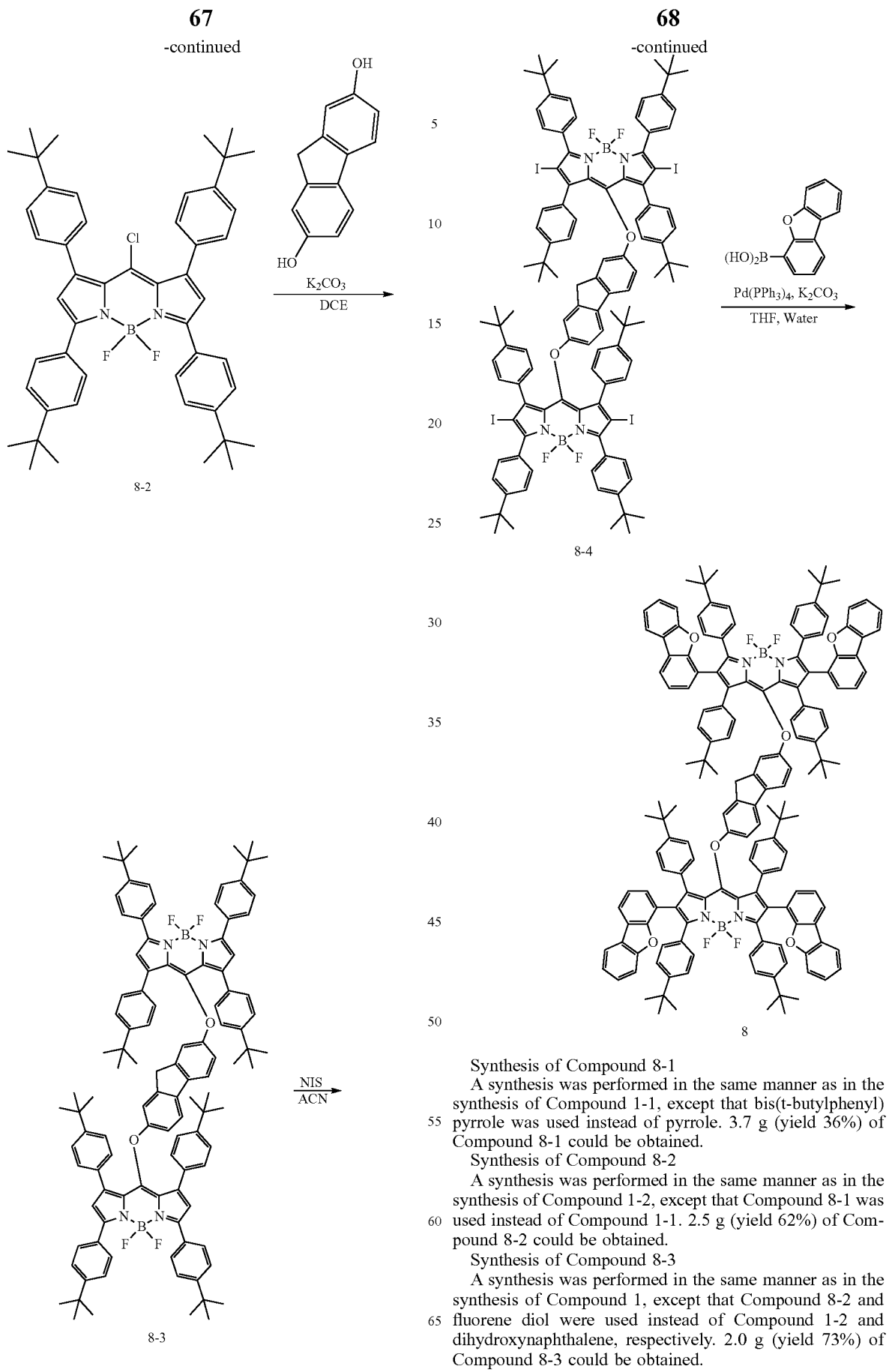

Synthesis of Compound 8-1

A synthesis was performed in the same manner as in the synthesis of Compound 1-1, except that bis(t-butylphenyl) pyrrole was used instead of pyrrole. 3.7 g (yield 36%) of Compound 8-1 could be obtained.

Synthesis of Compound 8-2

A synthesis was performed in the same manner as in the synthesis of Compound 1-2, except that Compound 8-1 was used instead of Compound 1-1. 2.5 g (yield 62%) of Compound 8-2 could be obtained.

Synthesis of Compound 8-3

A synthesis was performed in the same manner as in the synthesis of Compound 1, except that Compound 8-2 and fluorene diol were used instead of Compound 1-2 and dihydroxynaphthalene, respectively. 2.0 g (yield 73%) of Compound 8-3 could be obtained.

Synthesis of Compound 8-4

A synthesis was performed in the same manner as in the synthesis of Compound 5-2, except that Compound 8-3 was used instead of Compound 5-1. 1.7 g (yield 65%) of Compound 8-4 could be obtained.

Synthesis of Compound 8

A synthesis was performed in the same manner as in the synthesis of Compound 5-3, except that Compound 8-4 and dibenzofuran boronic acid were used instead of Compound 5-2 and fluorophenylboronic acid, respectively. 1.3 g (yield 71%) of Compound 8 could be obtained. HR LC/MS/MS m/z calcd for $C_{159}H_{140}B_2F_4N_4O_6$ (M+): 2299.0895; found: 2299.0899.

Preparation Example 9

Synthesis of Compound 9

A synthesis was performed in the same manner as in the synthesis of Compound 2, except that Compound 8 was used instead of Compound 2-3. 0.8 g (yield 63%) of Compound 9 could be obtained. HR LC/MS/MS m/z calcd for $C_{163}H_{140}B_2N_8O_6$ (M+): 2327.1082; found: 2327.1085.

Preparation Example 10

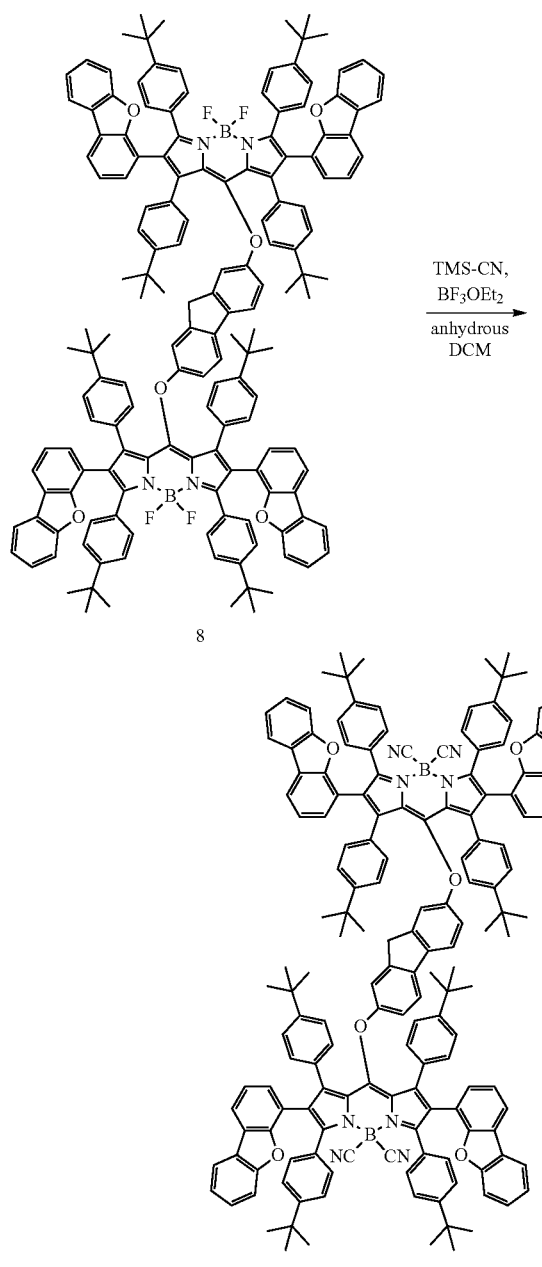

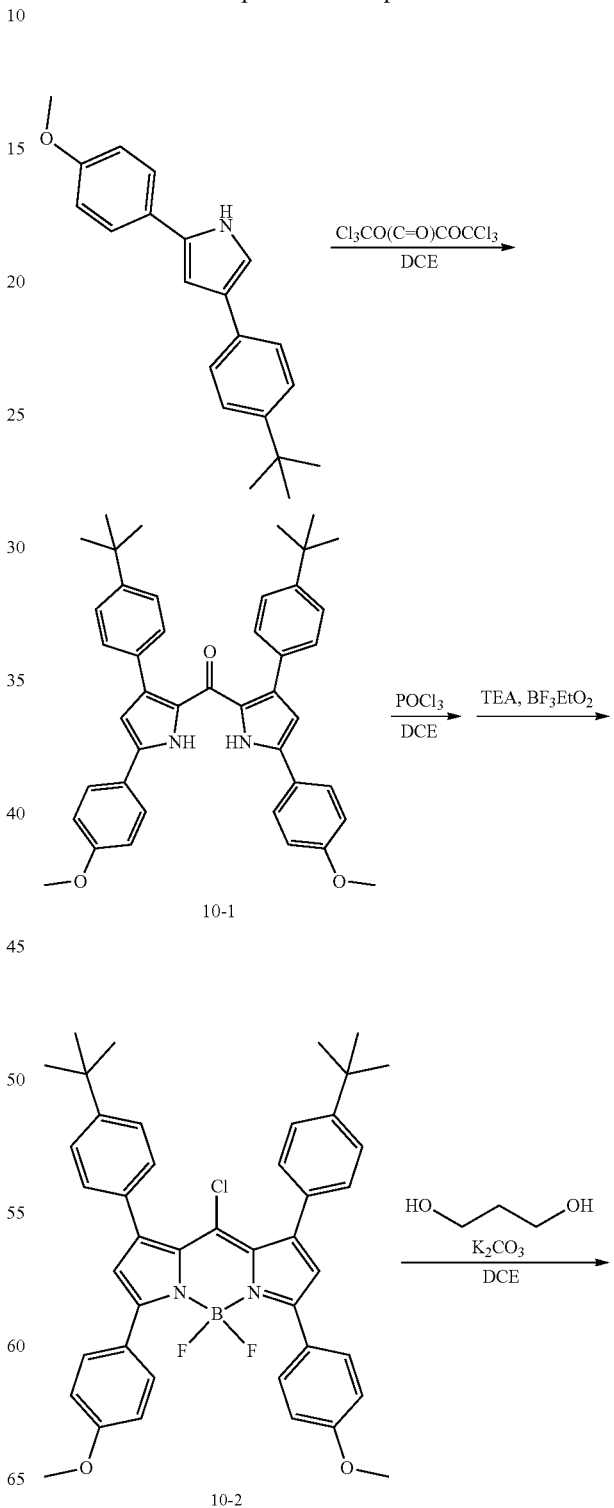

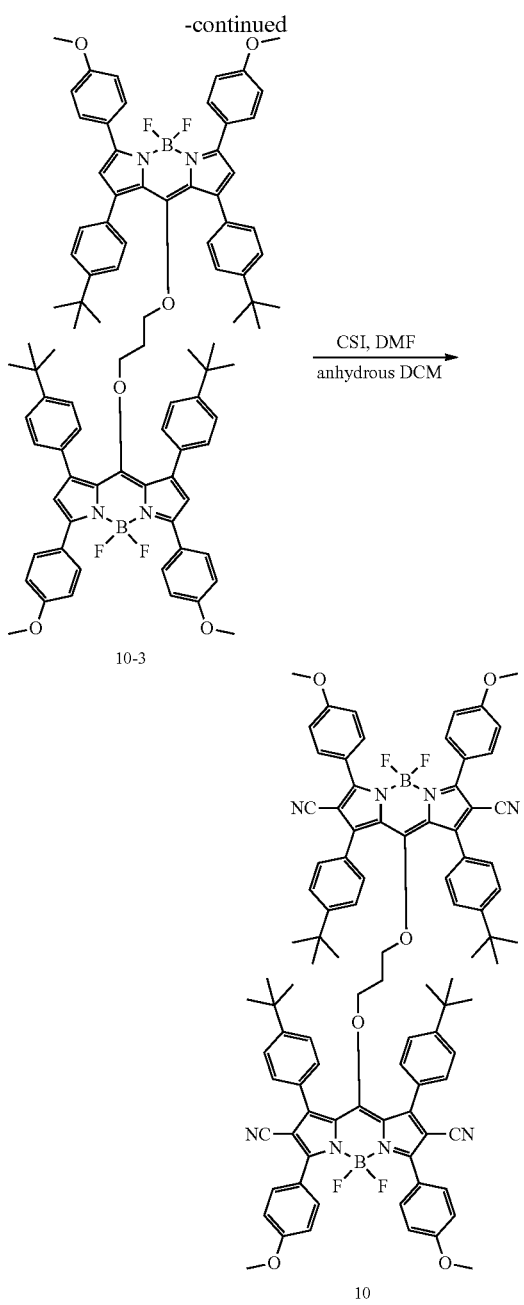

Synthesis of Compound 10-1

A synthesis was performed in the same manner as in the synthesis of Compound 1-1, except that 2-methoxyphenyl-4-(t-butylphenyl)pyrrole was used instead of pyrrole. 3.5 g (yield 34%) of Compound 10-1 could be obtained.

Synthesis of Compound 10-2

A synthesis was performed in the same manner as in the synthesis of Compound 1-2, except that Compound 10-1 was used instead of Compound 1-1. 2.2 g (yield 56%) of Compound 10-2 could be obtained.

Synthesis of Compound 10-3

A synthesis was performed in the same manner as in the synthesis of Compound 1-3, except that Compound 10-2 and propanediol were used instead of Compound 1-2 and dihydroxynaphthalene, respectively. 1.4 g (yield 64%) of Compound 10-3 could be obtained.

Synthesis of Compound 10

A synthesis was performed in the same manner as in the synthesis of Compound 3, except that Compound 10-3 was used instead of Compound 3-2. 0.9 g (yield 59%) of Compound 10 could be obtained. HR LC/MS/MS m/z calcd for $C_{93}H_{86}B_2F_4N_8O_6$ (M+): 1508.6793; found: 1508.6796.

Example 1

A first solution was prepared by dissolving Compound (maximum absorption wavelength 481 nm, maximum light emission wavelength 504 nm, and full width at half maximum 31 nm in a toluene solution) which is an organic phosphor in a solvent xylene.

A second solution was prepared by dissolving a thermoplastic resin SAN (styrene-acrylonitrile-based) in a solvent xylene. The first solution and the second solution were mixed such that the amount of the organic phosphor was 0.5 part by weight based on 100 parts by weight of SAN, and the resulting mixture was uniformly mixed. A solid content and a viscosity in the mixed solution were 20 wt % and 200 cps, respectively. A color conversion film was prepared by coating the solution on a PET base material, and then drying the solution.

The brightness spectrum of the produced color conversion film was measured by a spectroradiometer (SR series manufactured by Topcon, Inc.). Specifically, the produced color conversion film was stacked on one surface of a light guide plate of a backlight unit including an LED blue backlight (a maximum light emission wavelength of 450 nm) and the light guide plate, a prism sheet and a DBEF film were stacked on the color conversion film, and then the brightness spectrum of the film was measured. An initial value was set, such that the luminosity of the blue LED light was 600 nit with or without the color conversion film when the brightness spectrum was measured.

Example 2

An experiment was performed in the same manner as in Example 1, except that Compound 2 (maximum absorption wavelength 498 nm, maximum light emission wavelength 512 nm, and full width at half maximum 34 nm in a toluene solution) was used instead of Compound 1.

Example 3

An experiment was performed in the same manner as in Example 1, except that Compound 3 (maximum absorption wavelength 494 nm, maximum light emission wavelength 509 nm, and full width at half maximum 30 nm in a toluene solution) was used instead of Compound 1.

Example 4

An experiment was performed in the same manner as in Example 1, except that Compound 4 (maximum absorption wavelength 506 nm, maximum light emission wavelength 519 nm, and full width at half maximum 35 nm in a toluene solution) was used instead of Compound 1.

Example 5

An experiment was performed in the same manner as in Example 1, except that Compound 5 (maximum absorption wavelength 512 nm, maximum light emission wavelength 525 nm, and full width at half maximum 38 nm in a toluene solution) was used instead of Compound 1.

Example 6

An experiment was performed in the same manner as in Example 1, except that Compound 6 (maximum absorption wavelength 579 nm, maximum light emission wavelength 613 nm, and full width at half maximum 39 nm in a toluene solution) was used instead of Compound 1.

Example 7

An experiment was performed in the same manner as in Example 1, except that Compound 7 (maximum absorption wavelength 589 nm, maximum light emission wavelength 622 nm, and full width at half maximum 42 nm in a toluene solution) was used instead of Compound 1.

Example 8

An experiment was performed in the same manner as in Example 1, except that Compound 8 (maximum absorption wavelength 585 nm, maximum light emission wavelength 617 nm, and full width at half maximum 40 nm in a toluene solution) was used instead of Compound 1.

Example 9

An experiment was performed in the same manner as in Example 1, except that Compound 9 (maximum absorption wavelength 586 nm, maximum light emission wavelength 620 nm, and full width at half maximum 40 nm in a toluene solution) was used instead of Compound 1.

Example 10

An experiment was performed in the same manner as in Example 1, except that Compound 10 (maximum absorption wavelength 591 nm, maximum light emission wavelength 625 nm, and full width at half maximum 28 nm in a toluene solution) was used instead of Compound 1.

Comparative Example 1

An experiment was performed in the same manner as in Example 1, except that the following compound mPh-BODIPY (maximum absorption wavelength 503 nm, maximum light emission wavelength 516 nm, and full width at half maximum 26 nm in a toluene solution) was used instead of Compound 1.

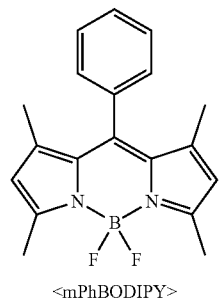

<mPhBODIPY>

Comparative Example 2

An experiment was performed in the same manner as in Example 1, except that the following compound pPh-BODIPY (maximum absorption wavelength 570 nm, maximum light emission wavelength 613 nm, and full width at half maximum 42 nm in a toluene solution) was used instead of Compound 1.

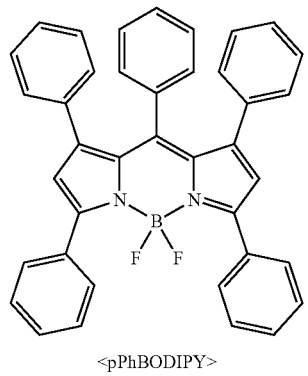

<pPhBODIPY>

Comparative Example 3

An experiment was performed in the same manner as in Example 1, except that the following compound aryloxy-BODIPY (maximum absorption wavelength 479 nm, maximum light emission wavelength 503 nm, and full width at half maximum 46 nm in a toluene solution) was used instead of Compound 1.

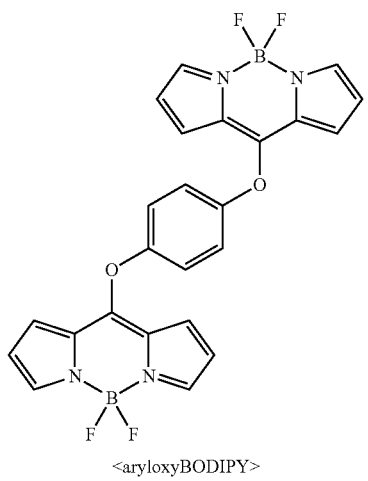

<aryloxyBODIPY>

The film light emission wavelength, quantum yield (QY %), and Abs intensity ratio (1000 hr, %) of each of the color conversion films according to Examples 1 to 10 and Comparative Examples 1 and 2 are shown in the following Table 1.

TABLE 1

|  | Compound | Film light emission wavelength $_{max}$(nm) | FWHM (nm) | QY (%) | Abs intensity (1000 hr, %) |
|---|---|---|---|---|---|
| Example 1 | 1 | 518 | 45 | 95 | 96.1 |
| Example 2 | 2 | 526 | 46 | 94 | 95.8 |
| Example 3 | 3 | 525 | 40 | 91 | 96.9 |
| Example 4 | 4 | 533 | 47 | 97 | 99.2 |
| Example 5 | 5 | 537 | 42 | 95 | 95.2 |
| Example 6 | 6 | 629 | 47 | 87 | 95.2 |
| Example 7 | 7 | 640 | 52 | 85 | 95.1 |
| Example 8 | 8 | 631 | 49 | 85 | 95.9 |
| Example 9 | 9 | 633 | 50 | 84 | 98.8 |
| Example 10 | 10 | 642 | 48 | 87 | 96.4 |
| Comparative Example 1 | mPhBODIPY | 530 | 45 | 91 | 91.2 |
| Comparative Example 2 | pPhBODIPY | 605 | 58 | 75 | 93.0 |
| Comparative Example 3 | aryloxyBODIPY | 517 | 52 | 89 | 87.9 |

According to Table 1, it can be confirmed that the color conversion films according to Examples 1 to 10 have a high light emitting efficiency and excellent stability as compared to the Comparative Examples.

The invention claimed is:

1. A compound represented by Formula 1:

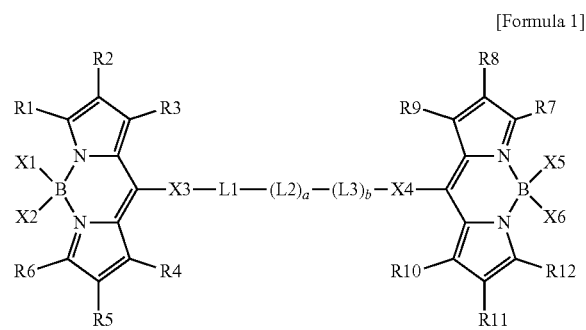

[Formula 1]

in the Formula 1,
X3 and X4 are the same as or different from each other, and are each independently O or S,
a and b are each an integer of 0 or 1 or higher,
X1, X2, X5 and X6 are the same as or different from each other, and are each independently a halogen group; a substituted or unsubstituted aryl group; a substituted or unsubstituted aryloxy group; a substituted or unsubstituted alkoxy group; a substituted or unsubstituted alkyl group; a substituted or unsubstituted alkynyl group; a substituted or unsubstituted ether group; a substituted or unsubstituted ester group; a substituted or unsubstituted arylalkyl group; or cyano group,
R1 to R12 are the same as or different from each other, and are each independently hydrogen; deuterium; a cyano group; a halogen group; a substituted or unsubstituted alkoxy group; a substituted or unsubstituted alkyl group; a substituted or unsubstituted ester group; a substituted or unsubstituted haloalkyl group; a substituted or unsubstituted aryl group; a substituted or unsubstituted cycloalkyl group; or a substituted or unsubstituted heterocyclic group, L1 is a substituted or unsubstituted alkylene group; a substituted or unsubstituted arylene group; or a substituted or unsubstituted heterocyclic group,
L3 is a substituted or unsubstituted arylene group,
L2 is a substituted or unsubstituted alkylene group; —C(=O)—; —O—; —S—; —SO$_2$—; or —NR—, wherein R is hydrogen; deuterium; or a substituted or unsubstituted alkyl group, and
when a and b are 0, L1 is a substituted or unsubstituted alkylene group; a substituted or unsubstituted polycyclic arylene group; or a substituted or unsubstituted heterocyclic group.

2. The compound of claim 1, wherein a and b are an integer of 1 or higher,
L1 and L3 are the same as or different from each other, and are a substituted or unsubstituted arylene group having 6 to 30 carbon atoms, and
L2 is a substituted or unsubstituted alkylene group having 1 to 20 carbon atoms; —C(=O)—, —O—, or —NR—, wherein R is hydrogen; deuterium; or a substituted or unsubstituted alkyl group having 1 to 20 carbon atoms.

3. The compound of claim 1, wherein a and b are 0, and L1 is a substituted or unsubstituted methylene group; a substituted or unsubstituted ethylene group; a substituted or unsubstituted propylene group; a substituted or unsubstituted naphthylene group; a substituted or unsubstituted fluorenylene group; a substituted or unsubstituted furanylene group; a substituted or unsubstituted thiophenylene group; a substituted or unsubstituted dibenzothiophenylene group; a substituted or unsubstituted dibenzofuranylene group; a substituted or unsubstituted carbazolylene group; or a substituted or unsubstituted azophenylene group.

4. The compound of claim 1, wherein X1, X2, X5, and X6 are the same as or different from each other, and are each independently a halogen group; a cyano group; an aryloxy group unsubstituted or substituted with a nitro group; an ethynyl group unsubstituted or substituted with an aryl group; or an ester group substituted with a haloalkyl group.

5. The compound of claim 1, wherein R1 to R12 are the same as or different from each other, and are each independently hydrogen; deuterium; a cyano group; a halogen group; a substituted or unsubstituted cycloalkyl group having 3 to 30 carbon atoms; a substituted or unsubstituted alkoxy group having 1 to 30 carbon atoms; a substituted or unsubstituted alkyl group having 1 to 20 carbon atoms; an ester group having 1 to 25 carbon atoms, which is unsubstituted or substituted with a heterocyclic group; a substituted or unsubstituted trifluoromethyl group; an aryl group having 6 to 30 carbon atoms unsubstituted or substituted with an alkyl group or an alkoxy group; or a substituted or unsubstituted furanyl group.

6. The compound of claim 1, wherein the compound of Formula 1 is represented by any one of the following structural formulae:

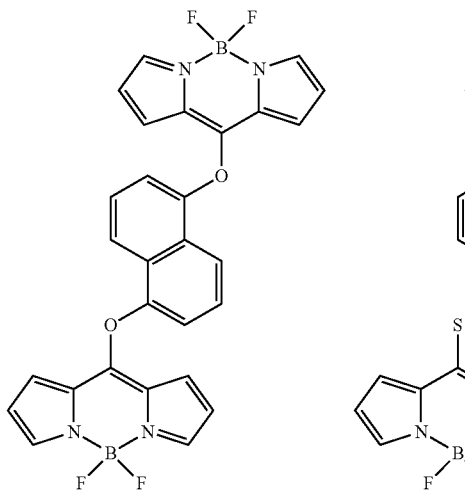
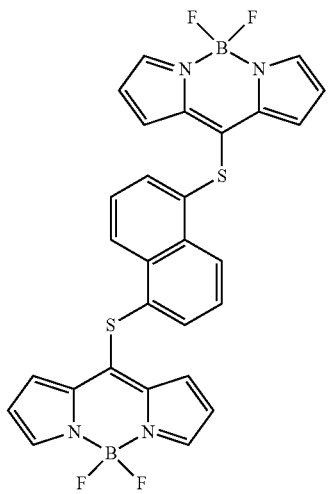
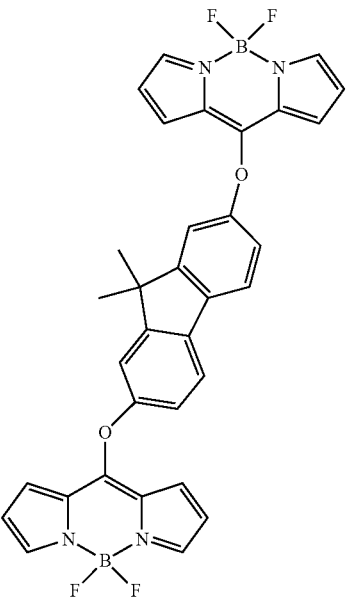
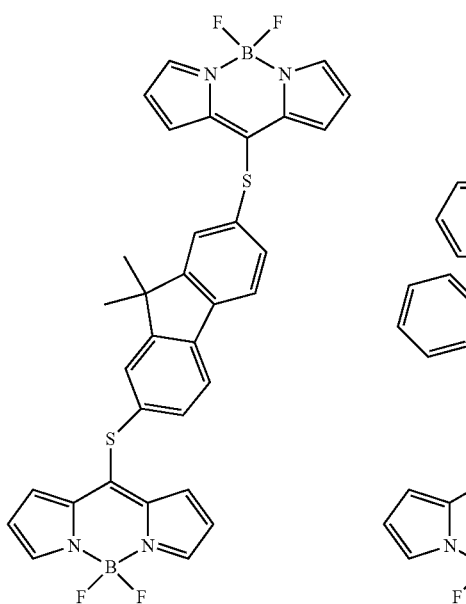
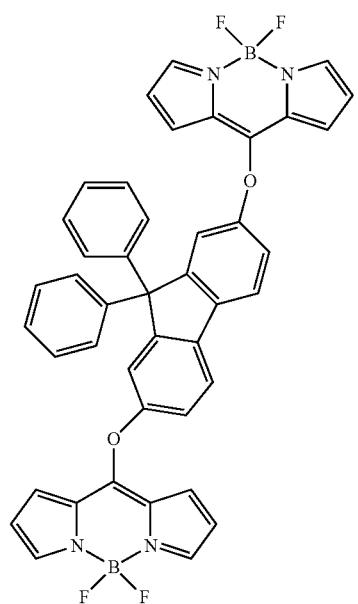

79
-continued
80
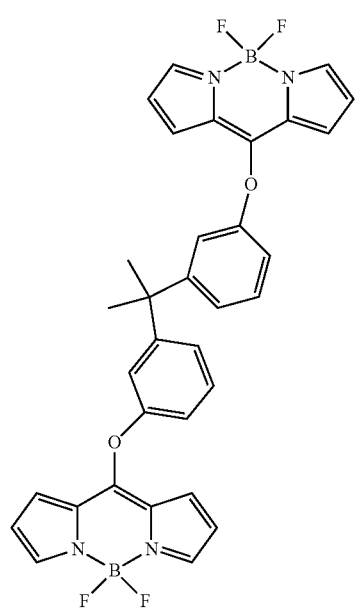
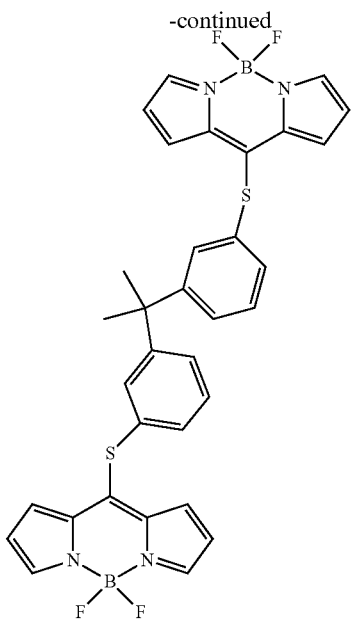
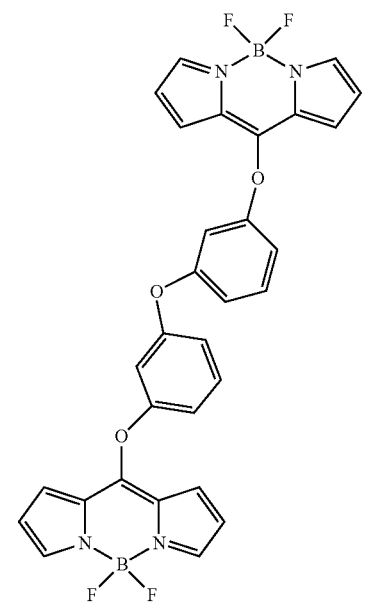
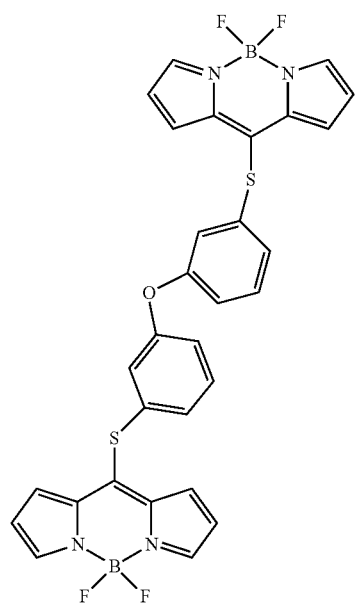
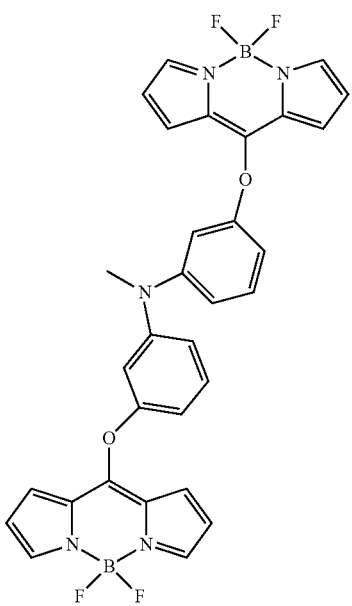
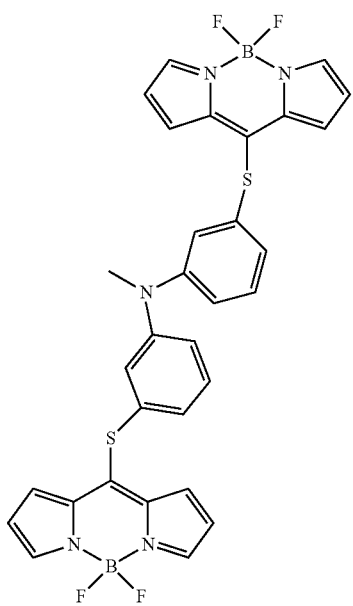

81
-continued
82
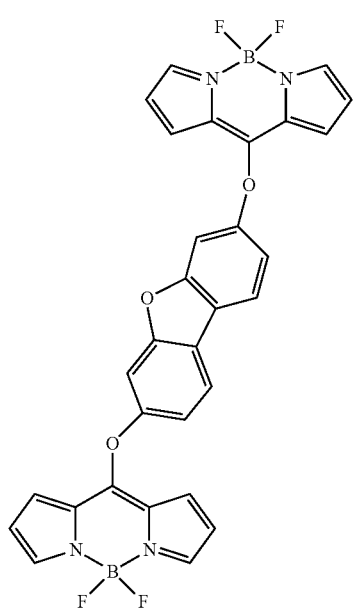
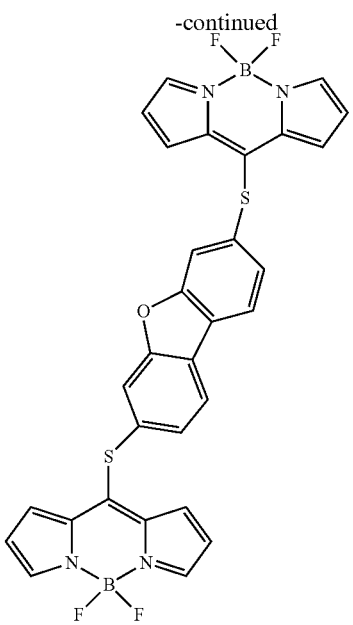
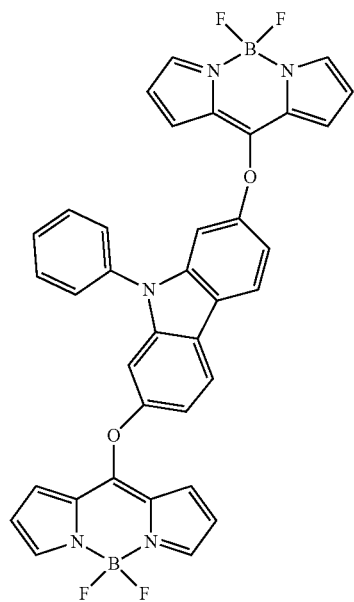
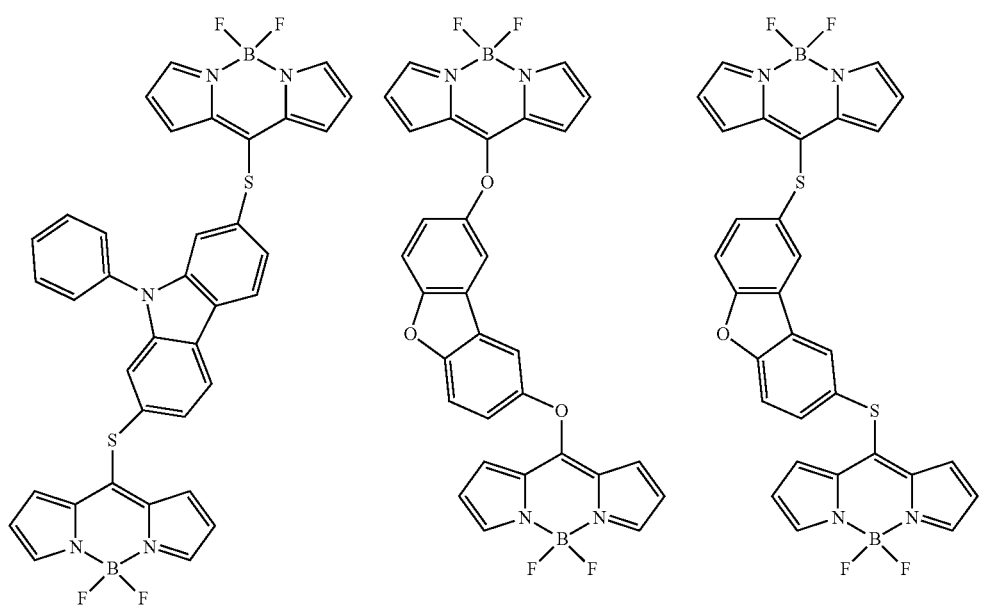

83
-continued
84
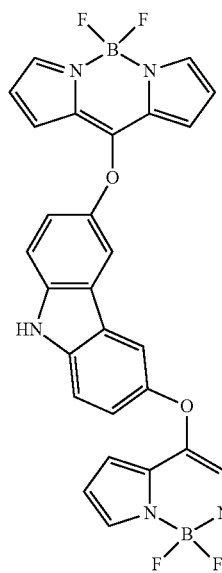
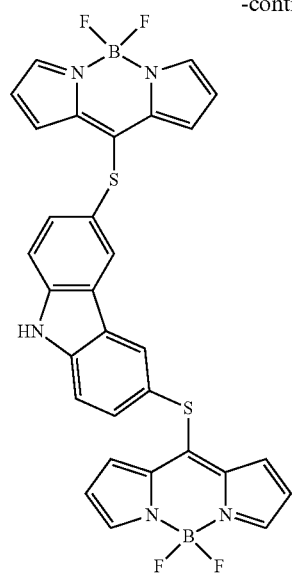
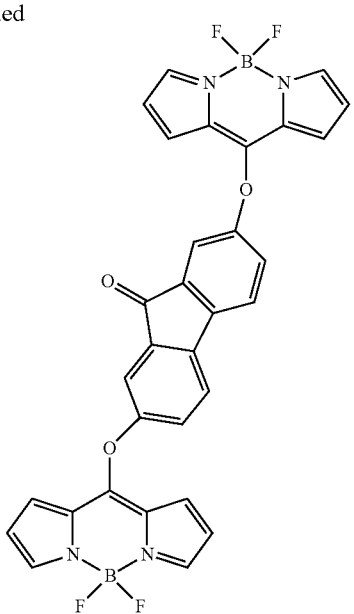
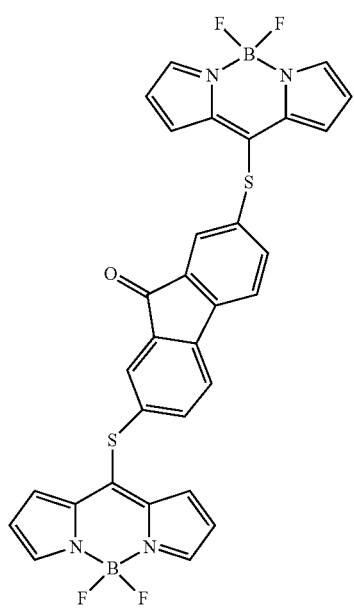
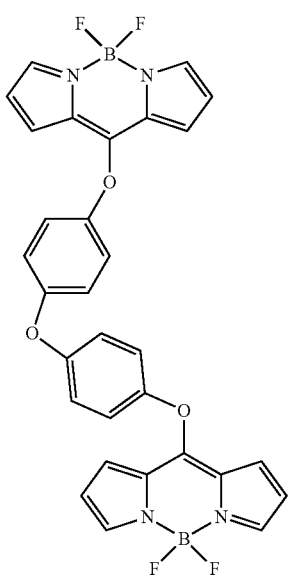
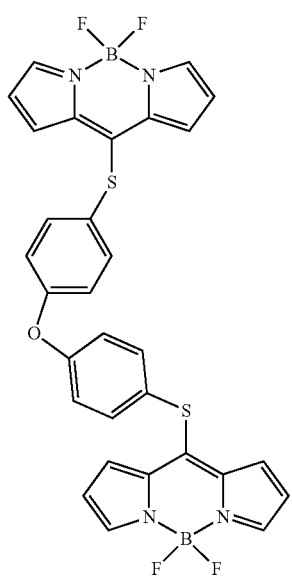

-continued
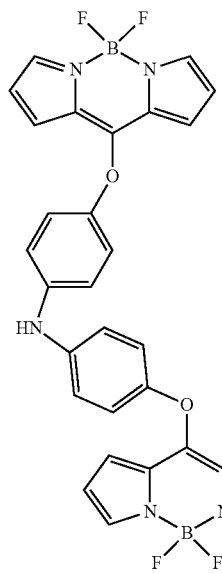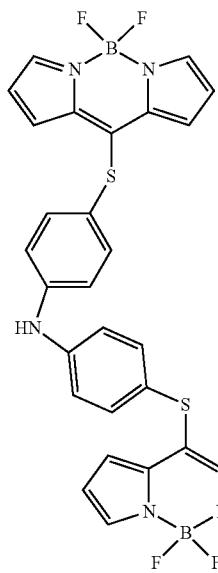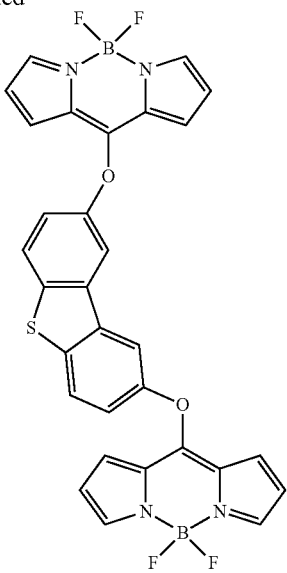
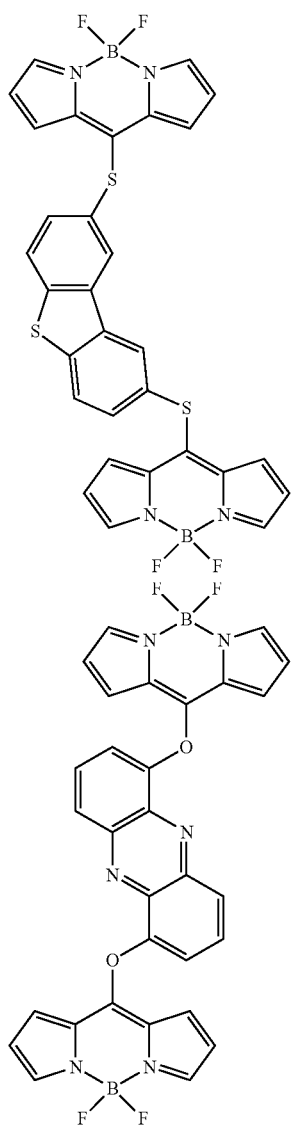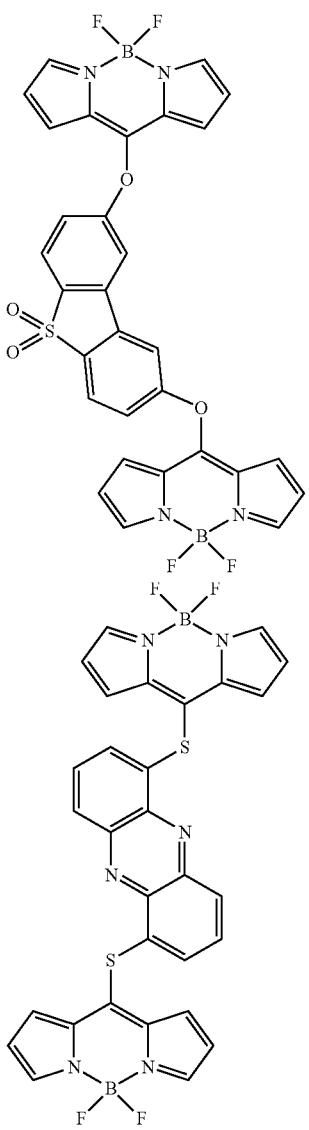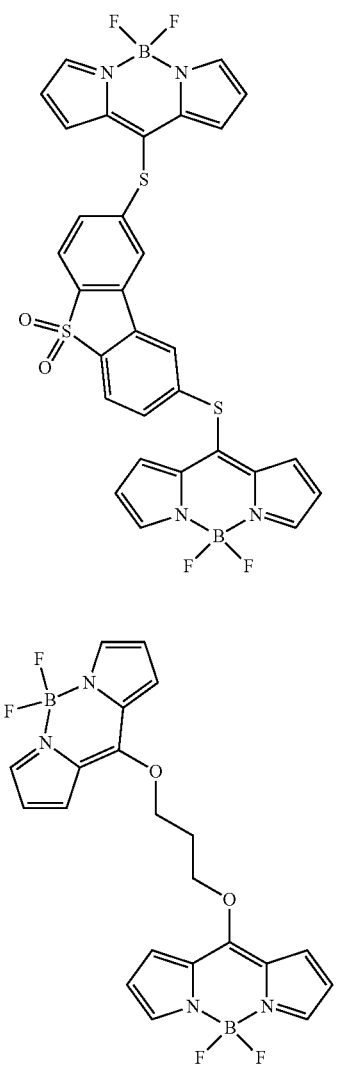

87
88
-continued
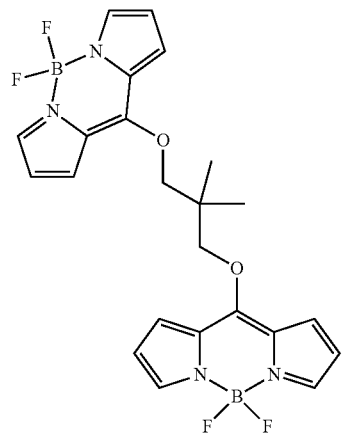
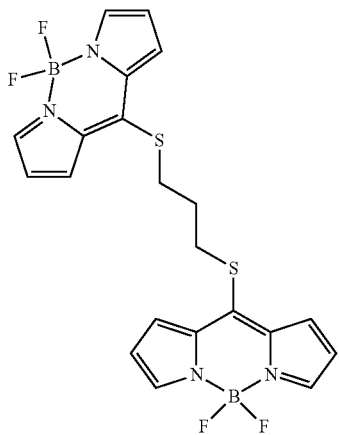
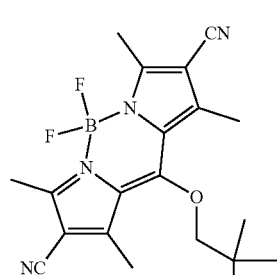
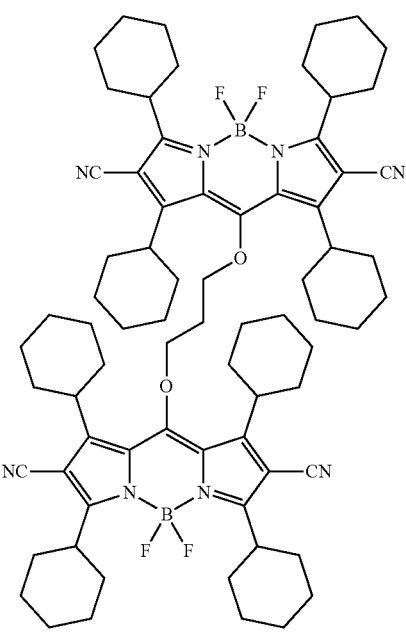
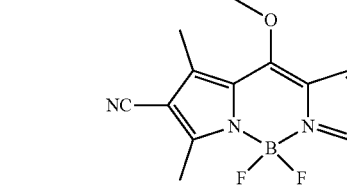
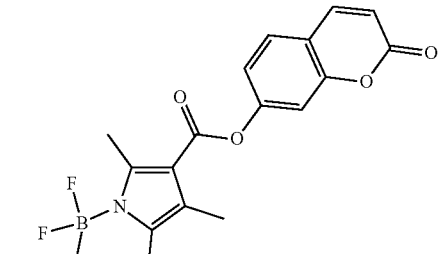
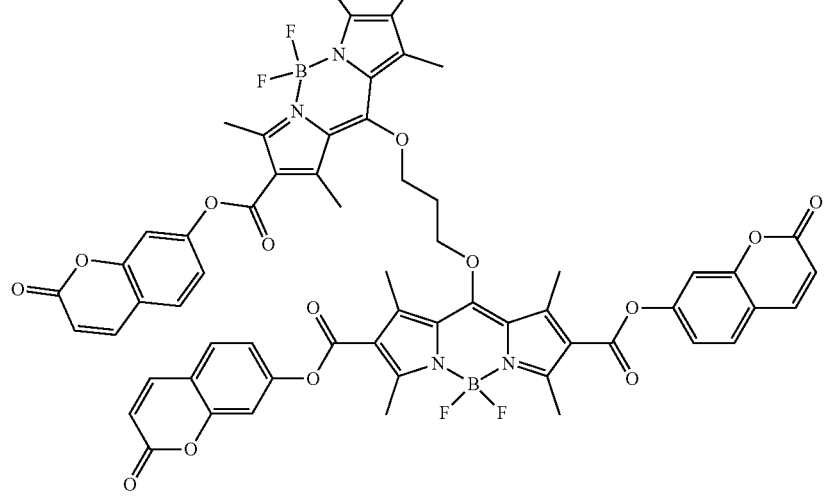
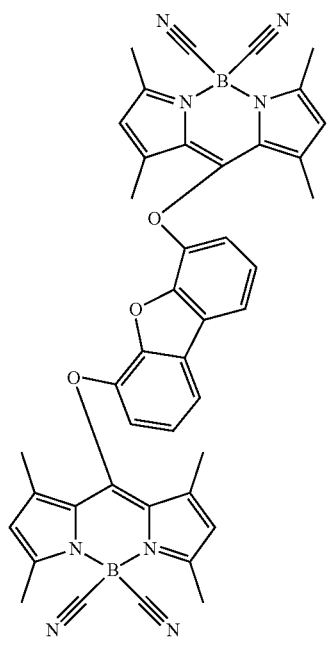

-continued
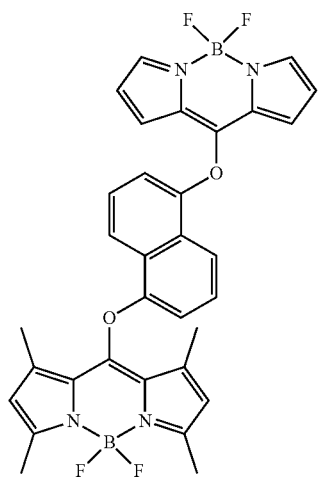 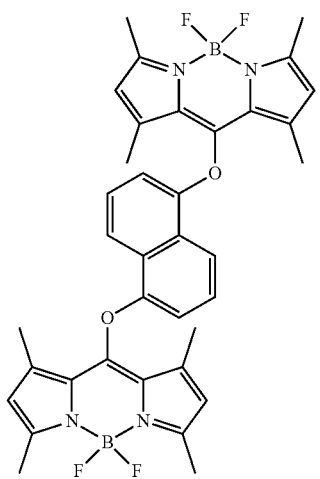 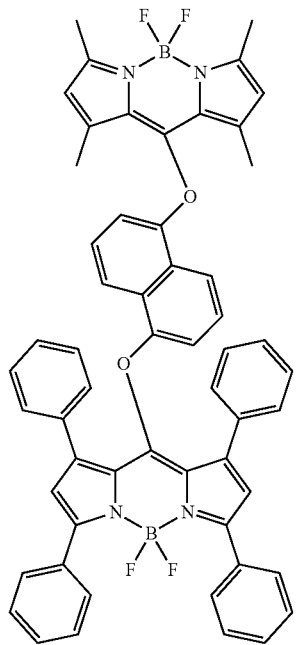
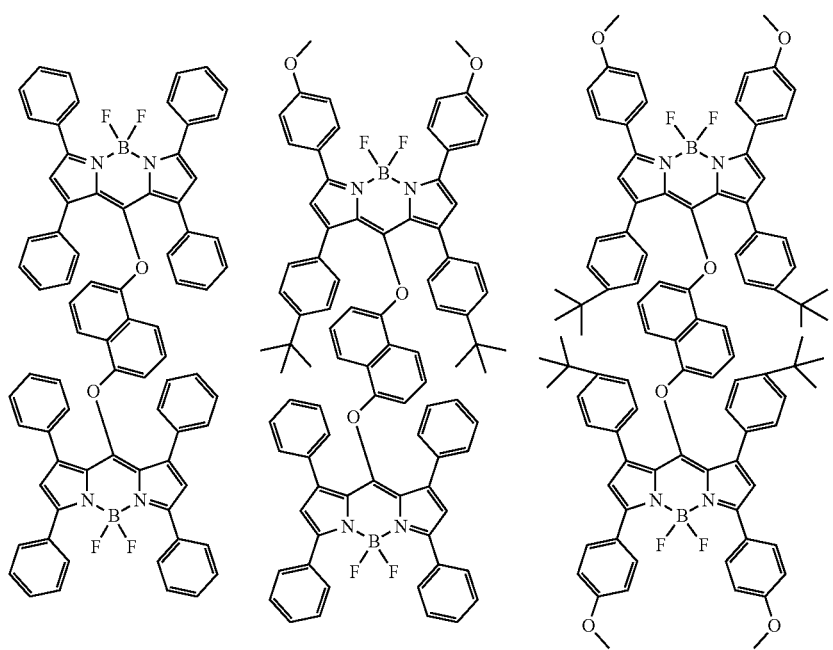

91
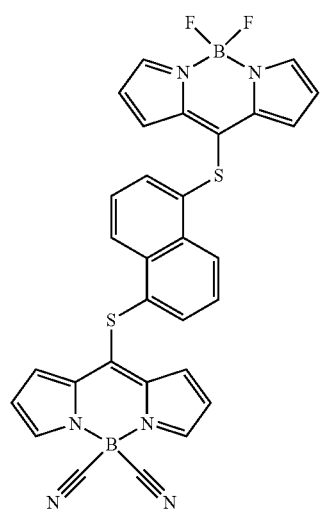
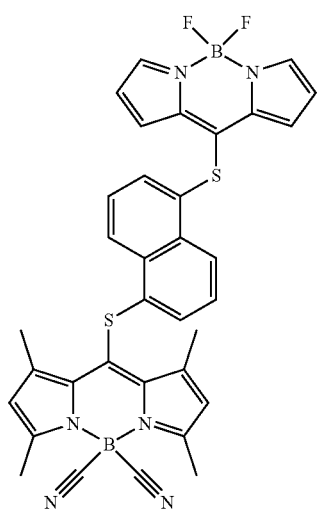
92
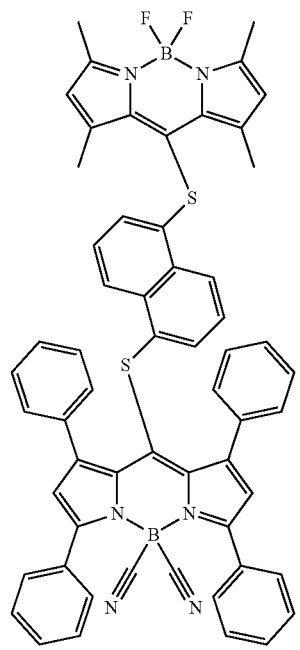
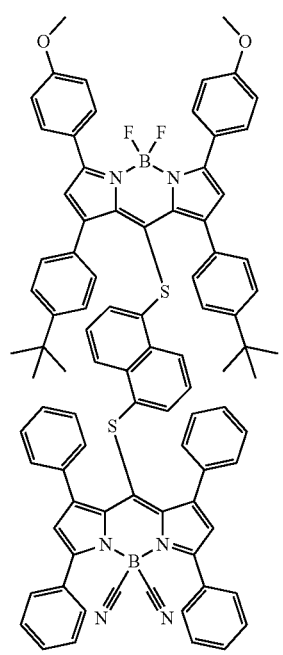
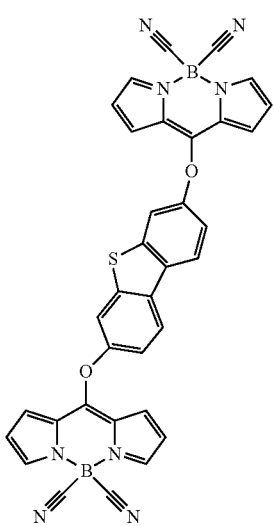
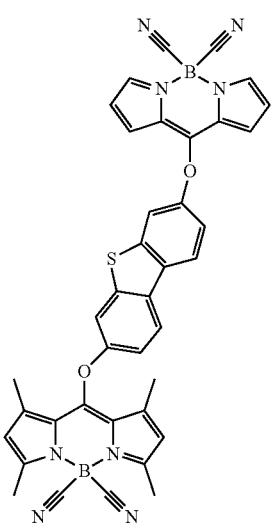
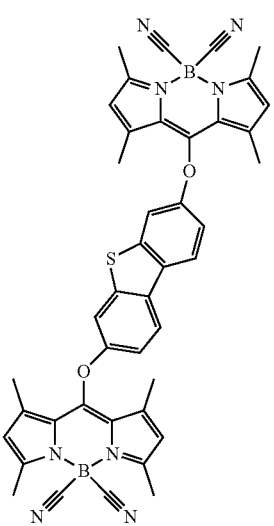

-continued
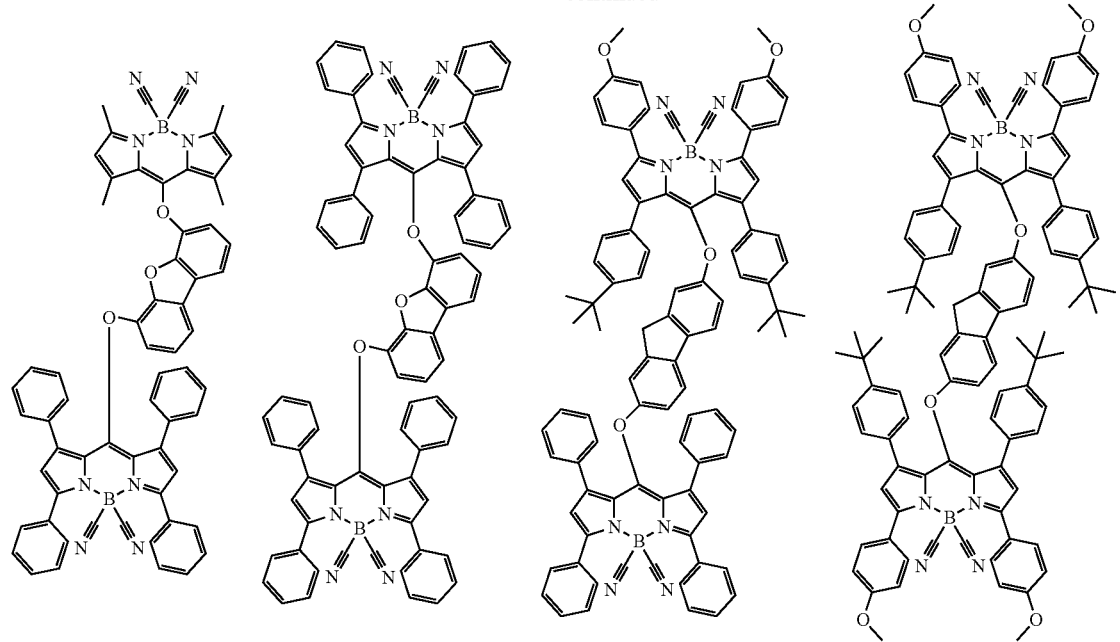
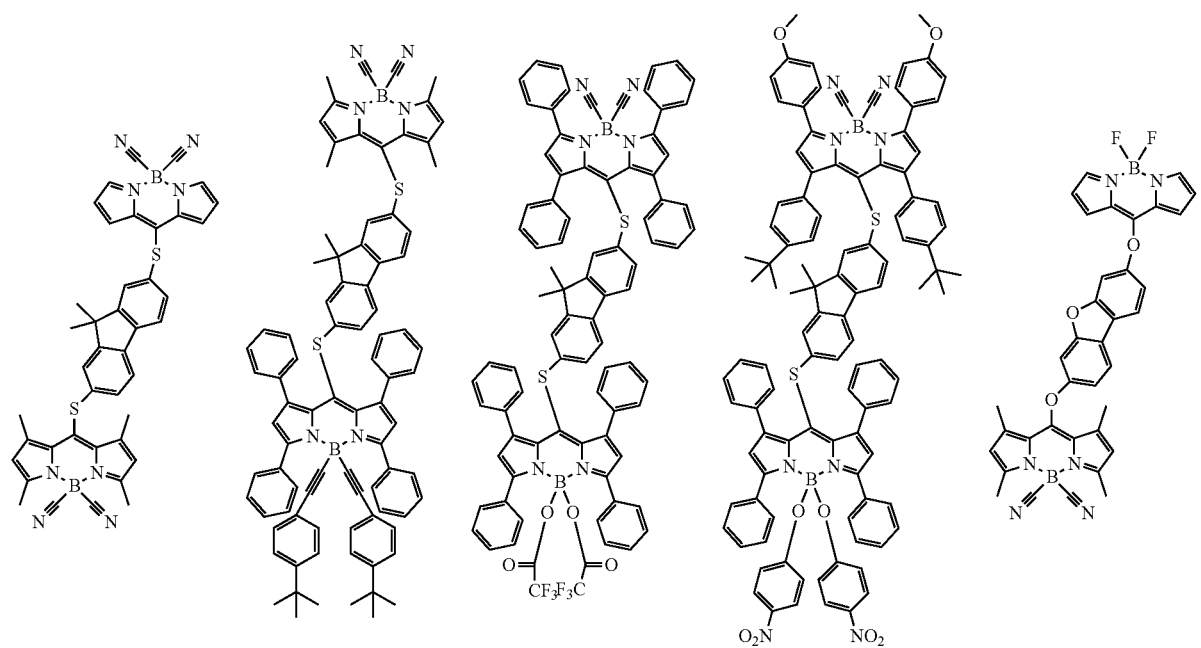

-continued
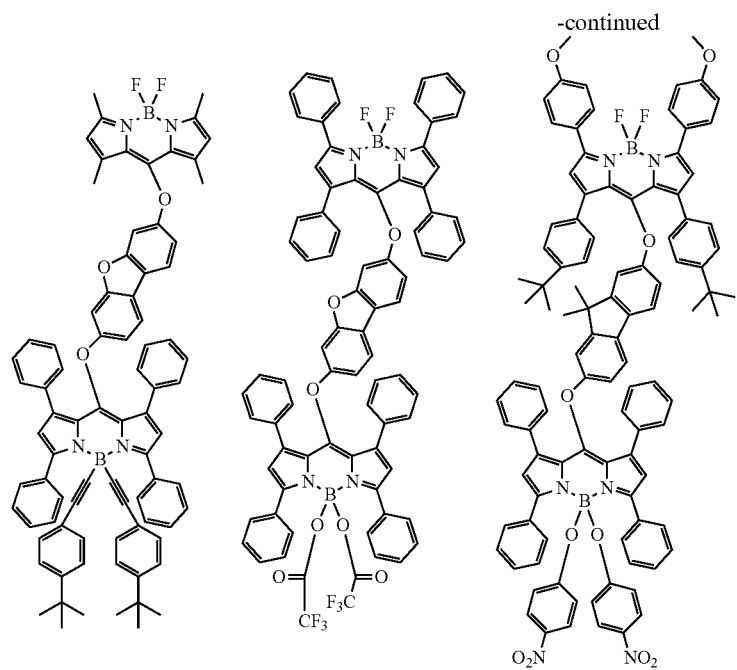
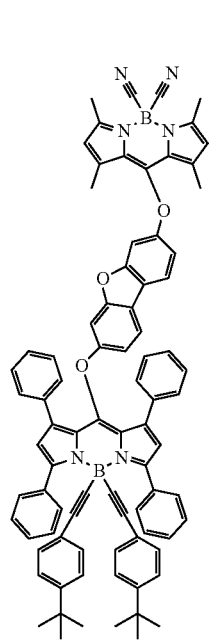
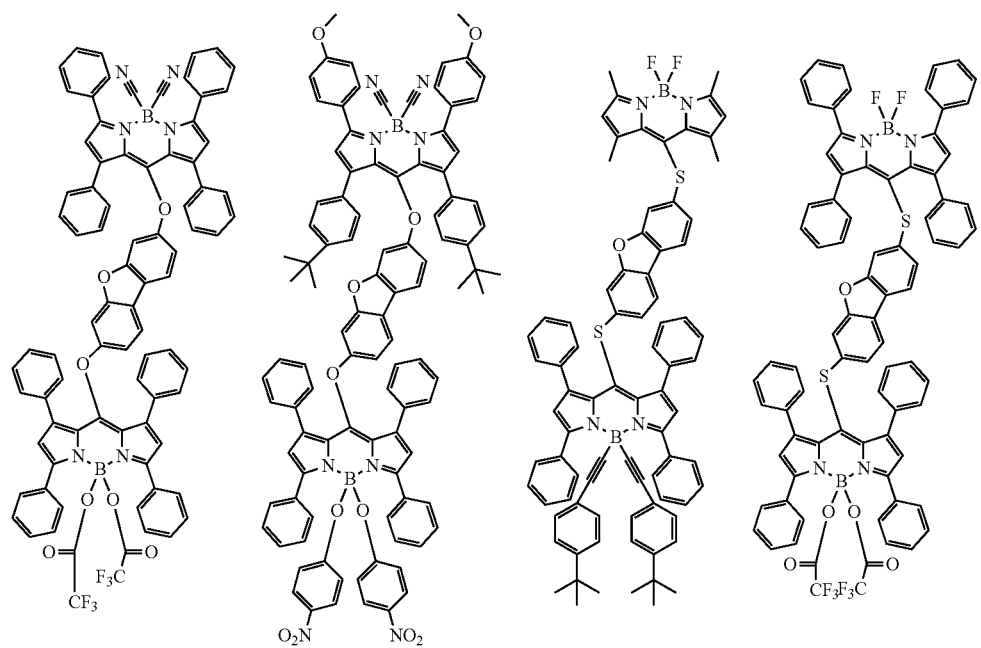

-continued
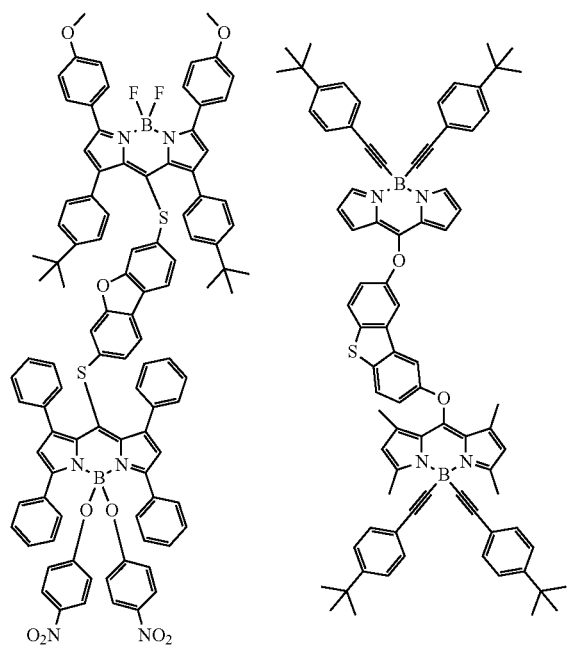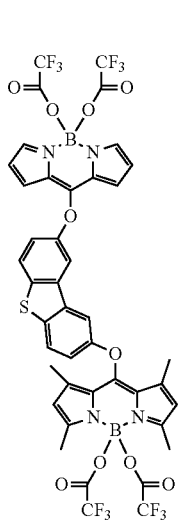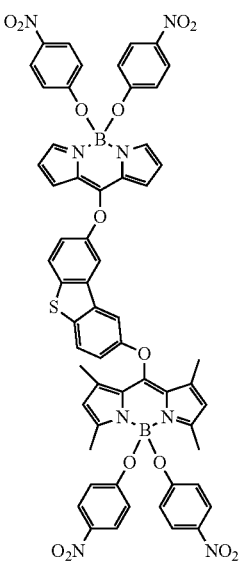
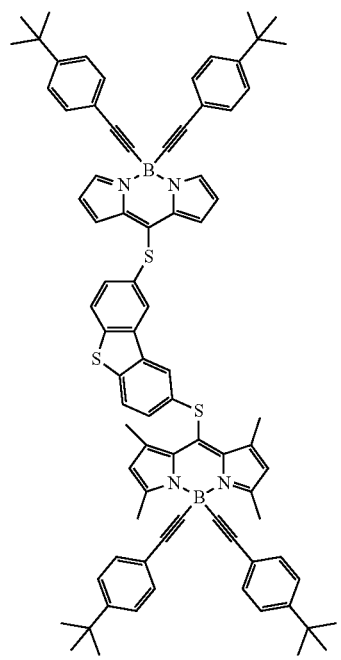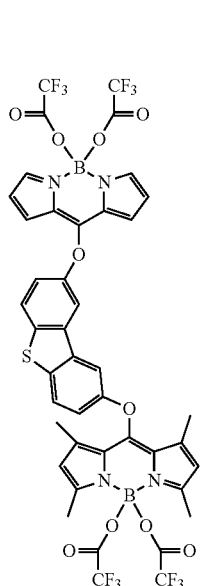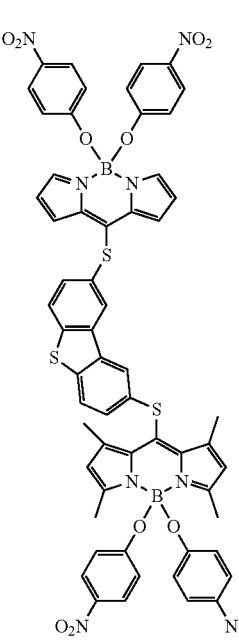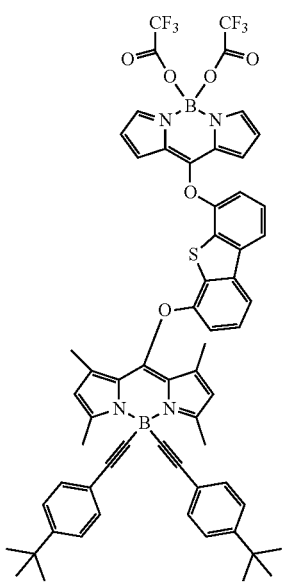

-continued
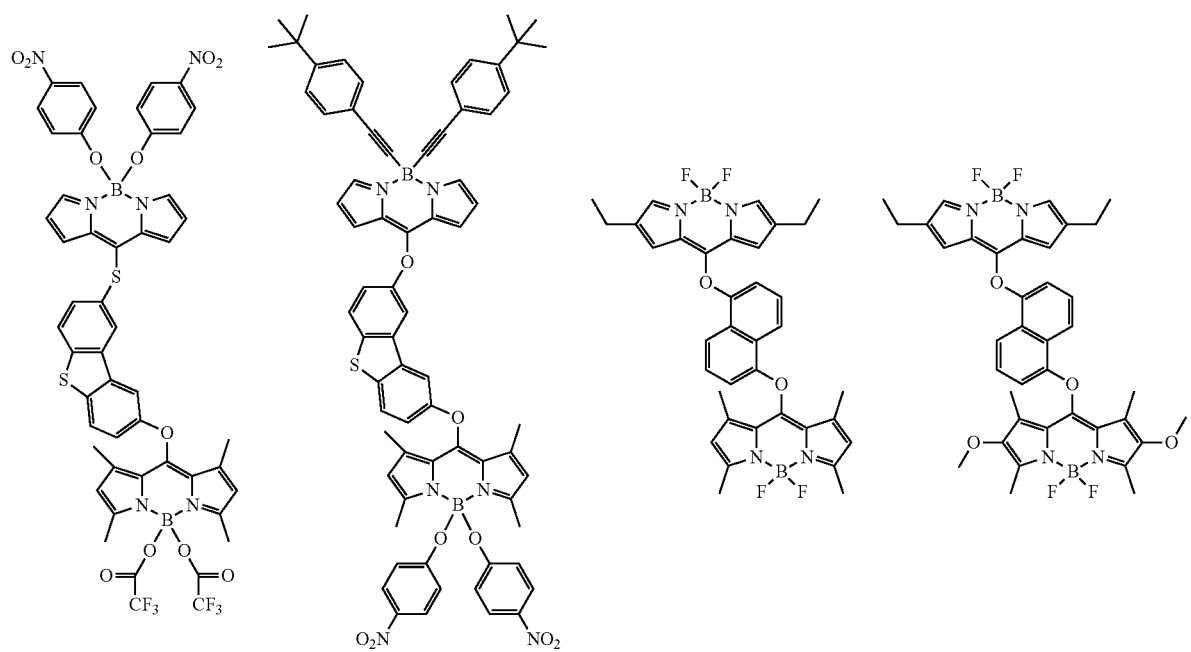
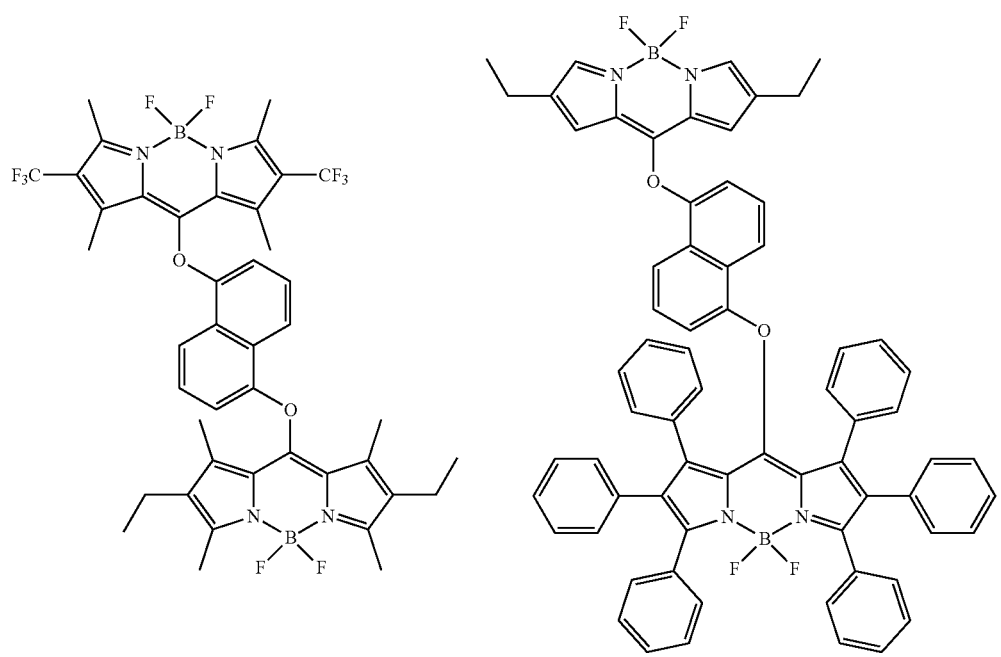

-continued
101
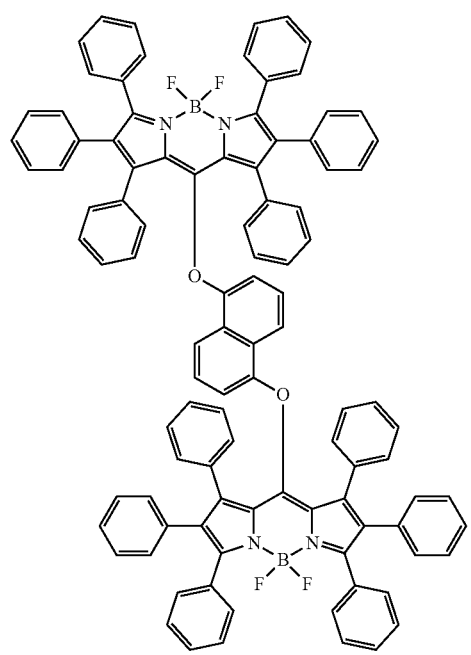
102
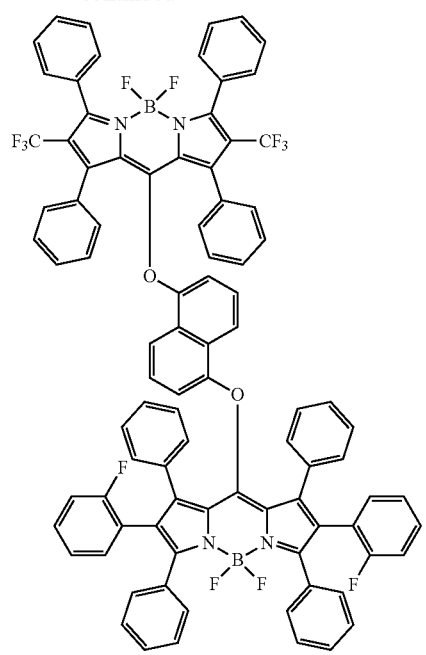
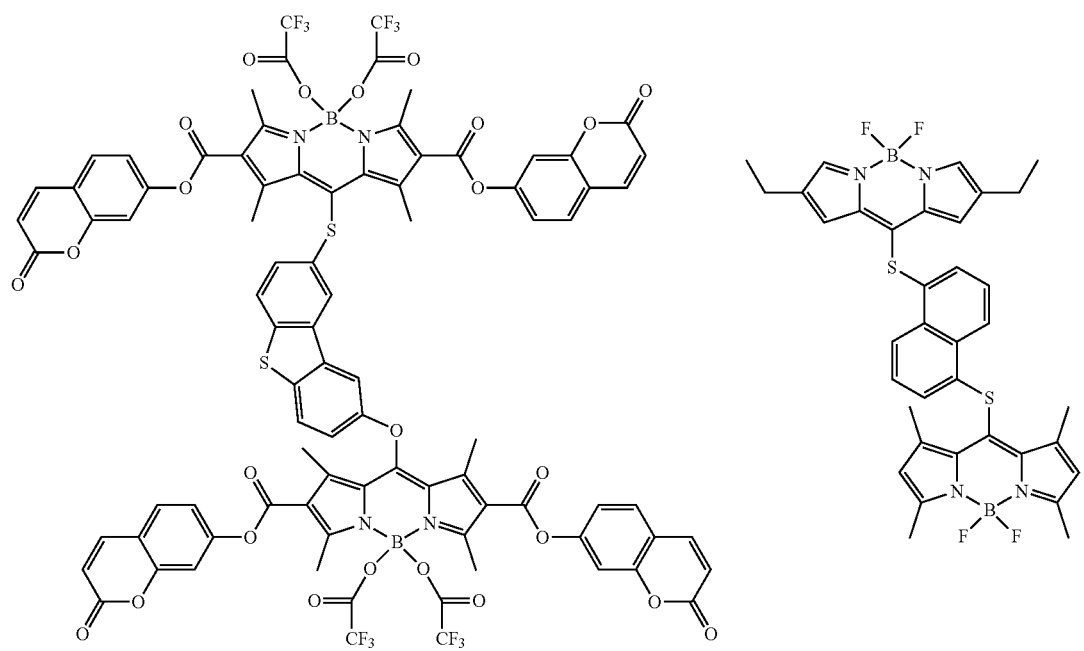

103
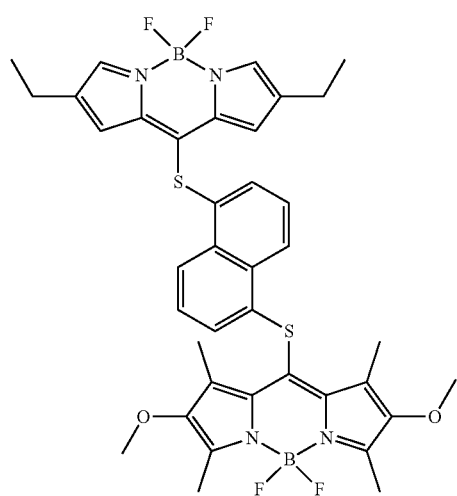
104
-continued
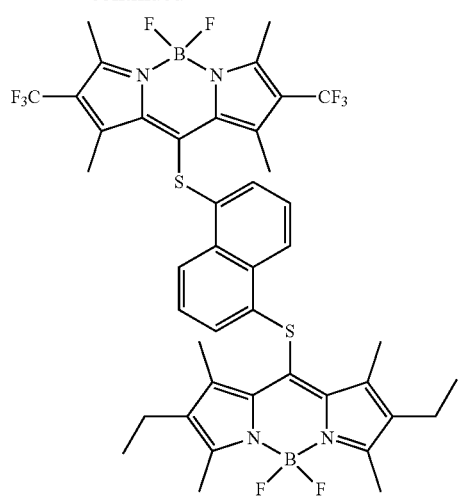
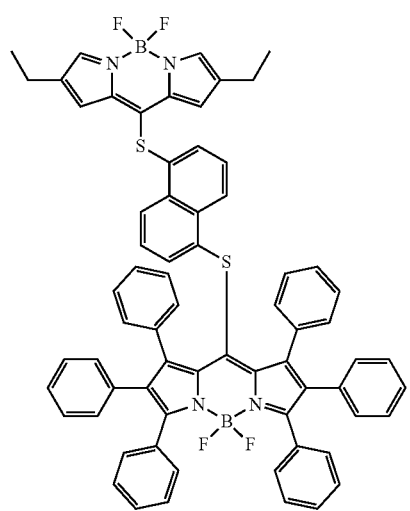
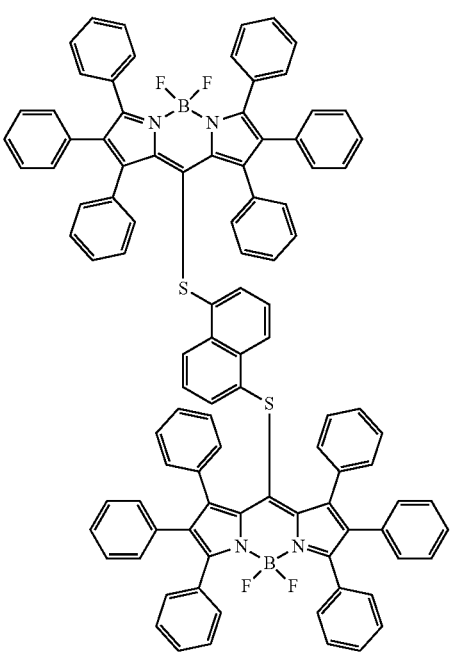

105
-continued
106
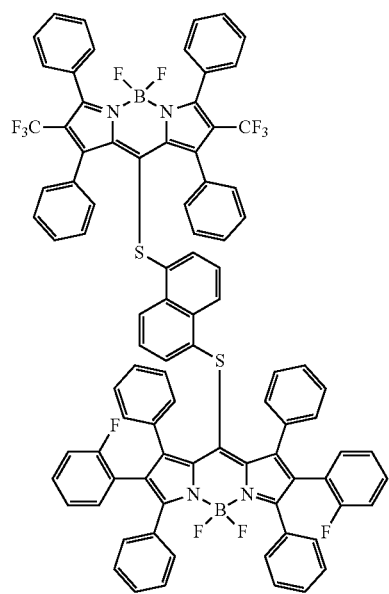
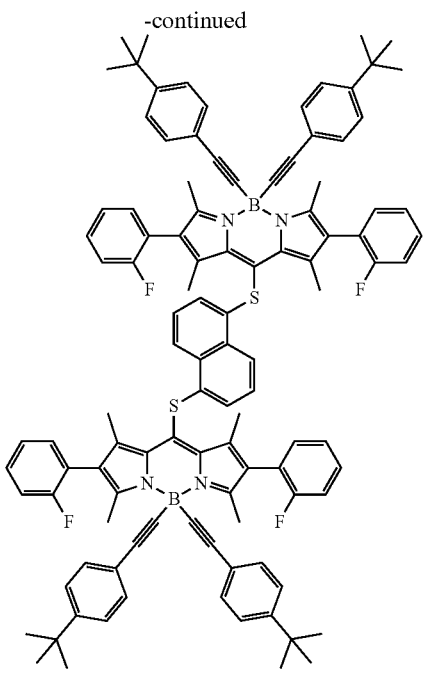
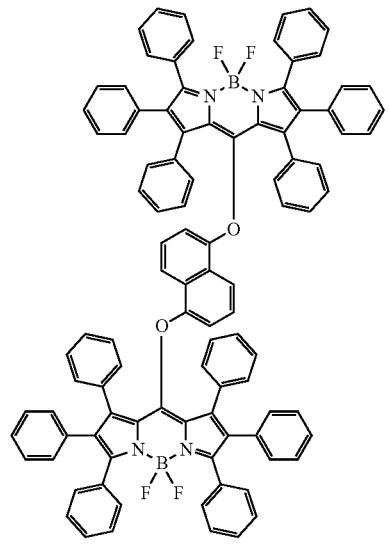
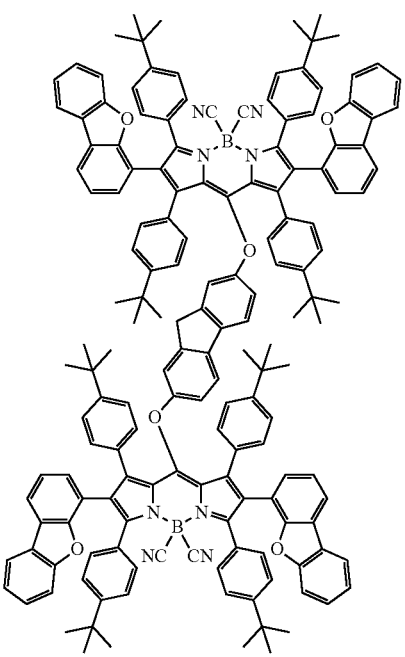
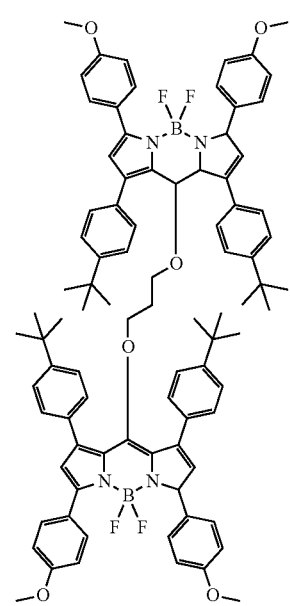

-continued

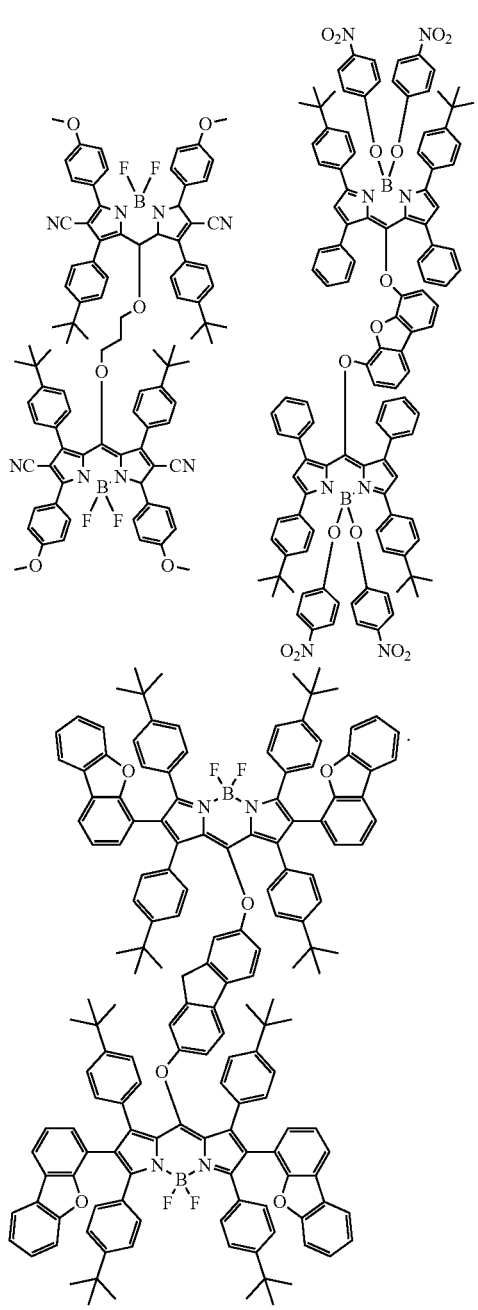
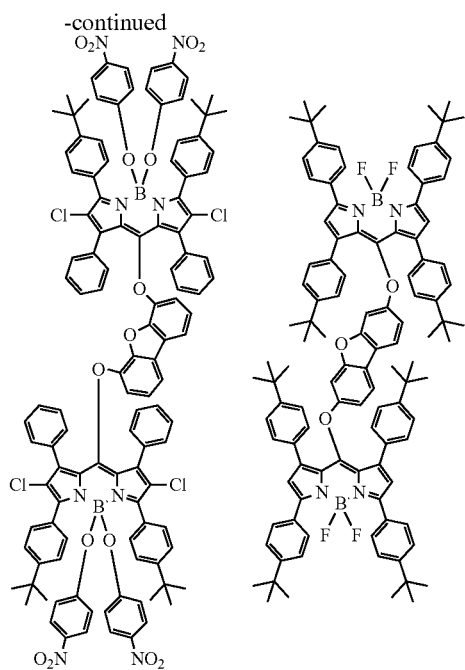
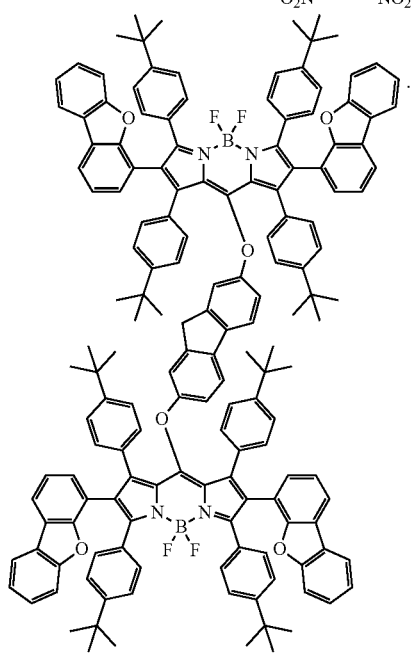

7. A color conversion film comprising:
 a resin matrix; and
 at least one compound represented by Formula 1 according to claim 1, wherein, the compound is dispersed in the resin matrix.

8. A backlight unit comprising the color conversion film according to claim 7.

9. A display device comprising the backlight unit according to claim 8.

10. The color conversion film of claim 7, wherein the resin matrix is a thermoplastic polymer or a thermosetting polymer.

* * * * *